US 9,411,912 B1

(12) United States Patent
Sood et al.

(10) Patent No.: US 9,411,912 B1
(45) Date of Patent: Aug. 9, 2016

(54) CLOCK TOPOLOGY PLANNING FOR REDUCED POWER CONSUMPTION

(71) Applicant: Cadence Design Systems, Inc., San Jose, CA (US)

(72) Inventors: Ankush Sood, San Jose, CA (US); Aaron Paul Hurst, San Francisco, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 439 days.

(21) Appl. No.: 13/844,683

(22) Filed: Mar. 15, 2013

Related U.S. Application Data

(60) Provisional application No. 61/732,284, filed on Nov. 30, 2012.

(51) Int. Cl.
*G06F 17/50* (2006.01)

(52) U.S. Cl.
CPC ..................................... *G06F 17/50* (2013.01)

(58) Field of Classification Search
CPC ............ G06F 2217/08; G06F 2217/62; G06F 2217/78; G06F 2217/84; G06F 17/5031; G06F 17/5068
See application file for complete search history.

(56) References Cited

U.S. PATENT DOCUMENTS

| | | | |
|---|---|---|---|
| 5,452,239 A | 9/1995 | Dai et al. | |
| 6,536,024 B1 | 3/2003 | Hathaway | |
| 6,751,786 B2 | 6/2004 | Teng et al. | |
| 6,763,513 B1 | 7/2004 | Chang et al. | |
| 6,782,519 B2 | 8/2004 | Chang et al. | |
| 6,910,196 B2 | 6/2005 | Cocchini | |
| 6,981,233 B2 | 12/2005 | Chang | |
| 7,051,310 B2 | 5/2006 | Tsao et al. | |
| 7,117,470 B1 | 10/2006 | Teig et al. | |
| 7,216,322 B2 * | 5/2007 | Lai et al. | 716/114 |
| 7,467,367 B1 | 12/2008 | Li et al. | |
| 7,484,187 B2 | 1/2009 | Eisner et al. | |
| 7,827,454 B2 | 11/2010 | Kurimoto | |
| 7,920,020 B2 | 4/2011 | Wang et al. | |
| 7,930,673 B2 | 4/2011 | Jiang et al. | |
| 7,941,679 B2 | 5/2011 | Allen | |
| 8,058,905 B1 | 11/2011 | Klein et al. | |
| 8,086,982 B2 | 12/2011 | Chang et al. | |
| 8,095,900 B2 | 1/2012 | Sircar et al. | |
| 8,104,012 B1 | 1/2012 | Klein et al. | |

(Continued)

OTHER PUBLICATIONS

Paul Cunningham, Marc Swinnen, Steev Wilcox; "Clock Concurrent Optimization"; Feb. 2009; published by Azuro, Inc.; pp. 1-20.

(Continued)

*Primary Examiner* — Vuthe Siek
*Assistant Examiner* — Aric Lin
(74) *Attorney, Agent, or Firm* — Schwegman Lundberg & Wessner, P.A.

(57) ABSTRACT

In one embodiment of the invention, a method of physical clock topology planning for designing integrated circuits is disclosed. The method includes reading an initial placed netlist of an integrated circuit design and a floorplan of the integrated circuit design, analyzing the integrated circuit design to determine potential enable signals to gate clock signals that clock the plurality of flip flops to reduce power consumption; simultaneously optimizing and placing the clock enable logic gates to gate clock signals to the plurality of flip flops; and minimizing timing variation of the clock signals to the plurality of flip flops.

14 Claims, 40 Drawing Sheets

(56) References Cited

U.S. PATENT DOCUMENTS

| | | |
|---|---|---|
| 8,205,182 B1 | 6/2012 | Zlatanovici et al. |
| 8,539,413 B1 | 9/2013 | Singla et al. |
| 8,719,743 B1 | 5/2014 | Kollaritsch et al. |
| 8,826,211 B1 | 9/2014 | Sood et al. |
| 9,135,375 B1 | 9/2015 | Sood et al. |
| 9,280,614 B1 | 3/2016 | Sood et al. |
| 2008/0168412 A1* | 7/2008 | Cheon et al. .................. 716/7 |
| 2008/0276209 A1* | 11/2008 | Albrecht et al. ............... 716/6 |
| 2008/0301593 A1* | 12/2008 | Jiang et al. .................... 716/2 |
| 2008/0301594 A1 | 12/2008 | Jiang et al. |
| 2008/0301604 A1 | 12/2008 | Itskovich et al. |
| 2009/0199143 A1* | 8/2009 | Schlotman et al. ........... 716/6 |

OTHER PUBLICATIONS

U.S. Appl. No. 13/815,902, Notice of Allowance mailed May 8, 2015, 5 pgs.

U.S. Appl. No. 13/844,764, Notice of Allowance mailed Mar. 25, 2015, 7 pgs.

\* cited by examiner (BACKGROUND)

(BACKGROUND)

(BACKGROUND)

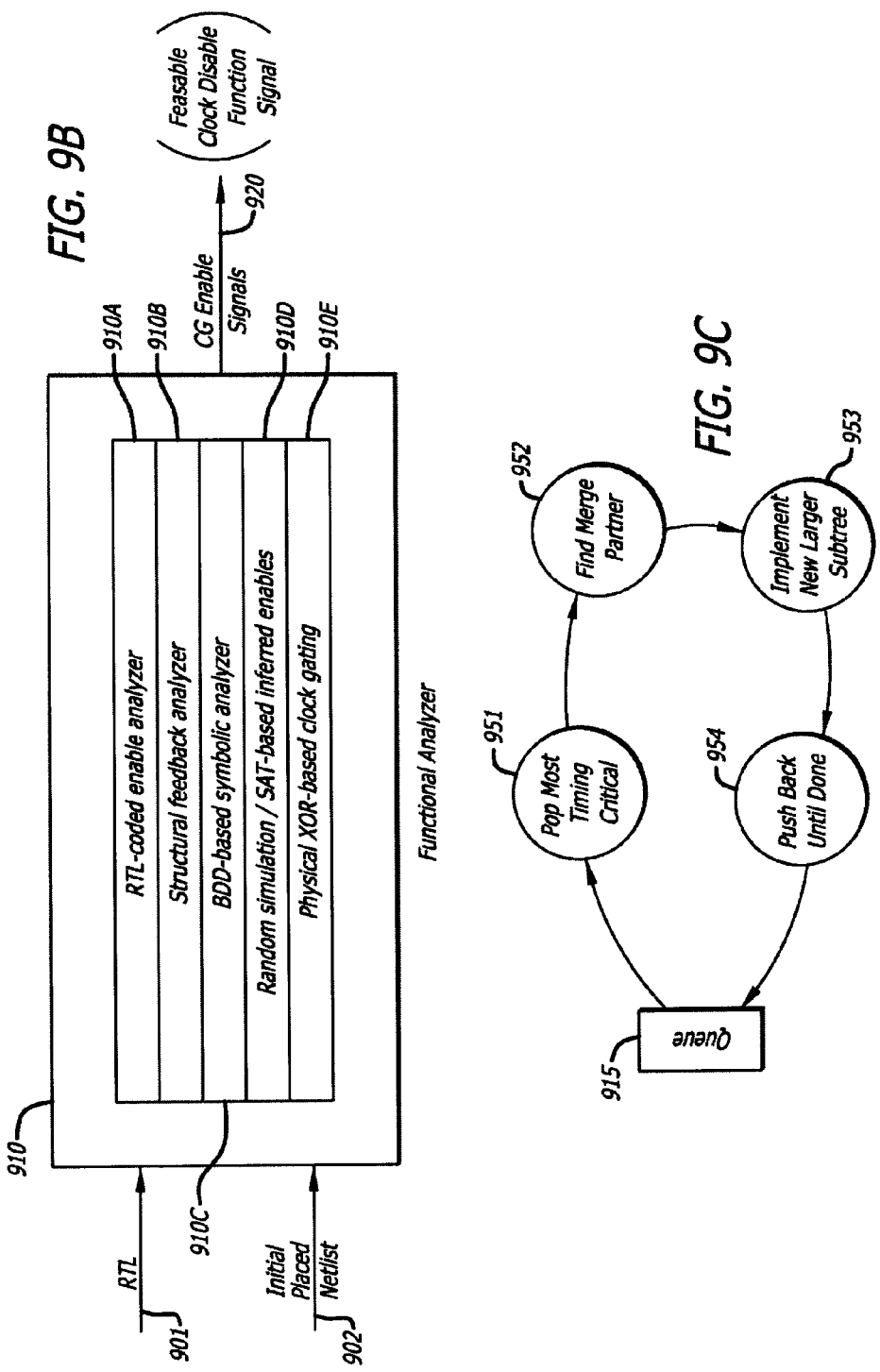

Timing model: $d_{late}$ (slew)
(longest/worst case delay)

$1010W$ = delay from input to moment data is captured

Timing model: $d_{early}$ (slew)
(shortest/best-case delay)

Power model: $E_{sw}$ (slew)

Switching energy as a function of slew non-switching power (e.g. leakage)

| Time: | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ | |
|---|---|---|---|---|---|---|---|---|---|---|---|---|---|---|---|---|
| $x \rightarrow$ | 0 | 0 | 0 | 1 | 1 | 1 | 0 | 0 | 0 | 1 | 1 | 1 | 1 | 1 | 1 | —1601 |
| $y \rightarrow$ | 0 | 0 | 0 | 1 | 1 | 1 | 0 | 0 | 0 | 0 | 0 | 0 | 0 | 0 | 0 | —1602 |
| $z \rightarrow$ | 1 | 1 | 1 | 0 | 0 | 0 | 0 | 0 | 0 | 0 | 0 | 0 | 0 | 0 | 0 | —1603 |

FIG. 16A

| | Time: | $t_1$ | $t_2$ | $t_3$ | $t_4$ | $t_5$ | $t_6$ | $t_7$ | $t_8$ | $\cdots$ | $t_{15}$ | |
|---|---|---|---|---|---|---|---|---|---|---|---|---|
| Clock Activity Vector $\rightarrow$ | | 1 | 1 | 1 | 0 | 0 | 0 | 1 | 1 | $\cdots$ | 0 | —1610 |

FIG. 16B

*Exemplary Clock Activity Vector*

| | Time: | $t_1$ | $t_2$ | $t_3$ | $t_4$ | $\cdots$ | $t_{15}$ | |
|---|---|---|---|---|---|---|---|---|
| Clock Activity Vector $\rightarrow$ | | 1 | 1 | 1 | 1 | $\cdots$ | 1 | —1611 |

FIG. 16C

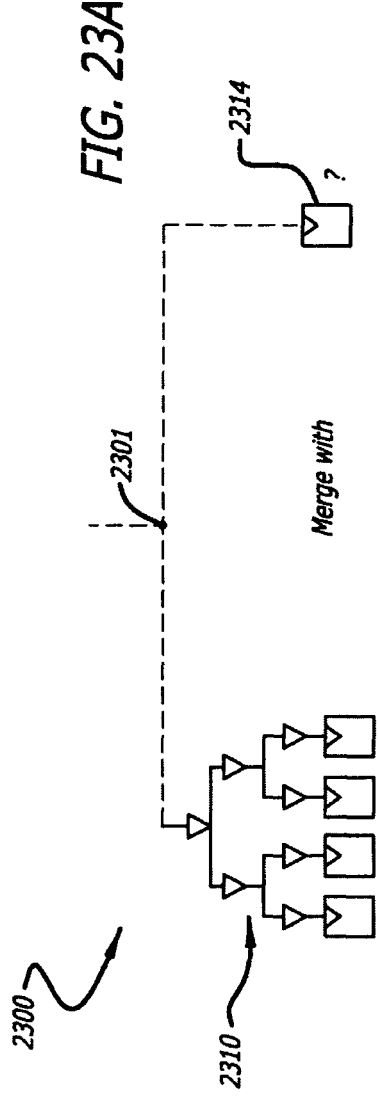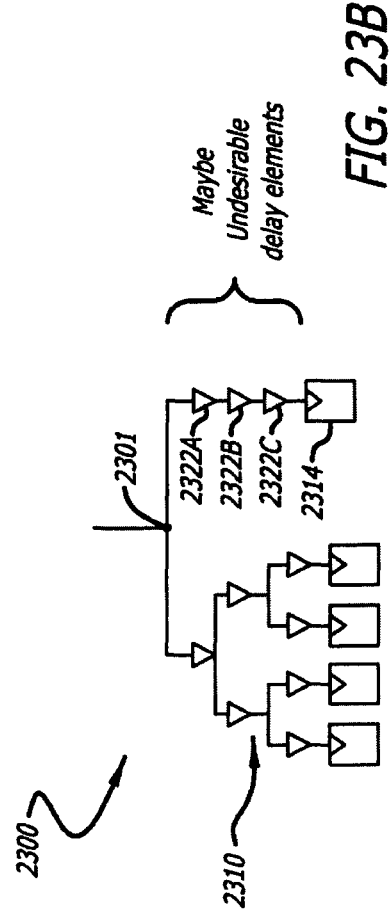

Time: $t_1$ $t_2$ $t_3$ $t_4$ $t_5$ $t_6$ $t_7$ $t_8$ $t_9$ $t_{10}$ x → 0 0 0 0 0 0 0 1 1 1  — 2701 y → 0 0 1 1 1 1 1 1 1 1  — 2702 here "X" provides no gating that is not provided by "Y"

CLOCK TOPOLOGY PLANNING FOR REDUCED POWER CONSUMPTION

CROSS REFERENCE

This non-provisional United States (U.S.) patent application claims the benefit of U.S. Provisional Patent Application No. 61/732,284 filed on Nov. 30, 2012 by inventors Ankush Sood, et al., entitled GRAPHICAL USER INTERFACE FOR PHYSICALLY AWARE CLOCK TREE PLANNING, incorporated herein by reference.

This application is also related to U.S. patent application Ser. No. 13/732,364 filed on Dec. 31, 2012 by inventors Tsuwei Ku, et al., entitled PHYSICALLY AWARE LOGIC SYNTHESIS OF INTEGRATED CIRCUIT DESIGNS, incorporated herein by reference.

FIELD

The embodiments of the invention relate generally to clock tree topology planning for designing integrated circuits.

BACKGROUND

Digital circuits within integrated circuit chips are often synchronized by one or more clock signals. Data is periodically stored in registers that are clocked by such clock signals. When data is not being evaluated, it is desirable to control or gate the clocks to unused circuitry in order to conserver power. Clock tree synthesis is thus important in assuring that data is captured when needed and that power is conserved when desired.

Traditional logic synthesis of register-transfer-logic (RTL) into Boolean logic gates provides little to no visibility into the consequences of logic implementation choices on clock synthesis. Clock synthesis is often considered at the end of the design even though decisions made in the front-end design flow of an integrated circuit may have significant consequences on the subsequent timing and power closure of the clock design and its clock tree.

Traditionally, clock signals are treated as ideal networks during logic synthesis and logic optimization. Physical information (e.g., driver size/strength, net widths, net lengths), buffering information (e.g., clock buffers, clock gating), or timing information (e.g., delay) is usually not estimated, or if estimated, not utilized during logic synthesis of other networks. It is usually during the back-end of the physical design of the overall integrated circuit design that clock synthesis occurs and any implementation details of the clock signals are explored.

For low power integrated circuit designs, estimating the costs of timing and power during automatic clock gate insertion is imprecise with such late clock synthesis. In lieu of reliable data, front-end designers typically focus on the gated flip-flop percentage. However, with the availability of advanced functional gating techniques, overly aggressive gating is an increasingly common result. Another negative consequence of clock synthesis occurring late in the design flow is the greater difficulty of grouping and cloning clock signals, such that it does not correspond to the physical netlist. With fewer clock signals grouped together, clock switching power may be greater. With clock synthesis occurring later in the design flow, it may be more difficult to obtain timing closure of the integrated circuit design during clock tree synthesis.

It is desirable to provide tools to the integrated circuit designer that are used earlier in the integrated circuit design flow to improve the synthesis of clock signal networks within an integrated circuit design.

BRIEF SUMMARY

The embodiments of the invention are best summarized by the claims that follow below. In brief, the embodiments of the invention include a method, apparatus and system for physically aware clock topology planning.

One aspect of physically aware clock topology planning is that some work may be performed pre-placement in the front end while other work to complete the clock tree plan is performed post placement. In the front end, a clock tree prototype may be developed from the netlist. The clock tree prototype is a Boolean representation of the clock tree that is oriented hierarchically. With a hierarchical representation, the position of clock buffers with respect to clock gates can be readily modeled. For example, a count of the number of clock buffers that precede a clock gate in a given clock path and the number that follow the clock gate and are shielded thereby (keeps them from being clocked) to save power can be made to evaluate power consumption in a clock subtree.

After the clock buffers, enable gates, clock gates, and clocked elements are placed within a floor plan, the clock tree plan does not need to follow the clock tree prototype and can be altered to optimize the physical placement of the clock buffers, enable gates, clock gates, and clocked elements to improve timing and power consumption. After placement in a floorplan, clocked elements in the clock tree plan can be optimized such as by merging clock subtrees at merger points or cloning clock gates for insertion into branches of a clock subtree.

After the planning, a subsequent clock tree synthesis can be performed in the back end to better select clock buffers in the clock tree to meet timing requirements and reduce power consumption. If timing is an issue, a merged clock subtree may be re-split post placement.

Another aspect of the embodiments of the invention is to achieve better timing. The enable signal logic for a clock gate may be synchronized to the clock signal logic to achieve more balanced timing in the generation of a gated clock signal. Enable logic must be in sync with the clock logic.

Another aspect of the embodiments of the invention is that physical placement is considered during the clock tree planning process. Another aspect of the embodiments of the invention is cluster placement of clocked elements in portions of the integrated circuit design. Cloning of clock gates or clock buffers, one or more times, may be used to improve timing and/or power consumption in one or more branches of clock signal paths within a clock subtree that lead to the clusters of clocked elements. The placement of buffers and clock gates in the clock tree is evaluated to optimize power and balance timing.

Another aspect of the embodiments of the invention is a merger algorithm that is used to evaluate merging of clock trees, clock gates, and clocked elements in the formation of an optimized clock tree plan. The merger algorithm is a bottom up recursive binary merging algorithm. A partial tree model of clock subtrees (a gate model, timing model, energy/power model) may be created to determine whether or not to merge. The partial tree models are recursively built as you move up the hierarchy towards the clock source at a clock generator. At every stage of hierarchy, a history of the lower level clock subtrees and clocked elements is maintained. The goal of the merger algorithm is to conserver maximum power while meeting timing requirements. To do so, the merger algorithm evaluates cost functions of potential mergers of clock subtrees. It evaluates power consumption/conservation, enable timing, signal skew, and data timing delay of the potential mergers of clock subtrees. With a merger, redundancy is avoided to reduce power consumption. Clock signal skew is balanced to avoid race conditions. Clock signal timing is balanced with data signal timing at a flip flop to assure capture of data while gating clock signals to conserver power.

BRIEF DESCRIPTIONS OF THE DRAWINGS

Various embodiments of the present invention taught herein are illustrated by way of example, and not by way of limitation, in the figures of the accompanying drawings, in which:

FIG. 9B is a functional block diagram of the functional analyzer and the functional analysis engines therein for the clock tree planner-synthesizer shown in FIG. 9A.

FIG. 9C is a state diagram for the priority queue of the clock tree planner-synthesizer shown in FIG. 9A.

FIG. 16A is a timing diagram illustrating exemplary simulation vectors for feasible disable signals.

FIG. 16B is a timing diagram illustrating an exemplary clock actively vector for a gated clock signal.

FIG. 16C is a timing diagram illustrating an exemplary clock actively vector for an ungated clock signal.

FIGS. 23A-23B are functional block diagrams to evaluate costs of an exemplary potential merger between a clock subtree and a clocked element at a merge point.

Figure 1A:
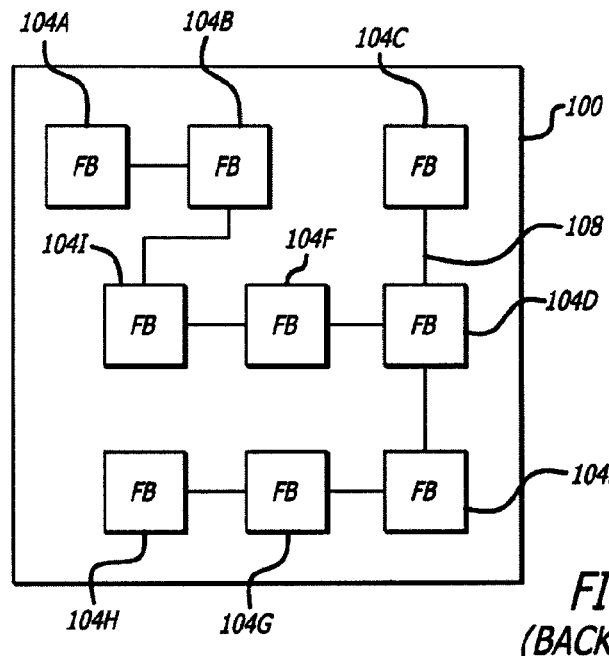
FIG. 1A illustrates placement of a clock generator or clock source and functional blocks (FB) in an integrated circuit.

It will be recognized that some or all of the Figures are for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Note also that the terms flip-flop and register are being used interchangeably herein. That is, each reference to a flip-flop herein also means a register of a plurality of flip-flops that are clocked together by the same clock signal. In a register, each flip flop typically has a data input coupled to a respective data signal to store data bits from a bus of parallel data signals. Accordingly, a reference to a flip-flop herein also means a register of a plurality of flip flops. A reference to one or more flip flops herein also means one or more registers. A reference to a plurality of flip flops herein also means a plurality of registers. A reference to a flip-flop cluster, a set of one or more independent flip-flops each being clocked by the same clock signal, also means a register cluster, a set of one or more independent registers each being clocked by the same clock signal. Conversely, a reference to a register herein also means a single flip-flop.

The terms enable signal and disable signal may also be used interchangeably herein in reference to the generation of gated clock signals. A gated clock signal is actively switching when it is enabled and is inactive when it is disabled from switching. Thus, a disable signal is the logical inverse of an enable signal and it is well known how to generate one from the other. Thus, the terms disable signal and enable signal may be used interchangeably herein when searching for signals that can be used to gate a clock signal at a clock gate.

Introduction

The embodiments of the invention include a method, apparatus and system for physically aware clock topology planning Clock topology planning (also referred to as clock tree planning) can be performed earlier with early physical information that is available from logic synthesis tools such that it can be performed in a physically aware manner and consider design trade-offs. With clock topology planning, the clock distribution network of clock signals is no longer viewed as a substantially idealized network.

Clock topology planning (CTP) determines placement of clock gates with respect to the flip flop placement (or register placement of a plurality of flip-flops) and what signals are used to generate enable signals to gate the clock gates that generate gated clock signals that clock the flip flops. One of the more significant goals of clock topology planning is to minimize power consumption by optimizing the generation of clock signals in the design integrated circuit. CTP uses an algorithm with models to provide estimates of power and timing at the front end of the design flow in order to optimize each and reduce power consumption while meeting timing requirements in the plan. The result of the CTP is the placement of key clock circuits (e.g., enable gates and clock gates) with respect to the registers and flip-flops of each functional block. While buffering clock signals to avoid timing skew and routing of the clock signals is important, the implementation is performed by clock tree synthesis after the clock topology plan is found to be acceptable. Buffers and routing that may be added to finalize the clock topology plan may be removed there-from.

Referring now to background FIG. 1A, previously placement of functional blocks (FB) 104A-104I in an integrated circuit 100 was performed prior to clock topology placement and routing as illustrated. Interconnect wire 108 of the data paths and control paths is routed between the functional blocks before there is any plan for a clock signal distribution network or clock network. Within the functional blocks, all the flip flops and registers in the circuit are placed. However, the clock distribution network from a clock source or clock generator 102 has yet to be planned, synthesized, placed and routed. A timing analysis may be performed on the data paths and control paths to determine the timing slack at the data inputs of the registers and flip flops within the blocks. Without any plan or synthesis of the clock network, a timing analysis of the clock network is not performed and it is assumed to be ideal clock distribution network.

Figure 1B:
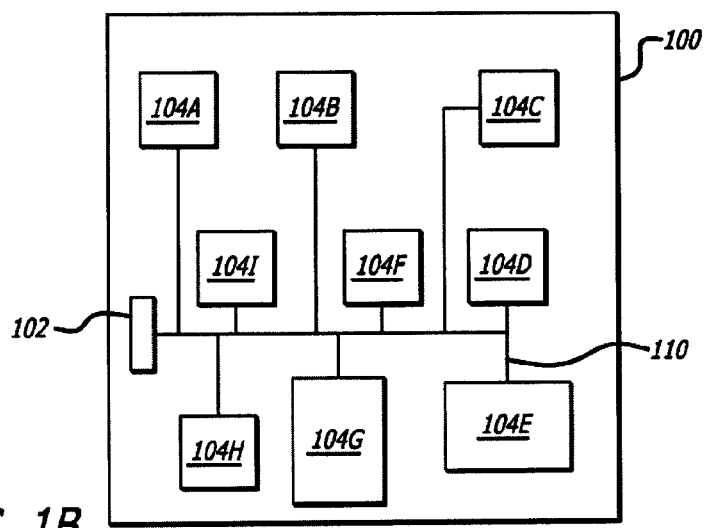
FIG. 1B illustrates global routing of a clock tree from a clock source to the respective functional blocks by interconnect wiring.

Referring now to background FIG. 1B, after the functional blocks have been synthesized, placed and routed, an idealized clock distribution network may be synthesized that distributes the clock signals to all the registers in the circuit (whose positions and timing data are already known). The clock tree is routed from a clock source 102 to the respective functional blocks 104A-104I by ideal interconnect wiring 110. However, the idealized clock distribution network that is initially placed and routed ignores clock timing issues of the clock distribution network. In an ideal circuit, the clock source 102 and the clock signal coupled into each register experience no timing delay. Any timing analysis performed with the idealized clock distribution network is not going to accurately depict the resultant real or non-ideal clock distribution network. In the backend of the design, the initial idealized clock distribution network is ripped up and the real clock distribution network is re-synthesized, placed, and routed. With the functional blocks 104A-104I in their optimized placement with optimized routing, the synthesis of the clock distribution network is an afterthought where some sub-optimal decisions with respect to the clock network may be made.

Figure 1C:
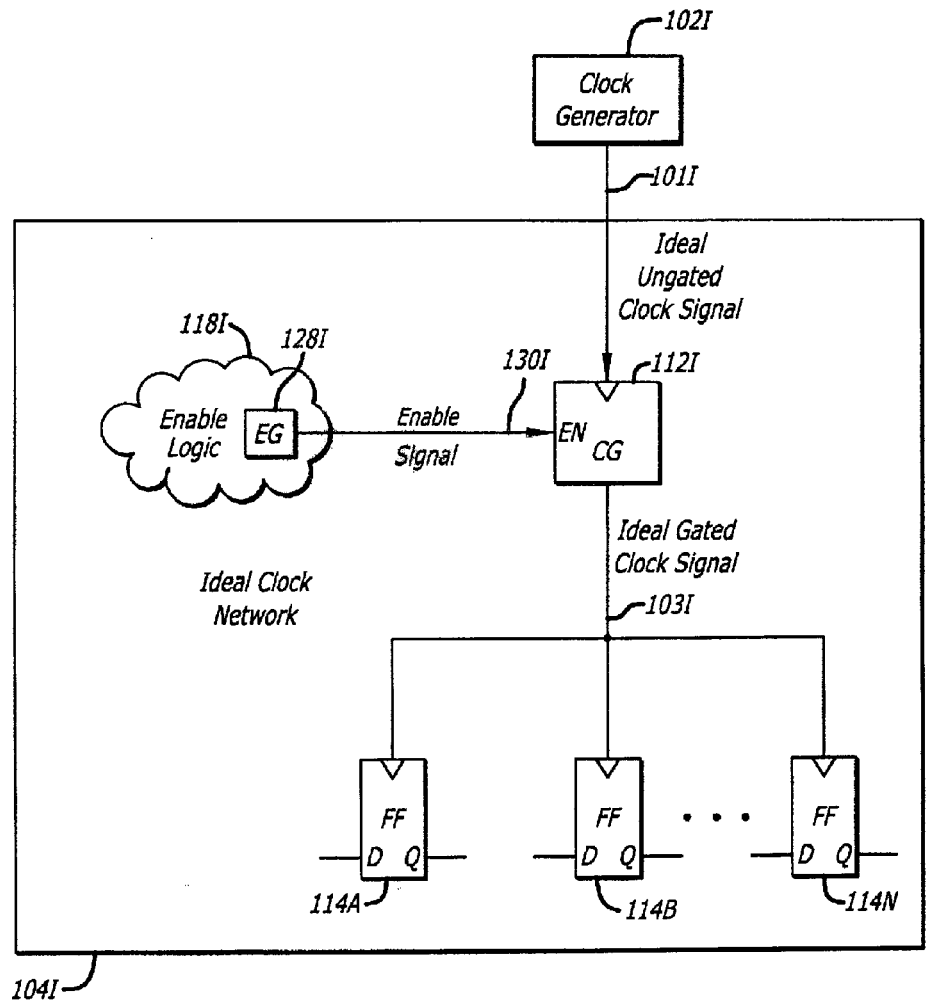
FIG. 1C illustrates a functional block diagram of an idealized clock subtree into a functional block.

Referring now to FIG. 1C, an exemplary idealized clock distribution network in the functional block 104I coupled to an idealized clock generator 102I is illustrated. The ideal clock generator 102I generates an ideal ungated clock signal 101I that is coupled into the ideal functional block 104I. Within the functional block 104I, the clock signal 101I is gated by a clock gate 112I to generate an ideal gated clock signal 103I in response to an enable signal 130I. The ideal gated clock signal 103I is coupled into the clock inputs (also referred to as a clock sink) of registers 114A-114N comprising one or more D flip flops.

The enable signal 130I is generated by enable logic 118I that includes at least one enable gate 128I. The enable signal is not generated by the clock circuitry. Thus, the enable signal does have timing delay associated with it in the front-end design flow when the clock network is treated to be ideal. The enable signal has a setup check with the ideal clock. With the enable timing delay, the slack of the enable signal at the clock gate 112I is not always zero. The delay from the clock gate output to the FF clock input pin is zero in the ideal circuit 104I. The delay from the clock gate output to the FF clock input pin is not traditionally accounted for in the front-end. Thus, the timing of the enable signal, despite the enable setup check, is not accurate in the front-end with the ideal circuit 104I. In the embodiments of the invention, clock topology planning estimates the delay from the CG output pin to the clock input pin of the flip flop. This estimated delay is added to the setup requirements of the enable pin so that a clock signal is assured to arrive at the clock input pin of the flip flop within a clock period. Note that the delay from the ideal clock generator 102I to the FF (e.g. flip flop 114B) is still zero timing delay in the ideal circuit 104I.

In an ideal clock tree network, there is little to no information as to how the clock tree network will be physically laid out into an integrated circuit design to provide clock signals to the clocked elements so they are clocked to store data. There is little to no information of where clocked elements such as flip flops are placed. There is little to no information as to how the clock signal paths are routed to the clock inputs of the clocked elements.

With an idealized clock tree network with idealized clock timing, a lack of transparency into the physical clock design can lead to poor implementations of clock gating. With an ideal circuit, the mapping of circuitry for the enable logic 118I is dictated by timing criticality that can effect of power consumption and circuit area that typically are not considered. Furthermore, because physical placement is not accounted for, the clock enable timing endpoint is traditionally fixed relative to the ideal clock signal 101I. Thus, the effects of long clock wires may not be considered.

In reality, timing delays and signal skew are introduced into the gated clock signal before it reaches the clock input to a clocked element such as a flip flop or register. The timing delays and signal skew of a clock signal may be from a number of factors.

Figure 1D:
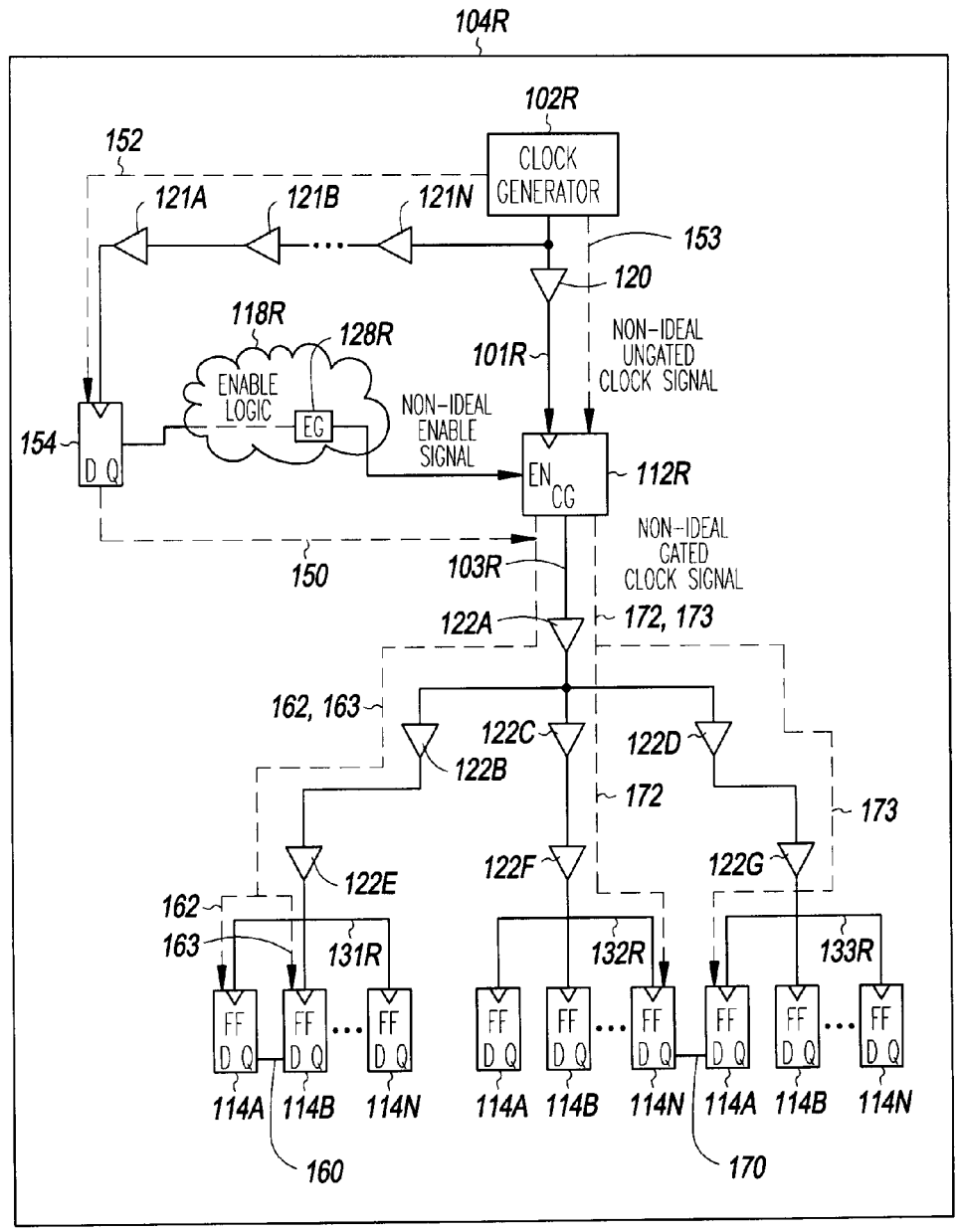
FIG. 1D illustrates a functional block diagram of a non-idealized clock subtree into a functional block.

Referring now to FIG. 1D, instead of an idealized clock circuit, an exemplary real or non-idealized clock circuit is shown. A real or non-ideal clock generator 102R has a real or non-ideal ungated clock signal 101R coupled into a real or non-ideal functional block 104R. Initial timing delay from the ideal clock signal may be from one or more external clock buffers 120 that introduce some timing skew into the non-ideal ungated clock signal 101R at the clock input of the clock gate 112R.

Within the functional block 104R, an exemplary clock subtree is shown including real or non-ideal enable logic 118R, a real or non-ideal clock gate 112R, a plurality of real or non-ideal clock buffers 122A-122G, and a plurality of clock sinks in the clock signal paths. The clock sinks are the clock inputs of the sets of the plurality of flip-flops or registers 114A-114N. The clock gate 112R may be an AND gate, NAND gate, OR gate, NOR gate, or multiplexer with one input coupled to a clock signal and the other coupled to a steady state logic one or logic zero. The clock gate may also be a part of a clock gating type of integrated cell from a standard cell library or a combination of a latch and standard cell gates.

In the enable signal path 150, the circuit 104R includes enable logic 118R including the enable gate 128R. The source of the enable signal may be generated by the flip flop 154. The enable signal path 150 has an enable path delay EP for which timing delay may vary depending upon the worst case parameters ($EP_{max}$) or best case parameters ($EP_{min}$). The flip flop 154 may be clocked by an ungated clock signal generated by the clock generator 102R that has been buffered by one or more clock buffers 121A-121N. This clock signal path forms a launch enable path 152 with a launch timing delay L for the enable signal. The clock signal path from the generator 102R to the clock input of the clock gate 112R, forms a capture enable path 153 with a capture timing delay C. With the clock period T and the timing values EP, L, and C; setup and hold constraints for the enable signal 130R at the clock gate 112R can be formulated.

Enable Setup Constraint: $L+EP_{max}<T+C$

Enable Hold Constraint: $L+EP_{min}>C$.

For setup, the sum of the launch timing delay L along the launch path 152 and the maximum of the enable path delay EPmax along the signal path 150 should be less than the sum of the clock period T and capture timing delay C along the capture path 153. Rearranging the setup equation, we can formulate an equation for Setup slack at the clock gate 112R as follows:

Enable Setup Slack: $L+EP_{max}-T-C=$Setup slack

If the enable setup slack is positive, there is margin in the enable signal arrival time at the enable input terminal to the clock gate. When there is positive slack in the enable signal path at a clock gate, buffers and clock-gates can be inserted below it in lower levels of clock tree hierarchy. If the enable setup slack is negative, the clock gate 112R will not properly function to generate the gated clock signal 103R. Negative slack indicates that the enable signal cannot arrive on time and that there is less time than required in the enable path. In which case, enable signal path needs to modified or the clock gate removed.

With positive enable setup slack, the timing amount (e.g., +100 ps) may be used to determine whether or not to merge clock subtrees below the clock gate 112R. One may assume that the clock gate 112R is enabled in advance by this amount so that it can be used for additional timing delay below the clock gate in the clock path. Additional clock gates or clock buffers may be inserted up to this amount, but not over. If a potential merger adds more delay in the clock path than this amount, it should be discarded. If no further potential merger falls within the slack timing value, they all exceed it, no further mergers should occur below the given clock gate 112R. At the point where no more subtrees can be merged, the clock gate for the given subtree needs to be inserted, as long as the insertion of the clock gate saves power. If insertion of the clock gate does not conserver power, it is not inserted.

Initial timing delay from the ideal clock signal may be from one or more external clock buffers 120 that introduce some timing skew into the non-ideal ungated clock signal 101R. Within the functional block 104R, the clock signal 101R is gated by a real or non-ideal clock gate 112R to generate a non ideal gated clock signal 103R in response to a real or non-ideal enable signal 130R.

Before being coupled into the clock input terminals of one or more registers or D flip-flops 114A-114N, the real or non-ideal gated clock signal 103R may be split up and buffered by one or more clock buffers 122A-122G to form the buffered gated clock signals 131R-133R. The buffered clock signals 131R-133R may be skewed from each other by timing differences in the one or more clock buffers 122A-122G.

Timing setup of the enable signal 130R at the enable input of the clock gate 112R is relative to the arrival of the non-ideal ungated clock signal 101R at the clock gate 112R. The real or non-ideal enable signal 130R is generated by real or non-ideal enable logic 118R comprising of at least one real or non-ideal enable gate 128R.

The gated clock signals 131R-133R coupled into the clock inputs of the registers experience timing delay from various sources. As mentioned herein, one such source of delay may be from one or more external clock buffers 120 that introduce some timing skew. Various launch and capture clock paths may be formed for data that is coupled between clocked elements of a clock subtree.

For example, in FIG. 1D, flip flops 114A-114B may be coupled together such that a data path 160 forms between Q output of the flip flop 114A and D input of flip flop 114B. A launch clock path 162 is formed from the clock gate 112R to the clock input of the flip flop 114A with a launch timing L. A capture clock path 163 is formed from the clock gate 112R to the clock input of the flip flop 114B with a capture timing C. Along the data path 160, there is a data path delay DP for which timing delay may vary depending upon the worst case parameters ($DP_{max}$) or best case parameters ($DP_{min}$). The difference between the launch clock path 162 and the capture clock path 163 is minimal so there would be a minimal amount of timing skew between each expected.

However as another example, consider the flip flops 114N and 114A being coupled together such that a data path 170 forms between Q output of the flip flop 114N and D input of flip flop 114A. A launch clock path 172 is formed from the clock gate 112R to the clock input of the flip flop 114N with a launch timing L. A capture clock path 173 is formed from the clock gate 112R to the clock input of the flip flop 114A with a capture timing C. Along the data path 170, there is a data path delay DP for which timing delay may vary depending upon the worst case parameters ($DP_{max}$) or best case parameters ($DP_{min}$). The difference between the launch clock path 172 and the capture clock path 173 is more substantial so that so there could be some timing skew between each if the clock signal paths are not balanced. The embodiments of the invention, try to balance out clock paths at each merger point down to all the clocked elements (balance out insertion delay d) below it so as to try and minimize such timing skew across all clocked elements at a given level.

With the clock period T and the timing values DP, L, and C; a setup constraint for data signals on the data paths 160,170 at the input to the flip flops 114B,114A can be formulated as follows:

Data Setup Constraint: $L+DP_{max}<T+C$

For setup, the sum of the launch timing delay L along the launch path 162,172 and the maximum of the data path delay DPmax along the data signal path 160,170 should be less than the sum of the clock period T and capture timing delay C along the capture path 163,173. Rearranging the setup equation, we can formulate an equation for setup slack at the flip flop as follows:

Data Slack: $L+DP_{max}-T-C$=slack

Note that the difference between L and C of the launch and clock paths is a function of timing balance in the clock subtree. If equal, they difference is zero and then the slack is a function of $DP_{max}$-T. Timing balance in the clock subtree can be accomplished by appropriate physical placement of the clock gates, enable gates, clock buffers, clocked elements as well as the insertion of clock buffers.

Note that if there is slack timing available at the enable input to the clock gate 112R, (e.g., +300 ps), then additional buffers and clock gates can be inserted into the clock signal path up to that timing amount between the clock gate 112R and the flip flops 114A-114N or other lower level clocked elements. Insertion of additional clock buffers and clock gates may reduce power consumption, which is desirable. Buffers can conserver power if signal slew of a clock signal is improved in a clock path. Clock gates can conserve power by reducing the frequency of switching in clocked circuits in lower levels of the clock tree hierarchy.

Locally within each functional block, timing skew and/or delay in the clock signal may be introduced by the generation of the real or non-ideal enable signal 130R. The enable logic 118R, such as the enable gate 128R, introduces delay and/or timing skew into the real or non-ideal gated clock signal 130R. Timing setup of the enable signal 130R at the enable input of the clock gate 112R is relative to the arrival of the non-ideal ungated clock signal 101R at the clock gate 112R. It is desirable that the slack of enable signals at the input to a clock gate is greater than zero. If so, this positive slack time can be utilized as much as possible to push clock buffers down the clock tree hierarchy to a lower level below the given clock gate The enable signal 130R may have skew as may the non-ideal clock signal 101R. The real or non-ideal clock gate 112R has some timing delay associated with it before a gated clock output signal is generated. These are local sources of timing delay and skew that may be added to the non-ideal gated clock signal 130R generated by a clock gate.

Furthermore, the capacitive load of the clock inputs of the registers may be too much for the clock gate to drive the non-ideal gated clock signal 130R into them. The capacitive load may be split up and buffered by one or more clock buffers 122A-122G. Locally, the one or more clock buffers 122A-122G may be another source of timing delay and timing skew in the clock signals 131R-133R before the registers 114A-114N are clocked thereby.

The clock buffers 122A-122G when inserted to buffer the clock signal add an insertion delay to the clock signal 131R-133R that clock the registers. Relative to the clock period of the clock clocking the registers 114A-114N, the insertion delay may have a large variance depending upon the clock topology and the fanout of the clock subtree.

Corrections to improve performance of a clock subtree may be made by various means such as by removing gates in the enable and/or clock paths, cloning gates to reduce loads, remapping the enable logic and insertion of clock gates, insertion of clock buffers, and sizing of clock gates and clock buffers.

It is desirable to plan and synthesize the clock tree network to take into account the reality of a non-ideal clock network that extends into the one or more functional blocks of an integrated circuit design.

Figure 1E:
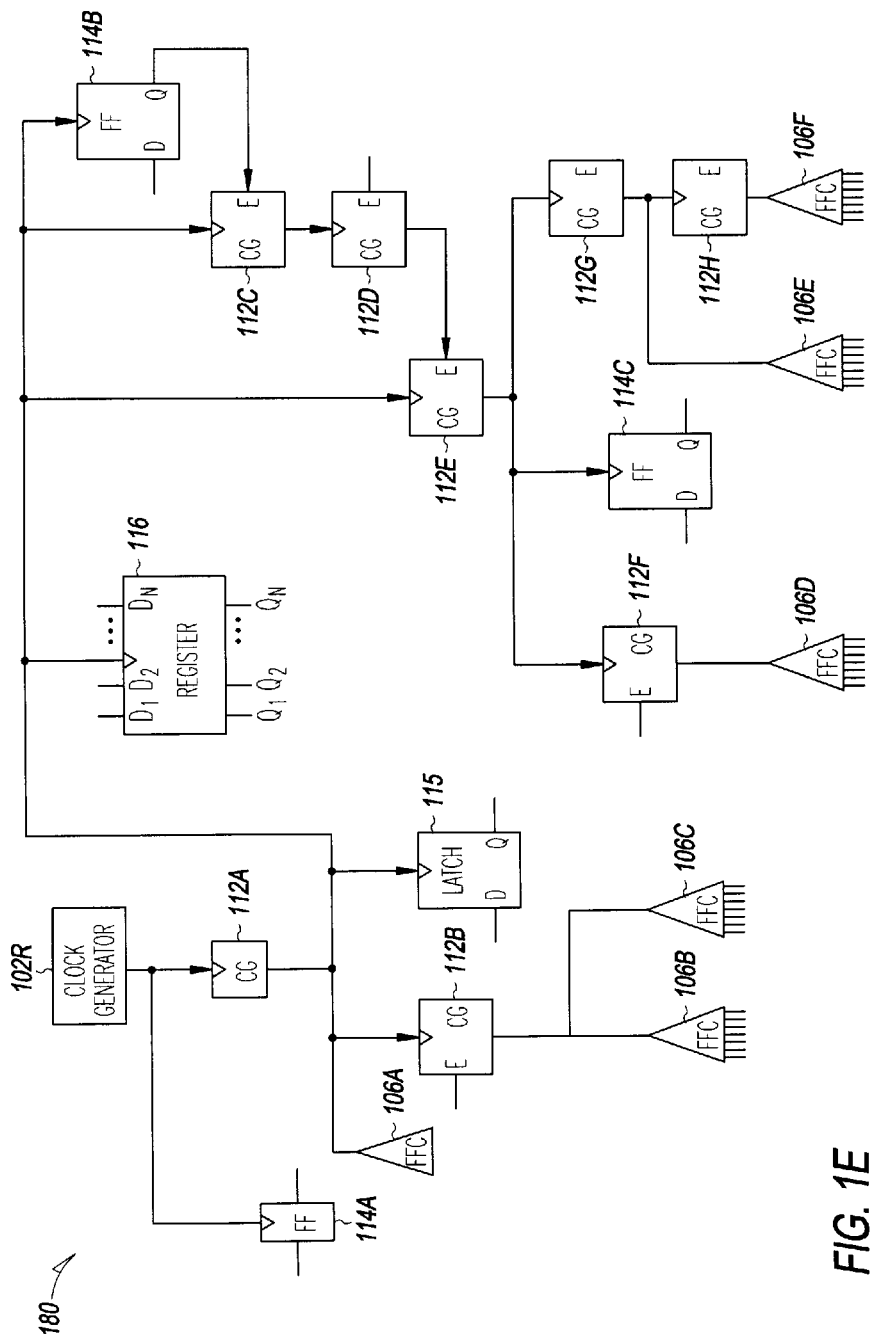
FIG. 1E illustrates a functional block diagram of an exemplary clock tree from clock generator to clocked elements at lower levels of clock tree hierarchy.

Referring now to FIG. 1E, an exemplary clock tree circuit 180 with some complexity is illustrated. The clock tree circuit 180 includes a clock generator 102R, clock gates 112A-112H, and clocked elements including flip-flops 114A-114C, flip-flop clusters 106A-106F, latch 115, and register 116, coupled together as shown. The clock tree circuit 180 has multiple levels (e.g., seven levels) of clock tree hierarchy from the clock generator 102R at the top level to the flip flop cluster 106F and its clocked flip flops at the lowest level. Embodiments of the invention operate bottoms up on clock trees such as that illustrated in FIG. 1E, from the lowest level of clock tree hierarchy (e.g., flip flops in the flip flop cluster 106F) up to the clock source (e.g., the clock generator 102R).

The clock tree circuit 180 includes multiple levels of clock gates in the clock tree hierarchy. For example, flip flop cluster has four levels of clock gates between the output terminal of the clock generator 102R and the clock inputs or clock sinks of the flip flops in the flip flop cluster 106F. Moreover the output of clock gate 112D is an enable input to clock gate 112E that further complicates timing matters in the clock tree circuit. The worst case delay from the clock generator to a clock input may be those clocked elements that are physically placed far away, have a large number of gates in clock/enable paths, overload a clock buffer, or a combination of each.

The clock tree circuit 180 includes quite a few clock circuits in the enable and clock paths. If redundant clock circuits can be removed from the clock tree circuit 180, switching energy may be conserved when clock signals switch and non-switching power may be conserved over time regardless.

Clock Topology Planning for Clock Tree Synthesis

Figure 2:
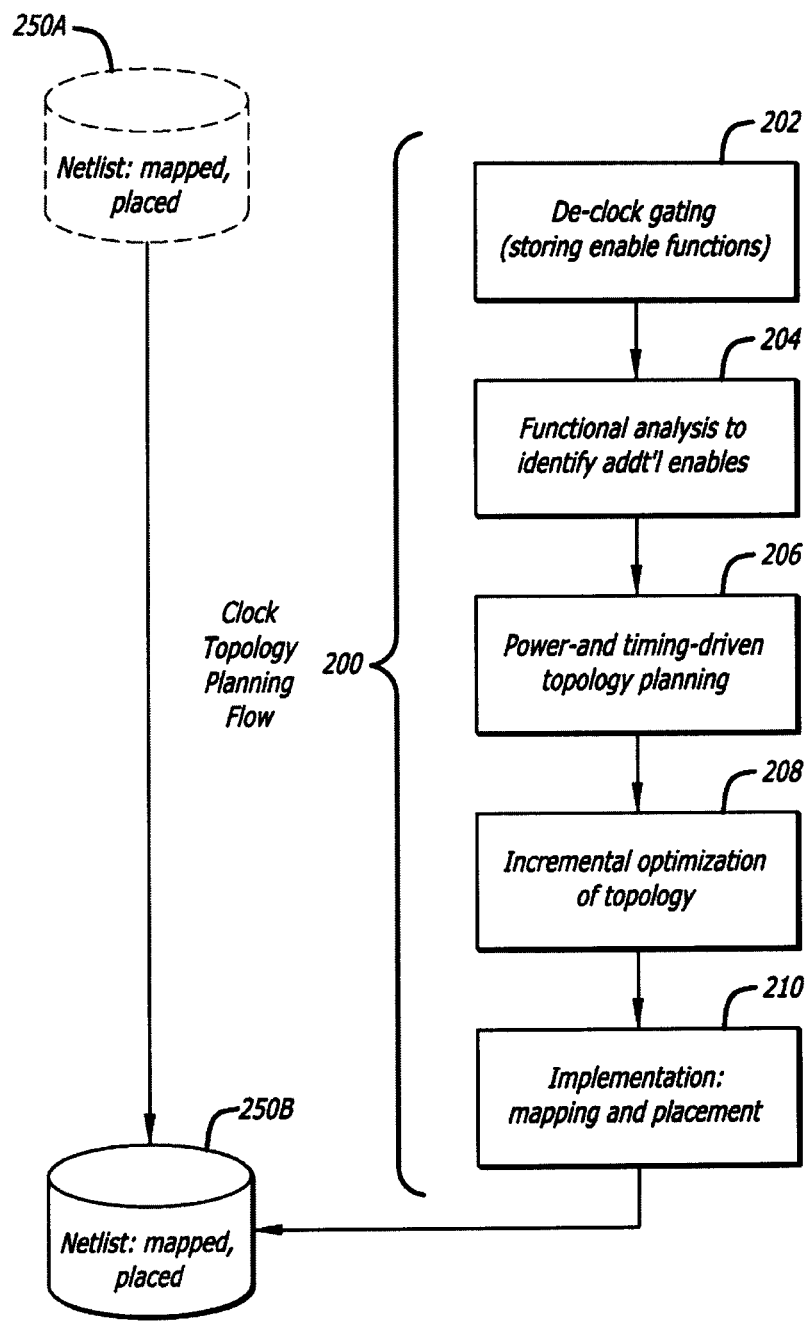
FIG. 2 is an exemplary flow diagram of physical clock topology planning.

Referring now to FIG. 2, an exemplary flow diagram of clock tree synthesis 200 is illustrated. The position of block 250A above clock tree synthesis 200 illustrates the logic of an integrated circuit design, but for clock signal logic, being synthesized (mapped and placed) before the clock tree synthesis 200 occurs. The embodiments of the invention allow clock tree synthesis 200 to occur in conjunction with or even prior to the logic synthesis of the functional logic (e.g., data path logic and control logic) of the integrated circuit design. This is illustrated by block 250A moving down to be even with the implementation process 210 in the clock tree synthesis flow 200.

Prior IC design methodologies performed clock tree synthesis (CTS) as part of the implementation flow after the rest of the IC design had been synthesized and placed. In this case, there is little to no visibility into the effects of design choices on clock synthesis—despite the fact that decisions made early in the IC design flow may have significant consequences on the subsequent timing closure and power closure during the design of the clock tree to generate the clock signals for functional blocks.

Clock topology planning or clock tree planning (CTP) with the assistance of a GUI can occur earlier in the IC design flow so that the characteristics of the clock distribution network and its related components are better understood so that problems faced in the prior art may be avoided. In FIG. 2, this is illustrated by the block 250A moving towards the position of block 250B along the processes of clock tree synthesis 200.

The clock tree planning GUI is described in detail in U.S. Provisional Patent Application No. 61/732,284 filed on Nov. 30, 2012 by inventors Ankush Sood, et al and in U.S. patent application Ser. No. 13/839,769, entitled GRAPHICAL USER INTERFACE FOR PHYSICALLY AWARE CLOCK TREE PLANNING filed by Ankush Sood et al. on the same date herewith, both of which are incorporated herein by reference. The clock tree planning GUI may be used to view the clock topology plan provided by the embodiments described herein in advance of clock tree implementation so that the performance, power consumption, or other desired characteristics of the clock tree may be improved when the clock tree plan is finally implemented as a physical layout.

Clock topology planning, also referred to as clock tree planning, is a framework to provide early estimation and optimization of a clock network that generates clock signals within an integrated circuit design. The focus during clock tree planning is on the topology of the clock network, the functionality of the clock network, and placement of clock gates, enable gates, buffers, and flip-flops to balance timing to the flip-flops and meeting power and timing requirements.

Power consumption in an integrated circuit can be greatly influenced by a clock network. If there are accurate estimates of the distributional elements in a clock tree, a more accurate estimate of the parasitic capacitance that is switched may be had. Furthermore, a determination may be made as to whether or not the insertion of a particular clock gate to generate a clock signal will yield a net power savings and should be implemented or rejected.

In the physical domain, clock gating can be driven by the placement of the clock sinks, such as the placement of the latches, flip-flops, and registers. Cloning, the act of duplicating circuits to generate a clock signal, can be effective to partition the total capacitance of the fan-out for the purpose of reducing power or improving timing. Merging, the act of removing duplicate circuits and adding additional clock sinks to another signal, can be used to remove extra clock gating elements and shield more buffers in the clock tree and possibly improve power consumption.

An estimate of the relative insertion delays at clock gate clock inputs versus flip-flop inputs can be generated early. The early estimate of relative insertion delays allows enable functions to be modified, remapped, or rejected based upon the timing slack in an enable path.

A modification for example is to select for some reason a different function that may be a more active function with less power efficiency. Traditionally, logic synthesis of the clock tree network is complete such that modifications cannot be made. Cloning, a modification to the clock tree network, may also be used to reduce the per-driver load and buffering delay to the clock sink, thereby allowing the enable signal to arrive later in the clock cycle but still meet timing requirements. Modifications to the clock tree network allows the enable logic network to be mapped without overly critical enable paths, thereby reducing the area and power consumption of the clock tree network.

In FIG. 2, clock topology planning 200 includes the processes of de-clock gating 202, a functional analysis process 204, a clock tree topology planning process 206, an incremental optimization process 208, and an implementation process 210.

During the de-clock gating process 202 the enable functions that are used to generate gated clock signals are identified and stored in a clock tree planning data base.

During functional analysis 204, the RTL logic of the IC design is analyzed to identify additional feasible enable or disable signals that may be used to generate gated clock signals.

During the clock tree planning process 206, an initial placement of enable gates, clock gates and flip-flops forming flip-flop clusters may be performed. Embodiments of the clock tree planning GUI may be used to evaluate the initial placement and make changes as may be desired. Routing of clock signals may be estimated with air lines by the using the X and Y coordinates for the placement of the enable gates, clock gates, and the clocked elements (e.g., the flip flops, registers, and latches).

During the incremental optimization process 208, the clock tree topology is incrementally optimized in response to changes that are desired from the topology planning process 206.

During the implementation process 210, the clock tree topology is mapped into the gates (e.g., the enable gates, clock gates, buffers, and flip-flops) that are also placed into the layout of the integrated circuit design.

Clock Circuit Optimization Methods

One of the goals of the clock topology planning process is to reduce power consumption while at the same time meeting clock timing requirements. There are a number of ways a circuit may be optimized to meet both.

Figure 3A:
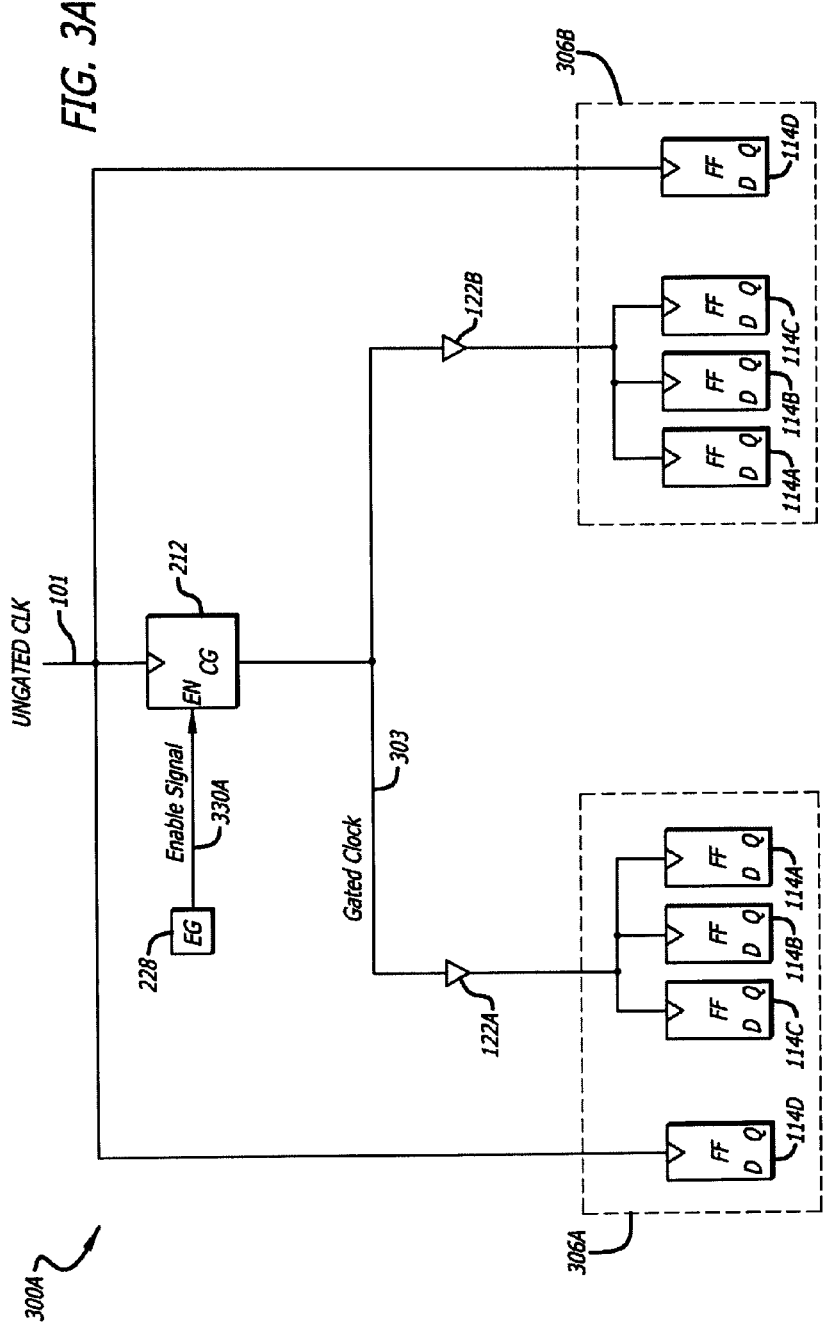
FIGS. 3A-3B are exemplary clock subtree circuits to illustrate optimization by clock gate cloning.

Referring now to FIG. 3A, a clock subtree 300A is illustrated. Clock subtree 300A includes an enable gate 228, a clock gate 212, clock buffers 122A-122B, and sets or clusters 306A-306B of flip-flops 114A-114D. Flip-flops 114A-114C in each flip-flop cluster are clocked by the gated clock signal 303. Flip-flop 114D in each flip-flop cluster is clocked by the ungated clock signal 101. The clock gate 212 generates the gated clock signal 303 in response to the ungated clock signal 101 and the enable signal 330A.

In this implementation of clock gating, the gated clock signal 303 generated by the lone clock gate 212 is shared by all the flip-flops that can be gated in the subtree. Flip-flop 114D in each flip-flop cluster 306A-306B cannot be gated and remains clocked by the ungated clock signal 101. With such a large fan out extra capacitive loading is placed on the clock buffers 122A-122B and the clock gate 212. Moreover, there may be significant cross-overs when routing the ungated clock signal 101 and the gated clock signals that adds further parasitic capacitance loading. With traditional synthesis, the clock buffers may be cloned in a non-physical manner, for example, such as by hierarchy or an arbitrary manner up to the maximum fan out constraints. This can result in a poor implementation of clock gating and the generation of gated clock signals within a clock subtree.

Figure 3B:
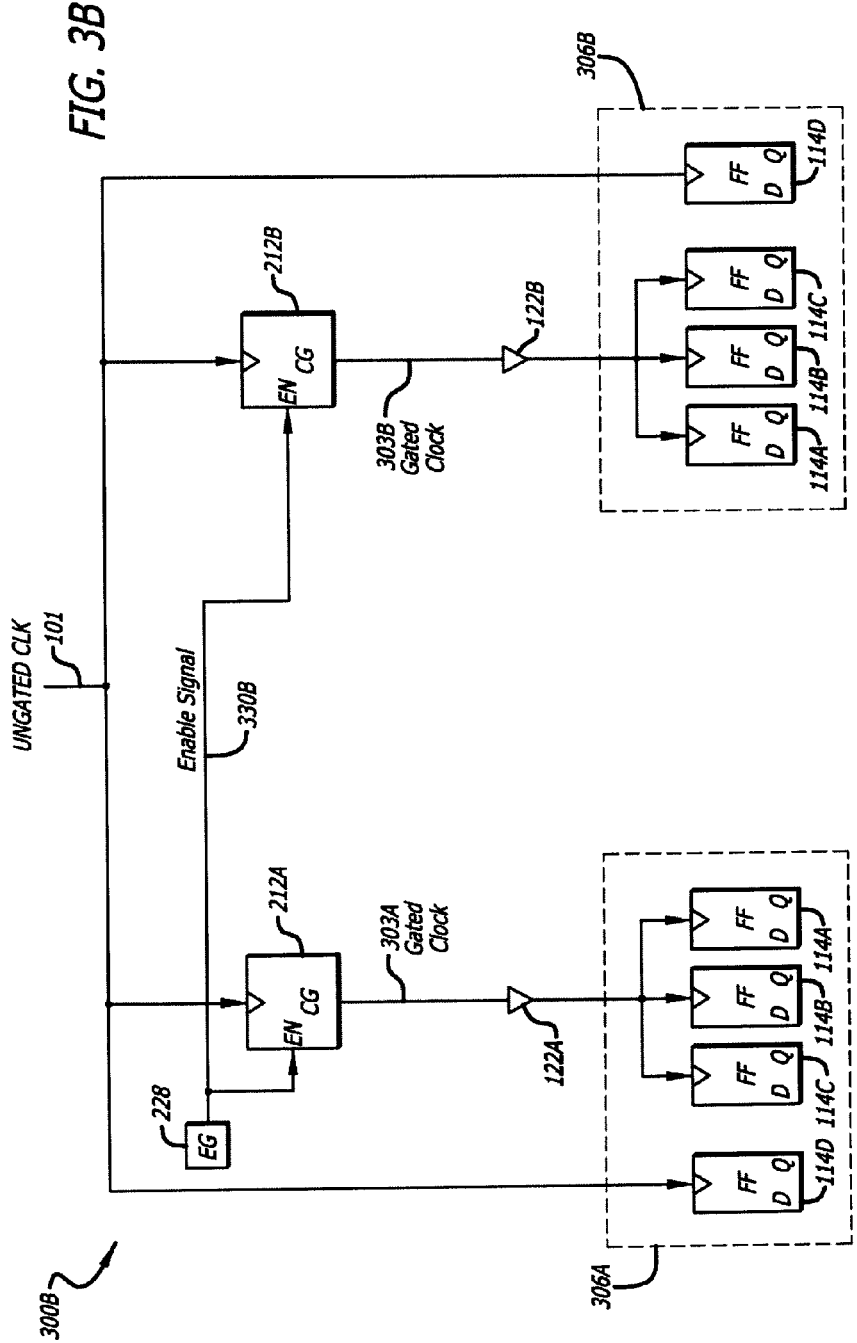

Referring now to FIG. 3B, one method of optimization of the clock circuitry within a clock subtree circuit 300B is illustrated. In FIG. 3B, the clock gate 212 of FIG. 3A has been cloned such that there are now 2 clock gates 212A-212B. An enable signal 330B is coupled into the enabled inputs of each of the clock gates 212A-212B. Each of the clock gates 212A-212B generates the gated clock signal 303A-303B, respectively. The gated clock signals 303A-303B are coupled into the clock buffers 122A-122B, respectively. The gated clock signal 303A clocks the flip-flops 114A-114C in the flip-flop cluster 306A. The gated clock signal 303B clocks the flip-flops 114A-114C in the flip-flop cluster 306B. The ungated clock signal 101 remains coupled into flip-flop 114D of each flip-flop cluster 306A-306B. In this manner, the switching power of the clock subtree may be reduced by the clock gate cloning and reduced overlap of fan out load at the cost of an added clock gate.

Enable logic that generates the enable signals for the clock gates in the clock subtrees may need to meet timing constraints for the enable signal. One such constraint in the generation of the enable signal may be a slack timing requirement on the enable signal path from the enable gate to the clock gate. This may limit the placement of the clock gate in the highest location in the topology of the clock subtree. Additionally, a timing constraint on the enable signals forces a timing driven cloning of the clock gates, or alternatively, a removal of the clock gate and formation of an ungated implementation by recycling the data in the data path.

Figure 4B:
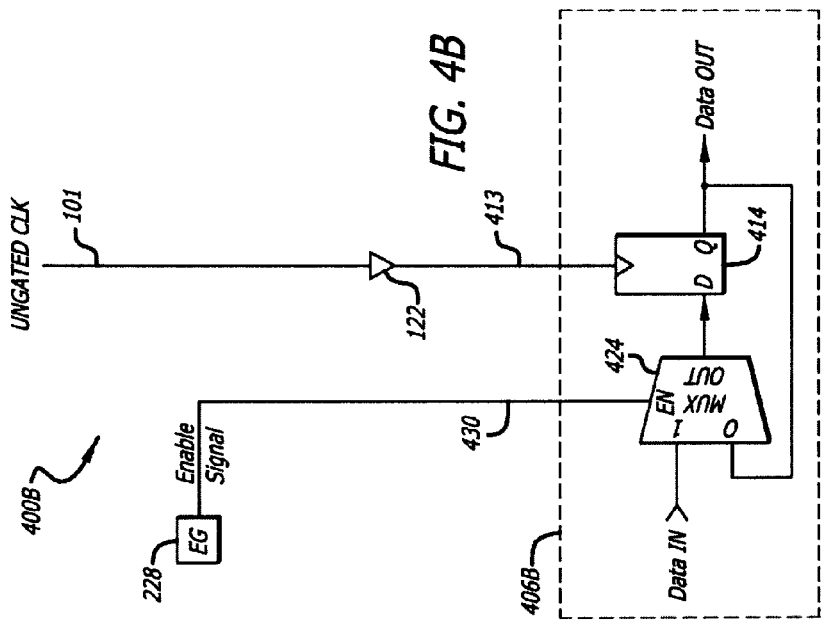
FIGS. 4A-4B are exemplary clock subtree circuits to illustrate optimization by elimination of clock gating and use of data recirculation in the date path.
Figure 4A:
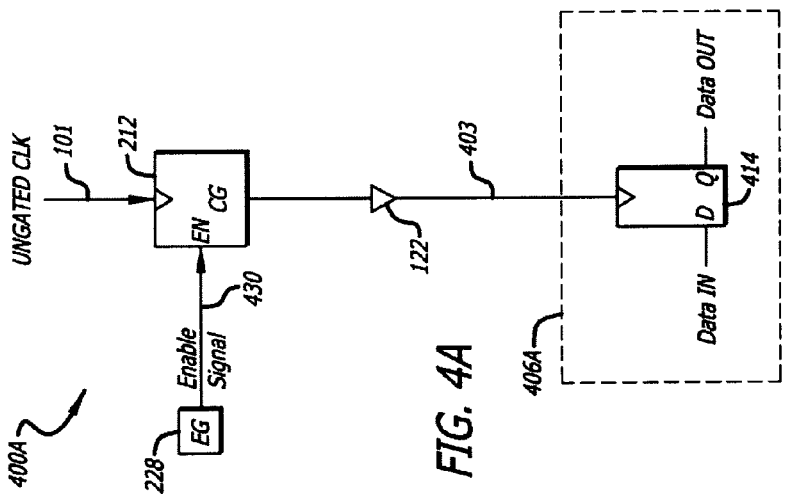

Reference is now made to FIGS. 4A-4B. In FIG. 4A, a clock subtree circuit 400A is illustrated including a clock gate 212 receiving the ungated clock signal 101 and enable signal 430, a clock buffer 122, and a flip-flop 414 within a flip-flop cluster 406A. The clock gate 212 receives the ungated clock signal 101 and the enable signal 430 to generate the gated clock signal 403. The flip-flop 414 has a data input D to receive data and a data output Q to drive out a data signal from the flip flop.

Timing constraints on the enable signal 430 may be so restrictive that the implementation of the clock gate 212 cannot be used to reduce power consumption and generate the gated clock signal to clock the flip-flop 414. Instead, data output from the flip-flop 414 may be recycled back to its data input so that the state of the flip flop doesn't switch and change state when it is clocked.

In FIG. 4B, a clock subtree circuit 400B is illustrated. The clock subtree circuit 400B is an ungated clock subtree circuit in comparison with the clock subtree circuit 400A. The clock subtree circuit 400B has eliminated the clock gate 212 and introduced a multiplexor 424 coupled to the flip-flop 414. The multiplexor 424 can selectively recycle output data from the flip-flop's data output to data input. The enable signal 430 in this case is coupled into the enable input of the multiplexor 424. The ungated clock signal 101 is buffered by the clock buffer 122 to generate a buffered ungated clock signal 413. The buffered ungated clock signal 413 is coupled into the clock input of the flip-flop 414. In this manner the ungated clock signal 101 may be coupled into the clock input of the flip-flop 414 with less timing delay and less signal skew.

With the enable signal 430 selected to be a logical 0, the data output from flip-flop 414 is coupled into mux input 0 and selected to be output from the multiplexor 424. The data output of the flip-flop 414 is coupled back into the D input of the flip-flop 414. In this manner the data output is recycled back into the input of the D flip-flop 414 when it is clocked by the clock, the ungated clock signal 101. The state of the D flip-flop in this case does not change until the opposite input of the multiplexer 424 is selected. However, the flip flop 414 is still clocked by the clock signal 413 so that internal transistors may switch and some power consumed. The addition of the multiplexer will also consume some power, regardless. By gating the clock signal to ensure it does not reach the clock input, such as shown in FIG. 4A, switching of circuits in the flip flop is avoided to conserve power.

When the enable signal 430 is generated to be a logical 1, the data input coupled into the multiplexor 424 is selected to the output therefrom and coupled into the D input of the flip-flop 414. In this matter, new data may be registered by the D flip-flop 414 when it's clocked by the ungated clock signal 101. Subsequently, the enable signal 430 may change state back to a logical 0 so that once again the data output from the D flip-flop is recycled around from output to input, so that the flip flop doesn't change state when clocked again by the ungated clock signal 101. Thus, the ungated clock optimization of the clock circuit 400B may conserve power by being gated with the enable signal 430 while meeting timing requirements.

In FIGS. 3A-3B, cloning of a clock gate to partition the fan-out on the clock signal up into more manageable quantities was illustrated. A clock buffer may also be cloned to split up the fan out load of a plurality flip flops on a clock signal.

Figure 5B:
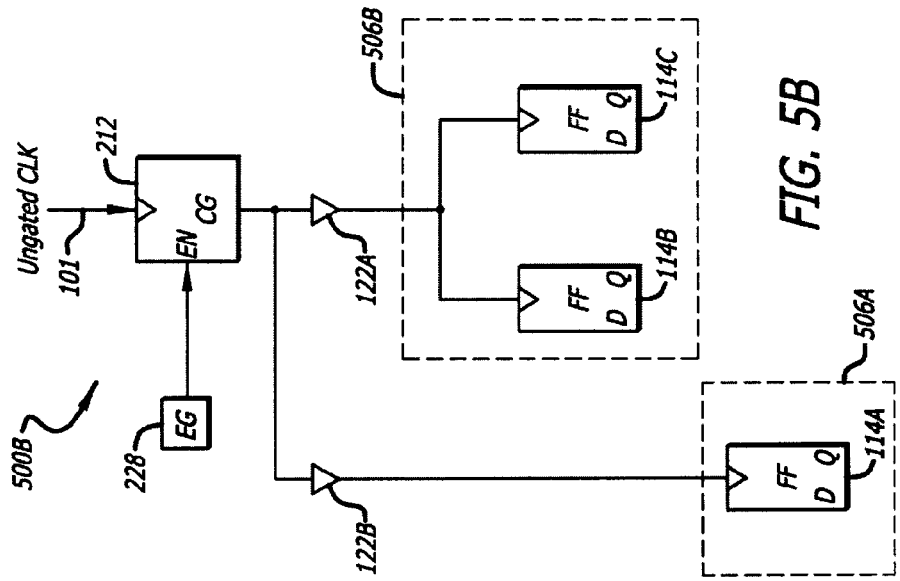
FIGS. 5A-5B are exemplary clock subtree circuits to illustrate optimization by clock buffer cloning.
Figure 5A:
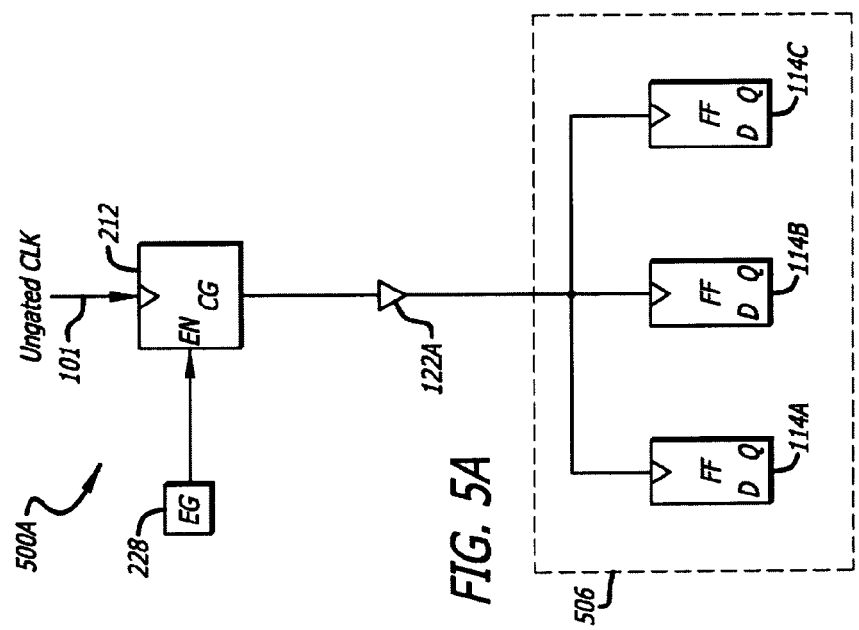

Reference is now made to FIGS. 5A-5B. In FIG. 5A, a clock subtree circuit 500A includes enable logic with an enable gate 228, a clock gate 212, a clock buffer 122A and a set or cluster 506 of clocked elements coupled together as shown. The cluster 506 includes flip-flops 114A-114C so it may be referred to as a flip-flop cluster.

The clock buffer 122A may experience too much capacitive load due to the fan out of the flip-flops 114A-114C and the additional wire routing. For example, the wire route from clock buffer 122A to flip flop 114A may be long adding to the capacitive load placed on the clock buffer 122A. To overcome this, the clock buffer 122A may be cloned and have the fanout of the flip-flops split up into different clusters 506A-506B so that the fan out load is divided up or partitioned amongst a plurality of clock buffers 122A-122B.

In FIG. 5B, a clock subtree circuit 500B is illustrated with the clock buffer 122A being cloned into an additional clock buffer 122B over that of the clock subtree circuit 500A. The inputs of the clock buffer 122A and the clock buffer 122B are coupled together and to the output of the clock gate 212. The output of clock buffer 122A is now coupled into the clock inputs of the flip-flops 114B-114C of the flip flop cluster 506B. The output of clock buffer 122B is coupled into the flip-flop 114A of the flip flop cluster 506A. It may be the case that the clock route of the signal from the clock buffer 122B to the flip-flop 114A is long with a large capacity of loading. In this manner, the flip flop cluster 506 of FIG. 5A is regrouped into a pair of flip flop clusters 506A-506B after the clock buffer is cloned.

Figures 5C, 5D:
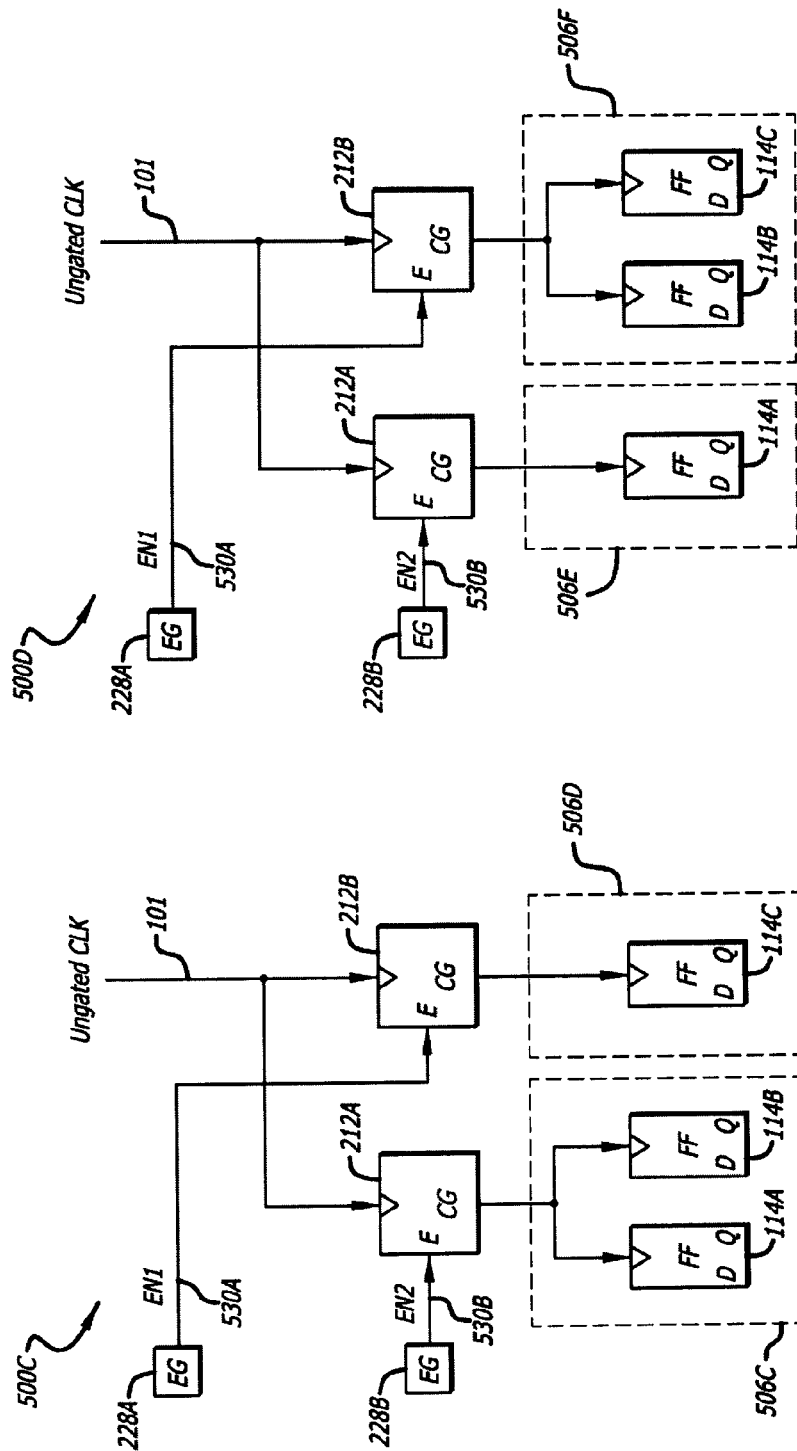
FIGS. 5C-5D are exemplary clock subtree circuits to illustrate optimization by rearranging clocked elements within clock gate clusters that have their clock signals gated by a clock gate.

Reference is now made to FIGS. 5C and 5D. FIGS. 5A and 5B illustrated how a clock buffer may be cloned and a flip-flop cluster divided up into the plurality of flip-flop clusters and driven by a pair of clock buffers. To meet timing requirements and better match fan out, the flip flop clusters may also be regrouped without cloning additional gates.

In FIG. 5C, a clock tree subcircuit 500C is illustrated including clock gates 212A-212B, enable gates 228A-228B, and flip-flop clusters 506C-506D. Flip-flop cluster 506C includes flip-flops 114A-114B having their clock inputs coupled to the output of the clock gate 212A to receive the gated clock signal. Flip-flop cluster 506D includes flip-flop 114C having its clock input coupled to the output of the clock gate 212B to receive a different gated clock signal. Enable signal EN1 530A is coupled to enable input of clock gate 212B. Enable signal EN2 530B is coupled to the enable input of clock gate 212A. It may be determined that to reduced power consumption and/or improve timing to meet a timing constraint that the flip-flops could be rearranged in their flip-flop clusters and be appropriately clocked by the gated clock signals. For example, consider that it was feasible to gate the clock signal to flip flop 114B by either enable signal EN 1 or enable signal EN2.

In FIG. 5D, a clock subtree circuit 500D is illustrated. In the clock tree subcircuit 500D, the flip-flop 114A of the flip-flop cluster 506E is clocked by the same gated clock 212A and its gated clock signal as in clock subtree circuit 500C of FIG. 5C. However, the flip-flop 114B is no longer clocked by the clock gate 212A. Instead flip-flops 114B and 114C are now included in the flip-flop cluster of 506F. Because flip flop 114B could have a gated clock signal gated by either the enable signal EN1 or enable signal EN2, both flip-flop 114B and 114C can be clocked by the gated clock signal generated by the clock gate 212B. It may be advantageous to regroup clocked elements in different clusters so as to reduce power consumption and meet a timing constraint. Thus, a regrouping of clocked elements (e.g., flip-flops) within different clusters (e.g., the flip flop clusters) may be another technique that is used to optimize timing and/or power consumption during the clocked topology planning of each clock subtree within an integrated circuit design.

For timing optimization it is desirable to avoid highly asymmetric clock tree topologies. If a clock subtree topology is asymmetric, it may clock the flip-flops in the flip-flop clusters at different times such that an output coupled into another input of these flip-flops may have a race condition and result in a non-functioning circuit. It is desirable to balance out asymmetric clock tree topologies whenever possible. However, it may cost additional power to do so.

Figures 6A, 6B:
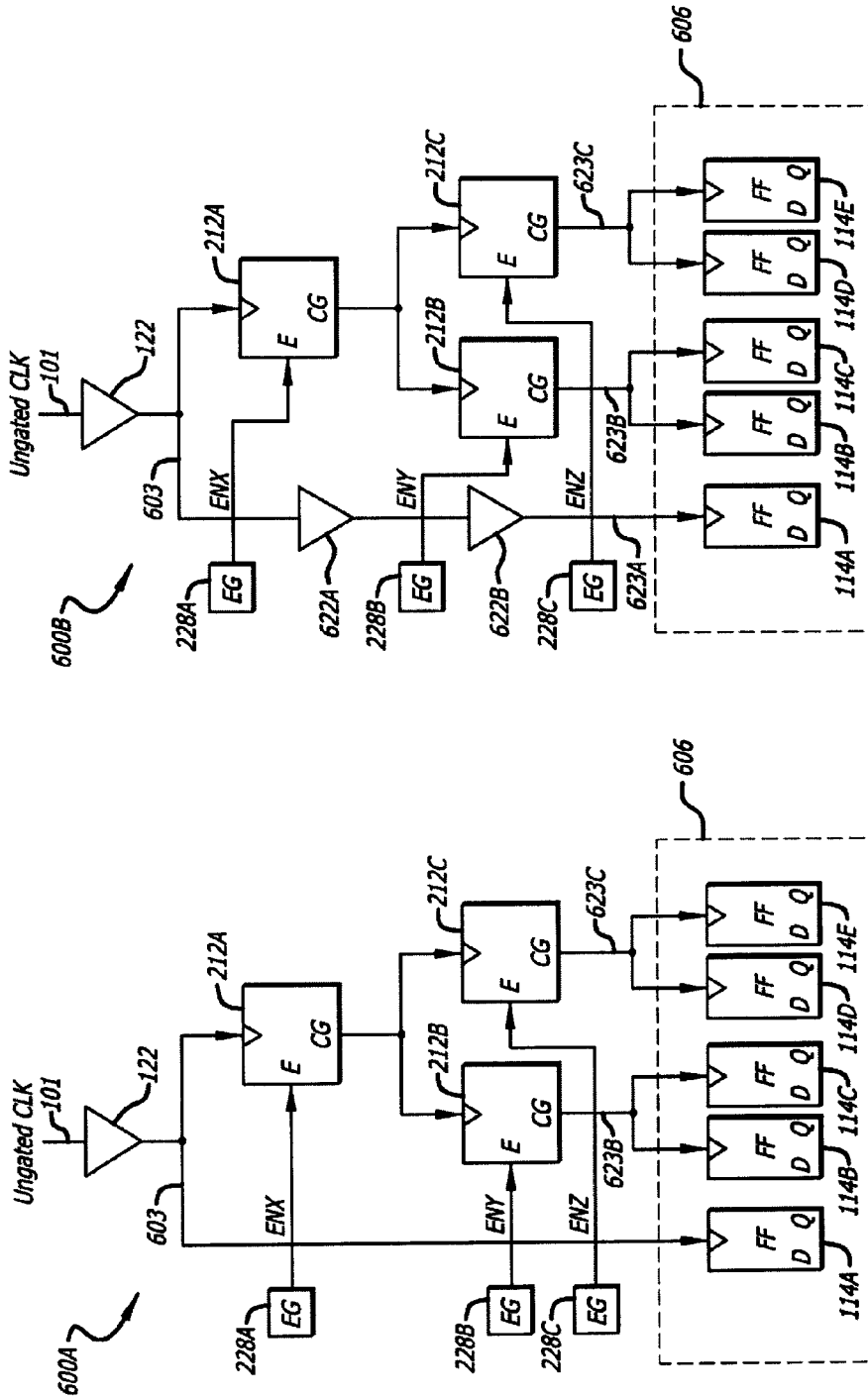
FIGS. 6A-6B are exemplary clock subtree circuits to illustrate timing balancing by insertion of clock buffers to compensate for asymmetric clock signal paths.

Reference is now made to FIGS. 6A-6B. In FIG. 6A, a clock subtree circuit 600A is illustrated that has an asymmetric clock tree topology. Enable gates 228A-228C in the circuit 600A generate the enable signals, enable X, enable Y, and enable Z, respectively, that are coupled into the enable inputs of the clock gates 212A-212C. The ungated clock signal 101 is buffered by clock buffer 122 to generate a buffered clock signal 603.

The buffered clock signal 603 is coupled into the clock input of clock gate 212A. The buffered clock signal 603 is also directly coupled into the clock input of flip-flop 114A in the flip flop cluster 606 that leads to the asymmetry in the circuit.

The buffered clock signal 603 is gated by clock gates 212A, 212B, and 212C before reaching the clock inputs of flip-flops 114B-114E in the flip flop cluster 606. Thus, the gated clock signals 623B and 623C will have different timing delays and skew from that of the buffered clock signal 603 that's directly coupled into the flip-flop 114A. The asymmetry in the clock signals that are clocking flip-flops 114A and flip-flops 114B-114E can lead to timing problems, particularly if the output of flip-flop 114A is coupled into the data input of one or more of the flip-flops 114B-114E in the flip-flop cluster 606. One method of balancing out the timing delays in the hierarchy of the clock tree, is to insert buffers or inverters for each clock gate in the parallel clock path.

In FIG. 6B, clock buffers 622A and 622B are inserted between the clock buffer 122 and the flip-flop 114A to form the buffered clock signals 623A that is coupled into the clock input of flip flop 114A. Clock buffer 622A is inserted in the clock path as shown to balance the timing delay and signal skew that is generated by clock gate 212A. Clock buffer 622B is inserted in the clock signal path in order to balance the timing delay and timing skew that may be generated by clock gates 212B and 212C along their respective clock signal paths. In this manner the buffered clock signal 623A coupled into the flip-flop 114A is likely to have more similar timing characteristics to that of the gated clock signals 623B and 623C that are coupled into the flip-flops 114B-114C and 114D-114E, respectively. Because they balance timing, the clock buffers 622A-622B may also be referred to as a time balancing clock buffers or skew balancing clock buffers.

The disadvantage of adding skew balancing clock buffers 622A and 622B is that there is additional power that is consumed as they actively switch their output signals in response to changes in state of the input signals. Thus, the additional power consumption to balance timing skew and timing delay be a factor in determining the implementation of the clock subtree.

While insertion of skew balancing clock buffers may be used to balance out signal timing in a plurality of clock paths within a clock subtree, insertion delay may be another issue to consider when inserting a clock buffer along a clock path between a clock source and a clock input to a flip-flop. Timing in the clock subtree is optimized in order to prevent gross timing violations and possibly save significant power downstream near the flip-flops of the flip-flop clusters.

Figure 7A:
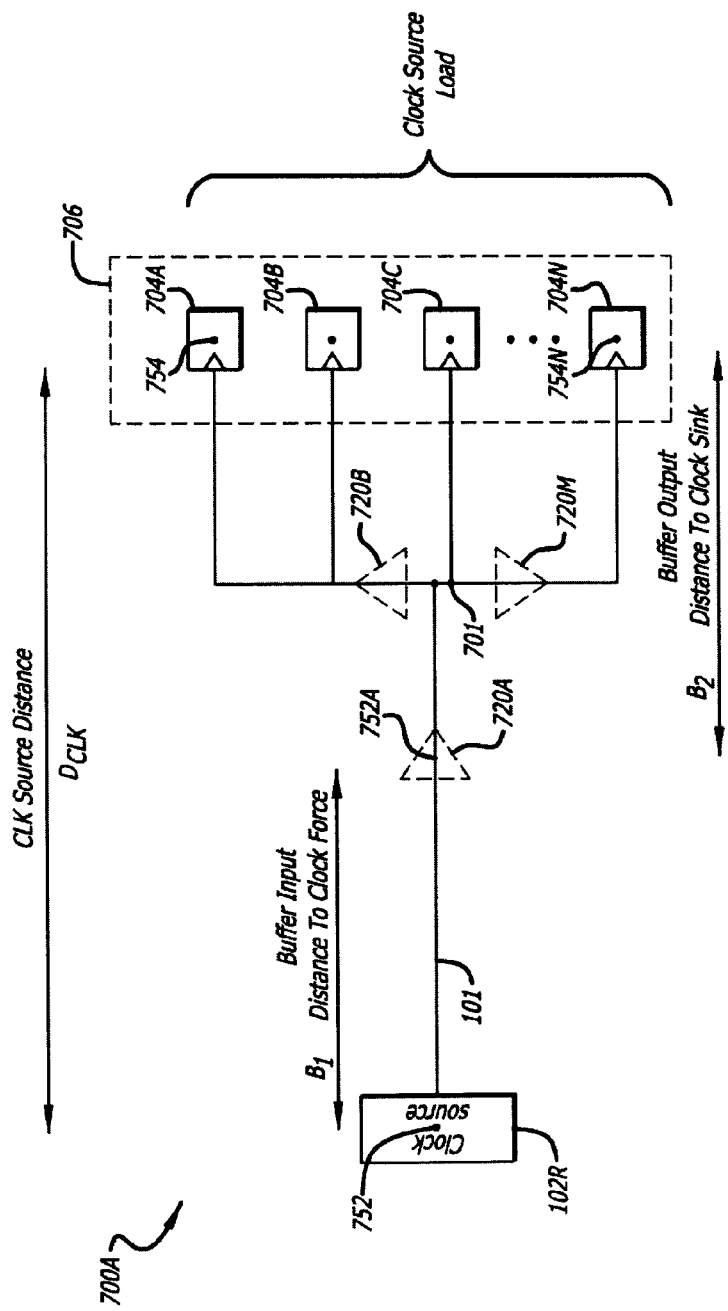
FIGS. 7A-7D are functional block diagrams to illustrate balancing of time delays and the physical placement of clock buffers, enable gates, and the clock sinks or clocked elements.

In FIG. 7A, a clock subtree circuit 700A is illustrated to explain insertion delay of one or more clock buffers 720A-720M. Clock source 102R generates ungated clock signal 101 that may be directly coupled into the clock inputs of one or more flip-flops 704A-704N of a flip-flop cluster 706. The clock inputs of the one or more flip-flop 704A-704N form a load that is placed upon the ungated clock signal 101. Additionally the wire routing from the clock source 102R to the flip-flop 704A-704N forms additional capacitive loading that is placed on the ungated clock signal 101 and the output buffer of the clock source 102R that generates the signal. To buffer these capacitive loads (also referred to as clock source load) from the clock source generator 102R, one or more buffers 720A-720M may be inserted in the clock path between the clock source 102R and the clock input of the flip-flops 704A-704N. For example, clock buffer 720A may be positioned at a position 752A as illustrated between the clock source 102R and a node 701 before the signal fans out into the clock inputs of the flip-flops 704A-704N.

The clock source 702R is physically placed at a position 752 corresponding to X and Y coordinates within a plan or layout of an integrated circuit design. Similarly flip-flops 704A-704N are placed at positions 754A-754N respectively. Clock buffer 720A is also positioned at a placement 752A with X and Y coordinates of the route.

A clock source distance $D_{CLK}$ as indicated in FIG. 7A may be determined from the respective placement positions of the clock source 102R and the flip-flops 704A-704N. A buffer input distance B1 may be determined as indicated from the respective placement positions of the clock source 102R and the clock buffer 720A. A buffer output distance B2 may be determined as indicated from the respective placement positions of the clock buffer 720A and one or more of the flip flops 704A-704M or a center of mass position of the flip flop cluster 706.

Thus, when inserting the clock buffer 720A, there is a clock timing delay that is added between the clock source and the flip flops along the clock signal path. The position 752A of the clock buffer establishes the parasitic capacitive load of the wire along the distance B2 of the clock path. The placement position 752A of the clock buffer 720A also establishes the distance B1 between the clock source 752 and the clock buffer 720A. To obtain a more accurate timing of the clock signal that clocks the flip-flops, the physical placement of the clock source 752, the clock buffer 720A, and the clocked elements should be considered.

Figure 7B:
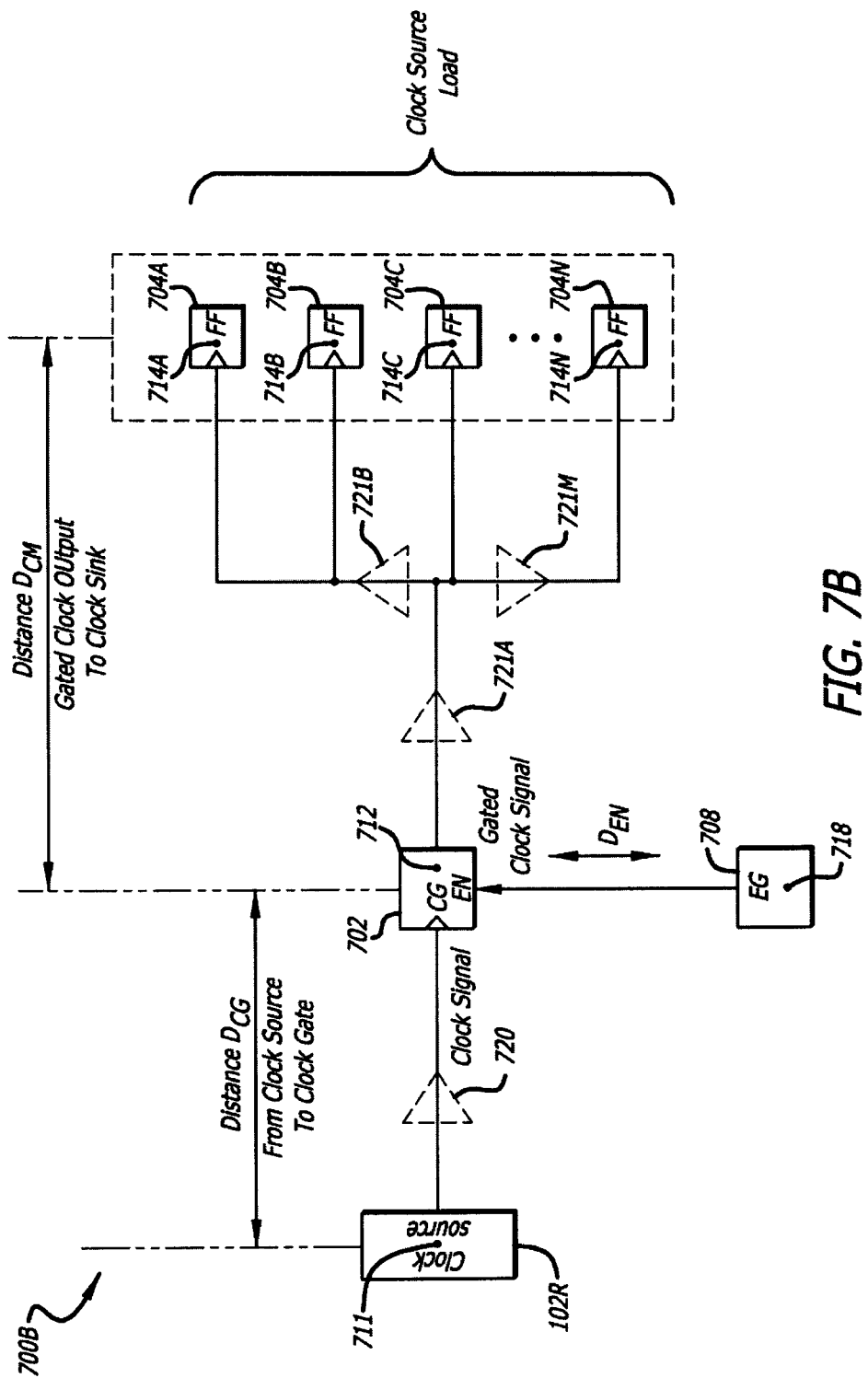

Referring now to FIG. 7B, a clock subtree circuit 700B is illustrated including a clock source 102R, a clock gate 702, an enable gate 708 within enable logic, and a cluster 706 of flip-flops 704A-704N. Similar to the clock buffer placement in FIG. 7A, the physical placement of the clock gate 702 at a placement position 712 can affect timing of the clock signals along the clock signal paths.

For example, the clock source 102R may be placed at a position 711 and the flip-flops 714A-714M in the cluster 706 may be placed at positions 714A-714M, respectively. Thus, the distance $D_{CLK}$ from the clock source to the clock synchs may be determined. The clock gate 702 may be placed at a position 712 along the clock path between the clock source 102R and the flip-flops 704A-704N. Thus, a distance $D_{CG}$ from the clock source to the clock gate and a distance $D_{CM}$ from the output of the clock gate to the clock sinks of the flip flops may be determined. Thus, the position 712 where the clock gate 702 is inserted in a clock path can affect the timing of the clock signal into the clocked elements coupled to the clock signal path. If clock buffers 720, 721A-721M are further inserted into the clock signal path, additional timing delay may be added and additional power may be consumed.

Furthermore, the timing of an enable signal can be effected by the physical placement 718 of the enable gate 708 with respect to the physical placement 712 of the clock gate 702 within the layout of the integrated circuit design. From these physical placements, a distance $D_{EN}$ between the enable gate and the clock gate over which the enable signal propagates may be determined. Thus, the placement of the enable gate and the clock gate can affect the timing of the enable signal and whether it can meet timing constraints of the enable signal to the clock gate 702.

During the physical clock topology planning process, the placement of the enable gates, the clock gates, and the flip-flops are considered to ensure that the timing constraints of the clock's signals are met in a clock subtree.

To buffer the capacitive loads, one or more clock buffers 720, 721A-721M may be inserted into the clock signal path. Clock buffers 721A-722M are physically placed after the clock gate 702. Clock buffer 720 is physically placed before the clock gate. Thus, the clock buffer 720 may be always switched by an ungated clock signal from a clock source 711, or at least with greater frequency that that of clock buffers 721A-722M, due to the difference in placement with respect to the clock gate 702. Thus, to reduce power consumption, it is preferable to push clock buffers, such as clock buffers 721A-722M, further down in the hierarchy of the clock tree after clock gates so they are driven by gated clock signals and less frequently changing state to reduce power consumption.

The more clock buffers precede a clock gate, the more power is consumed. The more clock buffers that are shielded by a clock gate, the less often they may be clocked by a clock signal and thus saves power. Accordingly, the quantity and the physical placement of clock buffers is a factor in evaluating power consumption in the implementation of clock subtree circuits.

Figure 7C:
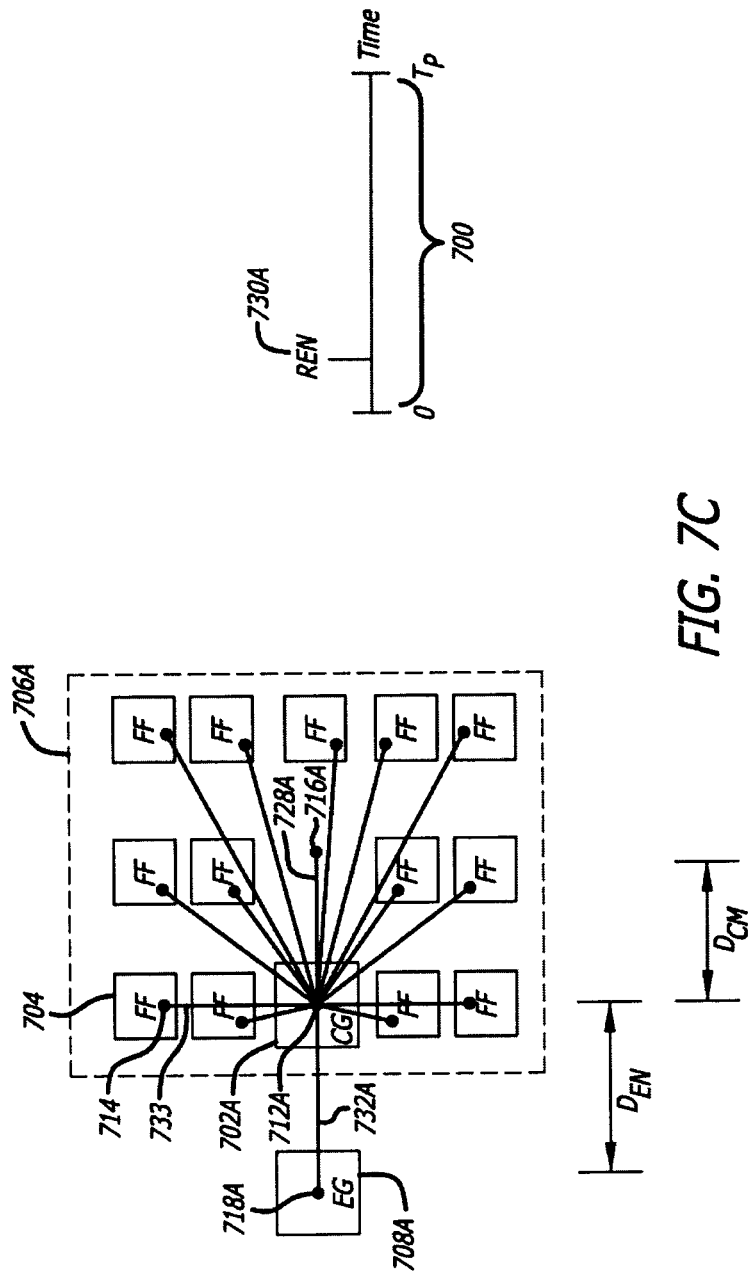
Figure 7D:
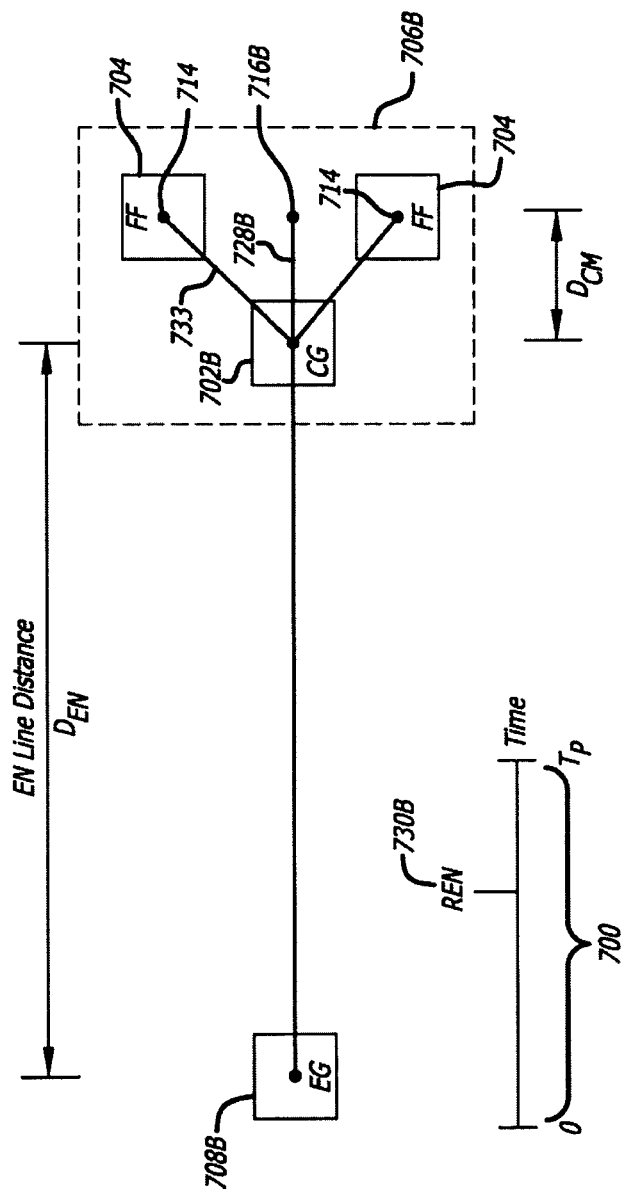

Referring now to FIGS. 7C-7D, for example, the size of a cluster box for a flip flop cluster and the flip flop fan-out is proportional to the capability of balancing timing during a clock period 700 of a clock signal between the enable signal generation/receipt and clock gate/buffer (CG) placement with respect to the enable gate (EG).

FIGS. 7C-7D illustrate that the sooner an enable signal 702A is generated by the EG and received by the CG, the more time in the clock period there is for the CG to generate a gated clock signal and drive a larger fan out of flip flops. The clock gate is usually positioned in a flip flop cluster, such as illustrated in FIGS. 7C-7D, in order to centrally drive the flip flops in the cluster and balance the gated clock signal delays from the CG to the flip flops within the cluster.

In FIG. 7C, an enable signal is generated by the EG 708A and is sent a short distance to the CG 702A. An enable air line 732A, (a line representing wire routing of the enable signal path), is coupled between X-Y placement coordinates of the EG 708A and the CG 702A to represent the short distance (enable distance Den) between them. Thus, the enable signal is available at an early time 730A within the clock period Tp 700 along the time line illustrated in FIG. 7C. Ample time remains in the clock period Tp 700 for the clock gate CG to drive a larger fan out of flip flops 704 that may be spread out in the flip flop cluster 706A. A center of mass line 728A coupled between a center of mass coordinate 716A and the placement coordinate of the clock gate GC 702A may be used to illustrate a center mass distance Dcm.

How much fanout a clock gate CG can drive is dependent on the setup slack time that is available at the enable pin (driven by the enable gate EG) of the clock gate CG. If the setup slack time is positive, more time is available than required by clock gate CG gate to receive the enable signal correctly, and more fanout can be driven by the clock gate CG. If the setup slack time is negative, an insufficient time is available for the clock gate CG gate to receive the enable signal correctly, a smaller fanout load is desirable on the clock gate CG. In this case, the clock gate may be mirrored or cloned to reduce the fanout load on each.

Whether a clock gate CG can drive more or less fanout load (e.g., the number of clock inputs to flip flops) on its output may be visually displayed within a user interface by a tag being appended to the clock gate. The tag may display the setup slack time value in picoseconds (ps), for example. The tag may be applied next to the clock gate CG with a bubble or overlaid on top of the clock gate CG. If the slack time is positive or zero, the tag and the time value may be displayed with a green color for example. If the slack time is negative, the tag and the time value may be displayed with a red color for example. In this manner, attention may be drawn to the user/designer to the slack time that is negative.

For planning purposes, knowing the clock period, the center mass distance may be estimated from the enable distance Den and/or enable time delay to determine the size of a flip flop cluster and the number of flip flops therein. With placement of the flip flops in the flip flop cluster, an actual center of mass can be calculated from the average of their placement coordinates as described further herein.

After the flip flops 704 are placed within the flip flop cluster 706, gated clock signal airlines 733 (lines representing wire routing of the clock signal paths) may be displayed on a display device between the X-Y placement coordinates 712A of the clock gate CG 702A and the X-Y placement coordinates 714 of each flip flop 704 in the cluster 706A. The display of the gated clock signal airlines 733 can illustrate how well the timing is balanced between the flip flops 704 in the cluster 706.

In FIG. 7D, an enable signal is generated by the EG 708B. The enable signal propagates a longer distance to the position of the clock gate CG 702B. An enable air line 732B is coupled between X-Y placement coordinates of the EG 708B and the CG 702B to display on a display device the short distance (enable distance Den) between them. The enable distance Den between the EG 708B and the CG 702B is greater than the enable distance between the EG 708A and the CG 702A. Thus, the enable signal travels further to the clock gate CG 702B. Assuming the enable gate generates the enable signal at the same time or it's the same enable signal, the enable signal is available at the clock gate 702B at a later time 730B within the clock period Tp 700 along the time line illustrated in FIG. 7D. Accordingly, much less time remains in the clock period Tp 700 for the clock gate CG 702 to drive a fan out of flip flops 704 that are closer together in the smaller flip flop cluster 706B.

Thus, an enable signal routed a longer distance from the enable gate to the clock gate causes the clock gate to have a smaller fan out with fewer flip flops to drive and thus, a smaller flip flop cluster. Conversely, an enable signal routed a shorter distance from the enable gate to the clock gate allows the clock gate to have a larger fan out with more flip flops to drive and thus, a larger flip flop cluster.

The clock tree planner can adjust the physical placement of the enable gate and clock gate with respect to the clocked elements in order to balance out timing delays and signal skew in the enable signal and the input clock signal to optimally generate a gated clock signal for the clocked elements.

Feasible Clock Disable Signals

In a clock subtree, knowledge of switching activity in the data paths is useful to determine what signals may used to generate enable signals for the clock gates and where clock gates may be placed with respect to the flip-flops and the flip-flop clusters along a clock signal path.

Figure 8B:
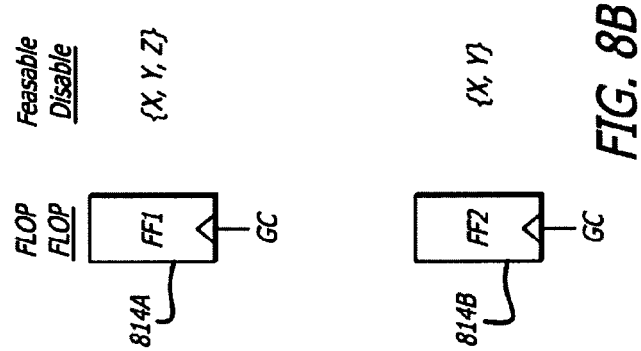
FIGS. 8A-8B are functional block diagrams to introduce the set of feasible disable signals for a clocked element, such as a flip flop or clock subtree.
Figure 8A:
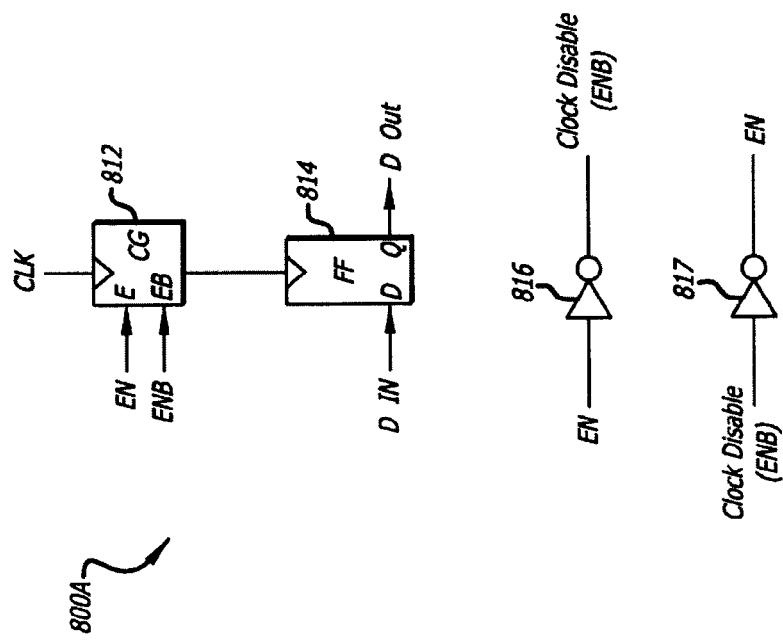

Referring now to FIG. 8A, a clock sub-tree circuit 800A is illustrated with a clock gate 812 and a flip-flop 814. The ungated clock signal clock 101R is coupled into the clock input of the clock gate 812. An enable signal EN is coupled into the enable input E of the clock gate 812. Alternatively, a clock disable signal ENB may be coupled into an enable bar input EB of the clock gate 812. In either case, the clock gate 812 generates a gated clock signal 801 that is coupled into the clock input of the flip-flop 814.

A data input signal $D_{IN}$ is coupled into the D input of the flip-flop 814. The flip flop 814 generates a data output $D_{OUT}$ from the Q output of the flip-flop. With the gated clock signal 801 gated or disabled, the gated clock signal does not change state so that the data output $D_{OUT}$ from the flip-flop also does not change state. Thus, during the time period that the gated clock signal 801 is gated or disabled, the flip flop 814 does not need to capture a new data input signal and can maintain the logical state of the data output $D_{OUT}$. In this case, there is no switching activity in the flip flop and power can be conserved during the time period that the gated clock signal 801 is gated or disabled.

In the clock topology planning, it is desirable to determine clock disable signals that can be used to gate the clock to each flip-flop. From logic synthesis, all the possible clock disable signals are recorded that may be used as a clock disable signal for each clocked element. However, not all possible disable signals are feasible to use in gating the clock signal to a clocked element, such as a flip-flop. Thus, a search for feasible disable signals is undertaken.

Disable signal can be proven to be feasible if it only disables the clock to the flip flop when the flip flop's data value does not switch. That is when the disable signal is active, the data input signal at the input to the flip-flop 814 is not transferred to the Q output of the flip flop and the data output signal Dout can remain in a steady state. That is, during the timeframe when the disable signal is active, there is no requirement that the data input be registered by the flip flop 814 and generated a change in the output. There are other types and sources of disables that may be feasible, but most significantly a feasible disable is when a flip-flop or other clocked element need not be clocked.

FIG. 8A further illustrates inverters 816-817. To generate an enable signal using a circuit, a clock disable signal ENB is coupled into the input of an inverter 817 to generate the enable signal EN at its output. To generate a clock disable signal ENB using a circuit, an enable signal EN is coupled to the input of inverter 816 so that the disable signal ENB is generated at its output terminal. Because a disable signal is the inverse of an enable signal and it is well known how to generate each from the other, the terms disable signal and enable signal may be used interchangeably herein.

Referring now to FIG. 8B, a flip-flop 814A is illustrated having a set of feasible disable signals X, Y, and Z. Flip-flop 814B in FIG. 8B has a set of feasible disable signals of X and Y. Each set of feasible disable signals includes disable signals of X and Y. Since there is overlap of the feasible disable signals of X and Y for each flip flop, the flip flops 814A and 814B may share clock gate circuits that disable the clock signal with the feasible disable signals X and Y. Sharing clock gate circuits can reduce the number of circuits that switch with a change in the clock signal and can conserve power. As discussed further herein, it is often desirable to gate the clock signal coupled into flip-flops to reduce power consumption in an integrated circuit design.

Figure 8C:
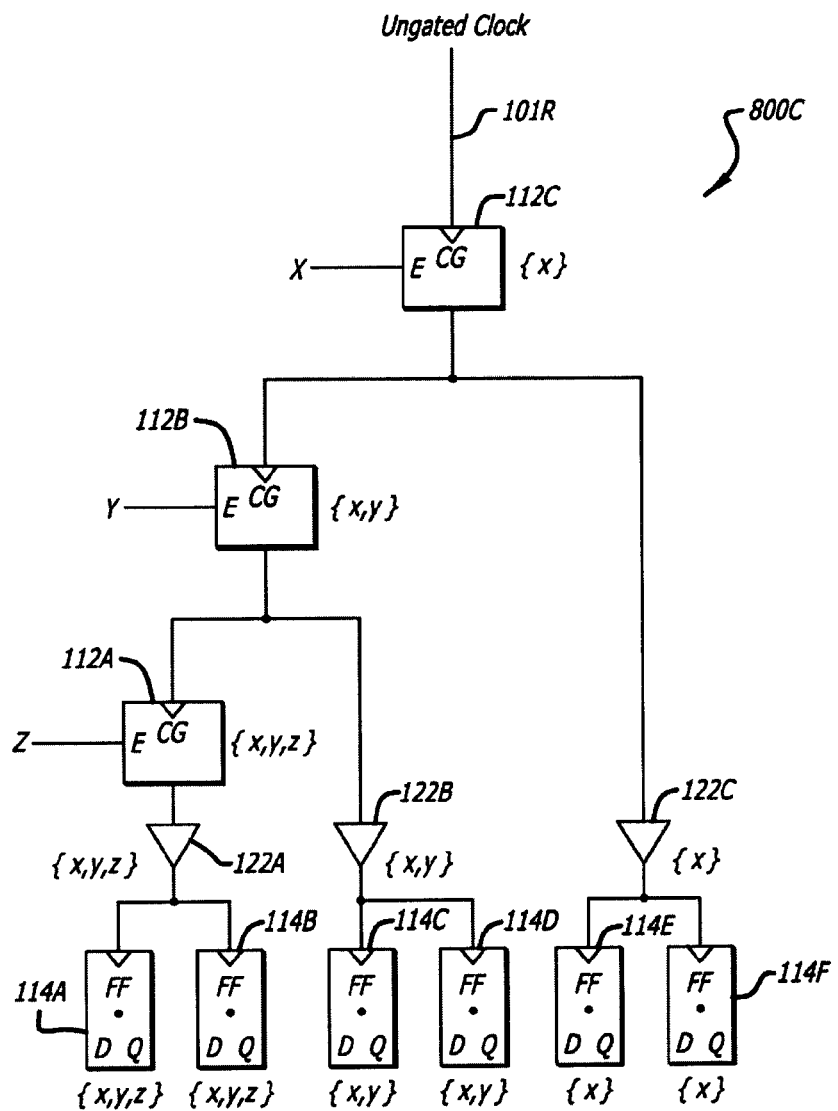
FIGS. 8C-8D are functional block diagrams to introduce how sets of feasible disable signals may be used to implement clock gating in a clock subtree.

In FIG. 8C, a clock sub-tree circuit 800C is shown including clock gates 112A-112C, clock buffers 122A-122C, and flip flops 114A-114F in a flip-flop cluster. Clock topology planning investigates what signals are used to disable the clock signal to the flip flops and where to place the clock gates and clock buffers, if any, in the clock sub-tree with respect to the placement of the flip flops. To determine the feasible signals that may be used to generate the disable signal to gate a clock at a clock gate, it is desirable to have knowledge of the switching activity of the underlying flip-flops that may have their clock signal gated.

For example, the clock tree sub-circuit 800C may undergo logic simulation to determine the switching activity of the flip flops 114A and 114B and identify that they may be disabled by disable signals X and Z. It may further be determined from the switching activity generated by a logic simulation that flip flops 114C and 114D may have their clocks gated by disable signals X and Y. Similarly, after logic simulation, it may be determined that flip-flops 114E and 114F may have their clocks gated by a disable signal X for example.

How to gate the clock gates and generate gated clock signals in a clock sub-tree is determined in a bottom up manner starting with the flip-flops at the bottom of a clock subtree.

After determining what feasible disable signals may be used to gate the clocks to the flip flops through logic simulation, the feasible disable signals may be propagated upwards to the clock buffers 122A-122C as shown in FIG. 8C. The feasible disable signals may be further propagated upward in the clock subtree until used by a clock gate and are then dropped from further propagation as illustrated in the implementation of the clock gates 112A-112C.

Clock gate 112A disables the clock signal using the Z signal. Clock gate 112B disables the clock signal with the Y disable signal. Clock gate 112C disables the clock signal using the X disable signal. The gated clock signal output from clock gate 112A is gated by the X disable signal. As a result of the combination of clock gates 112B and 112C, the gated clock signal output from clock gate 112B is gated by both X and Y disable signals. Similarly, the output gated clock signal from clock gate 112A is gated by X, Y, and Z disable signals in response to the combination of the clock gates 112A-112C.

The clock subtree circuit 800C is implemented to achieve all of the feasible clock gating possible with the respective disable signals. However, it may not be the most power conserving circuit due to clock gating that is not shared over a significant number of the flip flops. For example, clock gate 112A with its disable signal Z is used to gate flip flops 114A-114B but it is not shared by other branches of the clock sub-tree to gate other flip flops 114C-114F. As a result, the addition of the clock gate 112A to the clock subtree may consume more power than the amount saved by gating the clock signal into the flip flops 114A-114B. Thus, it is desirable to achieve a balance between power consumption and the insertion of clock gates. Accordingly, clock gate 112A may be dropped from the clock signal path in order to achieve an optimal clock sub-tree circuit.

Figure 8D:
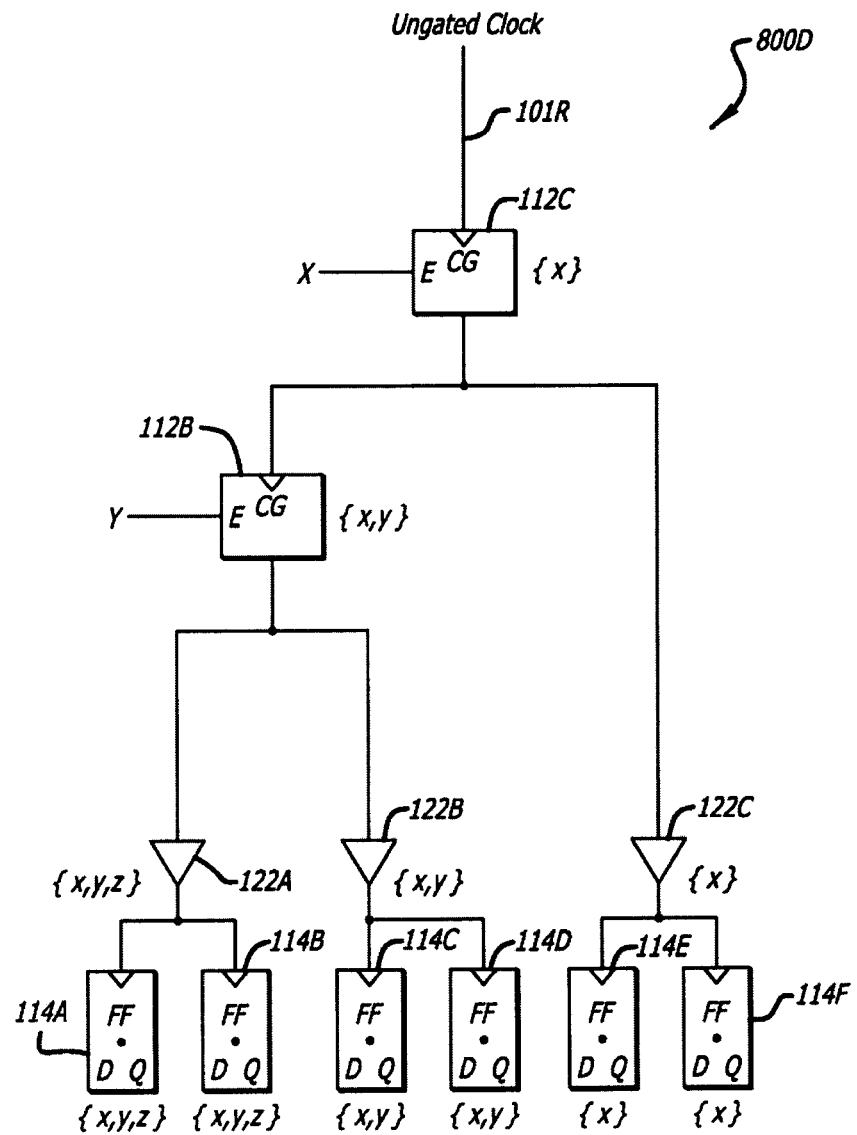

Referring now to FIG. 8D, the clock sub-tree circuit 800D is illustrated as substantially similar to circuit 800C but without the clock gate 112A. The clock gate 112A consumed more power than what would have been conserved by gating the clock signal to the flip flops 114A-114B. Thus, even though there may be a greater number of feasible clock disable signals, they may not all be used in forming an optimal clock subtree circuit. During the time period when the disable signal Z is active, the data input signals to the flip flops 114A-114B remains steady such that the output remains a steady state when clocked by the gated clock signal from the clock gate 112B. Thus, the Z disable signal and its clock gate 112A may be dropped from the clock sub-tree circuit 800D.

Clock Tree Planner and Synthesizer

Figure 9A:
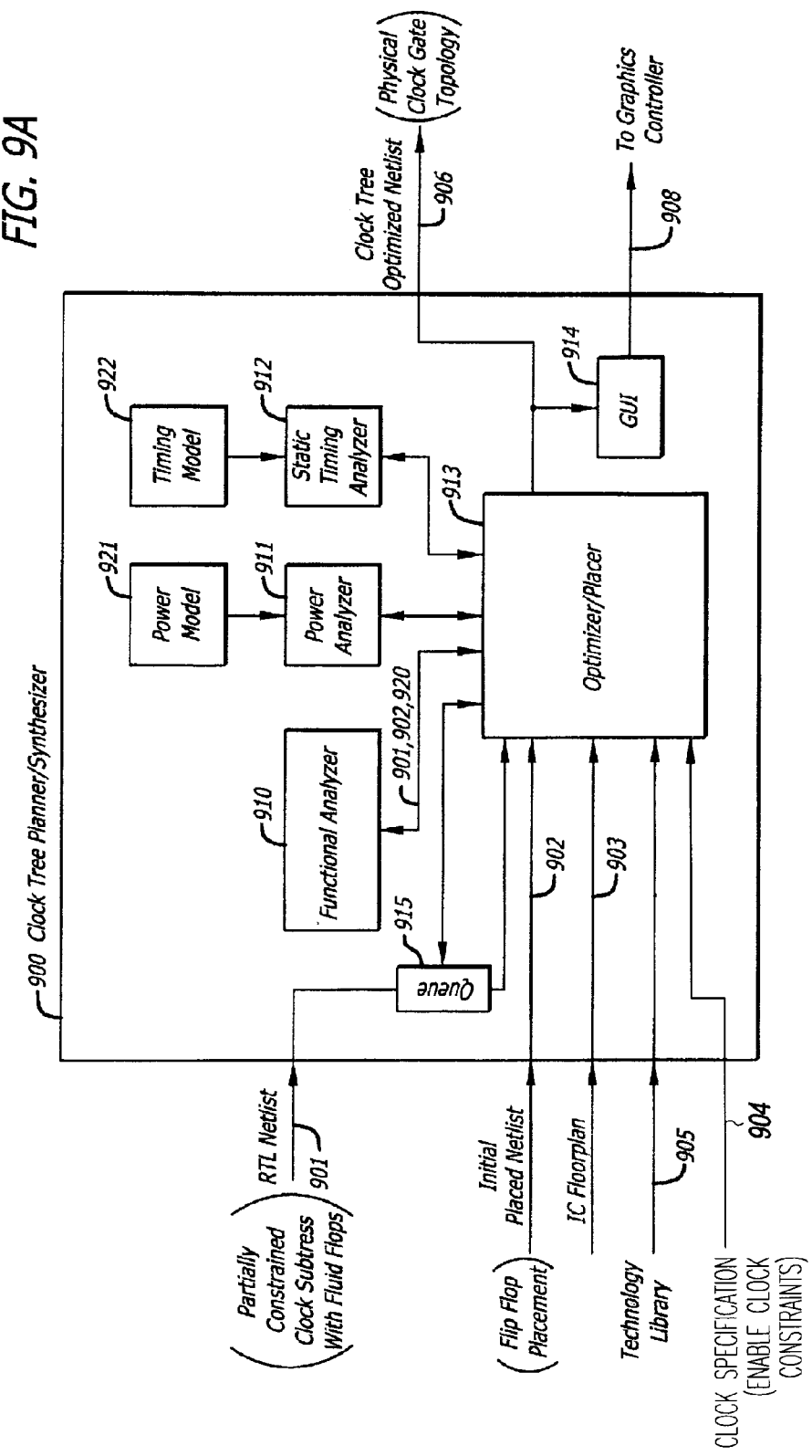
FIG. 9A is a functional block diagram of a clock tree planner-synthesizer that performs the functions of the physical clock topology planning described herein.

Referring now to FIG. 9A, a functional block diagram of a clock tree planner/synthesizer 900 is shown. The clock tree planner/synthesizer 900 includes a functional analyzer 910, a power analyzer 911, a static timing analyzer 912, an optimizer/placer 913, a graphical user interface generator 914, and one or more priority queues 915 in communication together as shown. The clock tree planner synthesizer 900 further includes an energy/power model 921 and a timing model 922 that are respectively used by the power analyzer 911 and the static timing analyzer 912.

The clock tree planner-synthesizer 900 receives a register transfer level (RTL) net list 901 that includes partially constructed clock sub-trees and clocked elements, such as flip flops within flip flop clusters. The clock tree planner-synthesizer 900 further receives an initial placed net list 902 that includes the placement of clocked elements, such as flips flops within one of more flip-flop clusters. The clock tree planner-synthesizer 900 further receives a clock tree specification 904 for the integrated circuit design and a technology library 905 of physical logic gates that may be used to implement the integrated circuit design. The clock tree specification 904 includes clock design constraints for the clock tree network, such as clock period T and frequency, and may further include enable signal and clock signal timing constraints. The technology library 905 includes the physical circuits of the clock gates, enable gates, clocked elements, as well as other circuits for implementing the clock signal network. The technology library 905 may include information about the physical gates that can be used to model the circuits that are implemented in the clock tree network. The technology library 905 and is coupled into the optimizer 913 and other elements of the clock tree planner 900. The clock tree planner-synthesizer 900 may further receive an initial floor plan for the logic blocks with the initial placement of the clocked elements in the clock tree.

In response to the input information, the clock tree planner-synthesizer 900 generates an optimized netlist 906 for the clock tree, including a physical clock gate typology of the clock gates with respect to the placement of the flip-flops. The clock tree planner-synthesizer 900 may further generate a graphical user interface 908 that may be provided to a graphics controller of a computer for display on a display device.

The one or more queues 915 of the clock tree planner-synthesizer 900 includes a priority list of partially built clock sub-trees and clocked elements, such as flip flops, latches or registers, that are to be evaluated as merger partners. One or more queues of clocked elements with common enable signals may be used to construct a clock tree from the bottom up. Placement information may be used to order the clocked elements within the queues initially with data path slack timing being used secondarily to evaluate merger candidates in the clock tree. The placement information may initially be from an initial placement. Placement information may be associated with the clock terminal input of the partially built clock sub-trees or a merger point. Placement information may include the placement coordinates of the clocked elements to evaluate the distance of separation between potential merger partners. If a flip-flop cluster of a plurality of flip flops are to be evaluated for merger, the center of mass coordinates may be used to evaluate the distance of separation between potential merger partners.

The function analyzer 910 receives the RTL net list 901 and the initial placed net list 902 to perform a logic simulation and determine the feasible enable/disable signals 920 for each clocked element that may be used with clock gates within a clock sub-tree to gate a clock signal and conserver power. The potential clock gate enable/disable signals 920 are communicated to the optimizer/placer 913 to evaluate alternate embodiments of the mapped gate implementation of each clock subtree.

Referring now to FIG. 9B, a functional block diagram of the functional analyzer 910 is shown. The functional analyzer 910 receives the RTL netlist 901 and the initial placed netlist 902 to determine the potential clock gate enable/disable signals 920. To determine the potential clock gate enable signals 920 for a clock sub tree, the functional analyzer 910 includes an RTL-coded enable analyzer 910A, a structure feedback analyzer 910B, a binary decision diagram based symbolic analyzer 910C, a random simulation analyzer/SAT-based inferred enable analyzer 910D, and a physical exclusive OR based clock gating analyzer 910E. One or more of these analyzers 910A-910E may be used to determine the potential clock gate enables 920 for a given clock subtree.

Referring back to FIG. 9A, the power analyzer 911 analyzes the energy and power consumption of each clock sub-tree in response to a switching energy/power model 921. The power analyzer 911 evaluates the alternate embodiments of each clock subtree to determine the lower or lowest power consumption. For example, the optimizer/placer 913 may communicate a clock subtree with and without one or more merged clock gates to determine the power consumption of each. The power analyzer 911 analyzes each in order to determine which can be synthesized and placed within an integrated circuit to provide reduced power consumption.

The static timing analyzer 912 analyzes the timing of the alternate embodiments of each clock subtree to be sure the timing requirements are met with the clock enable signals and the gated clock signals. If the timing requirements are not met with an implementation of a clock subs tree, the implementation is discarded and a further search for an optimum implementation of the clock subs tree is performed.

The optimizer/placer 913 optimizes each clock subtree and places the clock enable gates, clock buffers, and enable gates with respect to the registers/flip flops in the floorplan for the integrated circuit design. The optimizer/placer 913 selects the preferred implementation and placement of the gates of each clock subtree.

The graphical user interface generator 914 is in communication with the optimizer/placer 913 to receive the optimized clock tree netlist 906. The graphical user interface generator 914 can display the placement of clock gates, enable gates, and clock buffers with respect to the registers and flip flops. The graphical user interface generator 914 implements the clock tree planning graphical user interface (GUI) that is described in detail in U.S. patent application Ser. No. 13/839,769, entitled GRAPHICAL USER INTERFACE FOR PHYSICALLY AWARE CLOCK TREE PLANNING filed by Ankush Sood et al (the "GUI patent application). The graphical user interface generator 914 can generate the various colored airlines and colored boundary boxes described in the GUI patent application, U.S. patent application Ser. No. 13/839,769.

Referring now to FIG. 9C, illustrates a state machine which has four states 951-954. The one or more queues 915 of partially built clock sub trees will transition through each of these states during the merging process. In state 951, the most timing critical clock sub-tree may be popped first. The state machine then transitions to state 952.

In state 952, the clock sub-tree is searched to find merger partners from the bottom up starting at the lowest clocked elements, such as the flip-flops. In state 952, potential merger partners for a clock sub-tree are analyzed to determine if a larger clock sub-tree can be generated to conserver power. After finding an appropriate merger partner, the state machine transitions to state 953.

In state 953, a new larger sub-tree is implemented in response to finding one or more merger partners. The process then goes to state 954.

In state 954, the merged clock sub-tree is pushed back into the appropriate queues until all clock sub-trees are analyzed. The state machine continues to cycle through the states for each of the one or more queues of the partially built clock sub-trees until no further merger may be had for a given set of merger partners.

Timing Models, Energy/Power Models, and Gate Models

Models that may be used by the clock tree planner 900 are now introduced so that the timing and power of complex clock networks within a clock sub-tree can be estimated and various potential clock subtree mergers can be evaluated. The clock tree planner 900 performs a bottoms up recursive binary merging process through a clock tree network. Multiple merger candidates are explored and evaluated on costs of power, energy and timing. Timing requirements must be met regardless. However, reducing power and energy consumption are goals that the clock tree planner strives to meet. To that end, the clock tree planner 900 is dynamically programmed with abstract models for power, energy, maximum timing delay, and minimum timing delay as a function of input clock signal slew. The models may be piece-wise linear interpolations. Partial tree models of potential mergers to be evaluated for power, energy, and timing are formed. The clock tree planner 900 recursively forms the potential merger candidates at each possible merger point in the clock tree hierarchy and preserves the constant time merger evaluations. To reduce power and switching energy, the clock tree planner strives to maximize clock gating, avoid unwanted skew or delay buffers (clock buffers to alleviate each), and minimize wire lengths by proper placement.

Clock gating is used whenever possible to reduce power consumption. The higher a clock gate is within the hierarchy of a clock tree network so that it can gate the clock and disable more circuitry from switching, the more power and switching energy may be conserved. Thus, it may be desirable to defer clock gating to upper levels of the hierarchy. To that end, the clock tree planner 900 pushes virtual enable signals upward in the clock tree hierarchy when shared between branches of the clock tree hierarchy. Non-shared enables, enable signals that cannot be shared, may be implemented by clock gates for the lone branch or otherwise dropped. Multiple levels of clock gating are explored given an analysis of timing and the capability of sharing clock gates. Simulation is used to capture the correlation of enable/disable signals and their probability of switching so that power consumption with clock gating can be estimated and redundancy between multiple clock gates can be avoided.

Enable signal timing can be used by the clock tree planner 900 to determine if clock gating is appropriate at each given merger point. The setup timing slack of an enable signal to a clock gate limits the level of hierarchy in the clock tree where the clock gate may be placed for a merge operation above it. If a potential clock subtree merger exceeds the setup timing slack, it is dropped from further consideration. This forces a timing driven cloning process or alternatively a removal of clock gating if an enable signal violates a setup timing check that would otherwise cause a clock tree to improperly function. The clock tree planner 900 is symmetry aware and avoids generating highly asymmetric clock tree topologies. If skew balancing clock buffers need to be added for timing balance between circuits in clock subtrees, the added net power cost is added to the unbalanced clock subtree to evaluate mergers. The clock tree planner 900 and the algorithm that it executes prevents gross timing violations in advance and saves power downstream.

Figure 10A:
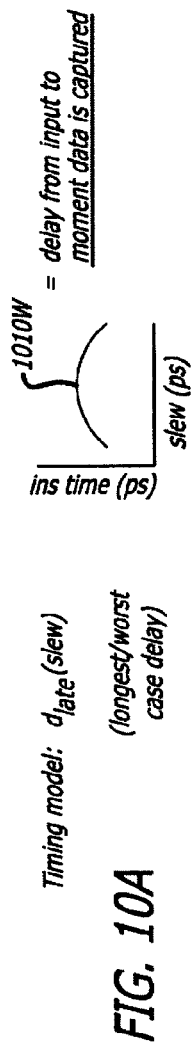
FIGS. 10A-10B are charts of exemplary timing models that may be used by the timing analyzer and optimizer to evaluate merger partners for the clocked elements.
Figure 10B:
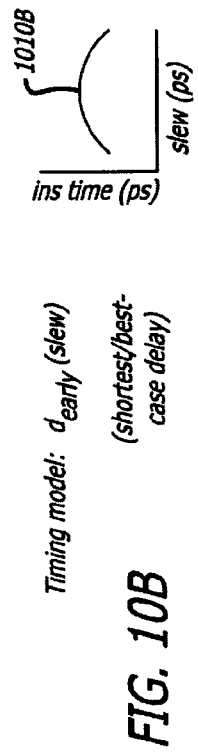

Reference is now made to FIGS. 10A-10B. As mentioned previously, the clock tree planner 900 utilizes a timing model 922 when performing a static timing analysis on each clock sub-tree to determine that timing constraints of clock signals and enable signals are being met. The timing model 922 also provides timing information that can be used to balancing out timing delays of clock signals along a clock path for a given clock time period, as well as to balance out timing between an enable/disable input signal and an input clock signal to a clock gate during a given clock time period.

In FIG. 10A, a longest or worst case timing delay model 1010W for a clocked element, such as a flip-flop, is shown. In FIG. 10B, a shortest or best-case timing delay model 1010B for a clocked element, such as a flip-flop, is illustrated.

The worst case timing delay model $d_{late}$(slew) 1010W and the best case timing delay model $d_{early}$(slew) 1010B are curves of piece wise linear interpolations of delay that are a function of signal slew of a clock input signal. The value of the time delay for a given clock signal slew rate represents the delay from the input to the moment data is captured by the clocked element in response to the clock signal. This time delay value may also be considered as an insertion delay time for a clock signal to clock a clock subtree or a clocked element. On the Y and X axes, the curves 1010W and 1010B are plotted input setup time of the data input versus slew rate of the clock signal.

For evaluation of a lone clocked element such as a flip-flop, the worst-case timing delay $d_{late}$(slew) and the best-case timing delay $d_{early}$(slew) are substantially similar such if it needs to be modeled, one model (such as $d_{late}$(slew)) may be sufficient. When analyzing a lone flip-flop, these timing delay models may be input setup time models for the flip flop over the given slew rates. If the data path to the clocked element is available, the slack timing of the data signal may be used to represent the timing delay of the flip flop.

The input setup information for flip-flops can be obtained from the technology library that is received by the clock tree planner 900. Other clock endpoints or clock input terminals of other clocked elements can be similarly modeled, such as latches, rams and other intellectual property (IP) macro models, with information available in a technology library, and if not, they may be computed or constructed by measuring timing values as a function of clock signal slew. Slack timing of a data input path to a clocked element is determined by a static timing analysis by the static timing analyzer.

As mentioned previously, clock tree planner 900 includes a power analyzer 911 and an energy/power model 921 to analyze power consumption. The energy/power model 921 may be used by the power analyzer 911 to analyze the power consumption of the different implementations of clock sub-trees and potential mergers partners of a plurality of clock sub-trees.

Figure 11A:
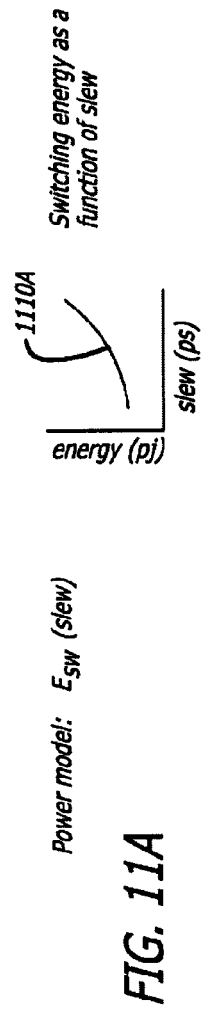
FIG. 11A is a chart of an exemplary switching energy model that may be used by the power analyzer and optimizer to evaluate merger partners for the clocked elements.

Referring now to FIG. 11A, an exemplary switching energy model $E_{sw}$(Slew) 1110A as a function of slew is shown for the energy/power model 921 of the clock tree planner. The energy switching model, a piece wise linear interpolations of switching energy, provides the switching energy as a function of slew. Energy in Pico joules (pj) maybe plotted along the Y axis while signal slew in pico-seconds (ps) of the clock signal is plotted along the X axis. Switching energy can be readily changed into power consumption given the frequency of a clock signal if it constantly switches. A clock gate that periodically disables a clock signal so it does not clock a circuit, adds a probability component to the power computation that is explained further below with reference to equation 14.

Figure 11B:
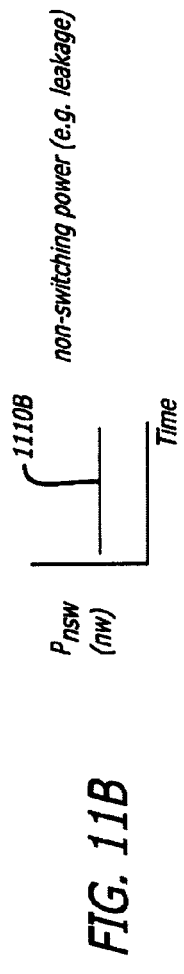
FIG. 11B is a chart of an exemplary non switching power model that may be used by the power analyzer and optimizer to evaluate merger partners for the clocked elements.

Referring now to FIG. 11B, an exemplary non-switching power model $P_{nsw}$ 1110B, a linear interpolation of non-switching power consumption, is shown for the energy/power model 921 of the clock tree planner. Non-switching power $P_{nsw}$ is a component of the total power consumption of a circuit with transistors, such as a clock gate, a clock buffer, an enable gate, and a clocked element, such as a flip-flop. The non-switching power $P_{nsw}$ is the result of current leakage in the transistors of the circuit and is a constant over time as illustrated by non-switching power model $P_{nsw}$ 1110B. Gating a clock signal into a clocked circuit or element so that it does not switch as often does not reduce the non-switching power consumption $P_{nsw}$.

The switching energy model $E_{sw}$(Slew) and the non-switching power model $P_{nsw}$ for a given circuit (e.g., a flip-flop) may be obtained from the technology library that is received by the clock tree planner 900. If unavailable, a circuit can be characterized to determine the switching energy model $E_{sw}$(Slew) as a function of slew and the non-switching power model $P_{nsw}$ for a given circuit.

Composing Clock Subtree Models and Computing Timing & Power

With the timing and power models of circuits introduced, computing the timing and power of more complex clock sub-trees is now described.

Wire interconnect (also referred to as wire routing) that is used within an integrated circuit to connect clock signals to the various circuits can consume power and increase timing delay in a signal when they are switched to a different signal level (e.g., logic level zero to a logic level one or visa versa). This is due to the parasitic capacitance and parasitic resistance of the wire and the load it places on a driver of a circuit. The amount of power consumed and the amount of timing delay introduced into a signal can both be modeled as functions of the length of the wire interconnect.

Figure 12:
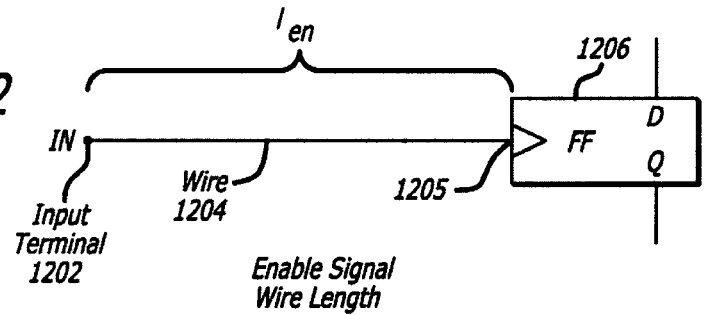
FIG. 12 is a simplified schematic diagram of a wire routed between an input terminal of a clock subtree and the clock terminal of a clocked element over which a clock signal may propagate to explain how physical wire is considered in the timing and power models for a clock subtree.

Referring now to FIG. 12, an exemplary wire 1204 is illustrated that is used to route a clock signal from a clock input terminal IN 1202 to a clock endpoint 1205 of a flip-flop 1206. The length of the clock signal (Len) from the input terminal 1202 to the clock endpoint 1205 can increase energy consumption (representing power consumption) and timing delay of the clock signal along the clock signal path. The wire timing delay model (delay per unit length) for a wire to compute the timing delay of the wire $d_{wire}$(len) is available from the technology library received by the clock tree planner. The energy consumption model for a wire (energy per unit length) to compute the energy consumption of a wire $E_{wire}$(len) is usually also available for reading from the technology library that is received by the clock tree planner.

In determining power consumption and timing delay of an overall clock net J, the length of wire routing Len from a clock gate to a flip flop or other sub-tree input K is considered in forming equations 1 through 4 to model the timing delay and power consumption of an overall clock net J as follows:

$$d_{late}^J(\text{slew}) = d_{late}^k(\text{slew}) + d_{wire}(\text{len}) \qquad \text{Eq. 1:}$$

$$d_{early}^J(\text{slew}) = d_{early}^k(\text{slew}) + d_{wire}(\text{len}) \qquad \text{Eq. 2:}$$

$$E_{SW}^J(\text{slew}) = E_{SW}^k(\text{slew}) + E_{wire}(\text{len}) \qquad \text{Eq. 3:}$$

$$P_{NSW}^J = P_{NSW}^k \qquad \text{Eq. 4:}$$

Equations 1 and 2 add the timing delay of the wire length $d_{wire}(len)$ to the best case timing $d_{early}{}^k(slew)$ and worst case timing $d_{late}{}^k(slew)$ of a clocked element (e.g., a flip-flop) to determine the overall timing delay of a clock signal for the clock net J. If more than one clocked element and/or more than one wire segment are present along a clock net or clock signal path, such as from clock buffers and clock gates with the wire route there between, the sum of contributions of each are added together to determine the overall timing delay of the given clock signal path.

Equation 3 adds the energy used to transition a signal along the length of the wire $E_{wire}(len)$ to the energy $E_{SW}{}^k(slew)$ needed to slew the clock signal from a logic zero to a logic one or visa-versa to determine the overall energy used when a clock signal switches on the clock net J.

In equation 4, the non-switching power at the input K is the non-switching power of the overall clock network J. Because wire typically has no leakage, a length of the wire adds nothing to the non-switched power consumption. The non-switching power consumption for the clock network J is equal to the non-switching power consumption of the active devices at input k, $P_{NSW}{}^J = ?_{NSW}{}^k$, regardless of wire length.

Merge Points

As mentioned previously, merger partners are sought out to merge clock subtree circuits together into larger clock subtrees and possibly share more clock gates to avoid redundancy and conserve power. When two sub-trees are connected together or two flip flops are clocked together, timing and power consumption models can be generated for the total to determine if the merger should be made.

Figure 13:
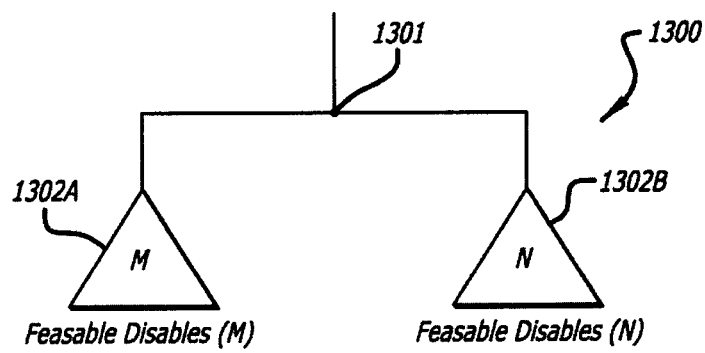
FIG. 13 is a functional block diagram of a potential merger at a merge point between clock subtrees with respective feasible disables to evaluate costs of the potential merger and determine if the potential merger should be implemented.

Referring now to FIG. 13, a merged clock subtree circuit 1300 is illustrated with an M clock sub-tree 1302A and an N clock sub-tree 1302B merged together at a merge point 1301. Equations 5 through 8 can be formed to model the total timing delay and power consumption of merged clock subtree 1300 at the merge point 1301 or a common input terminal.

$$d_{late}{}^{total} = \max(d_{late}{}^M, d_{late}{}^N) \quad \text{Eq. 5}$$

$$d_{early}{}^{total} = \min(d_{early}{}^M, d_{early}{}^N) \quad \text{Eq. 6}$$

$$E_{SW}{}^{total} = E_{SW}{}^M + E_{SW}{}^N \quad \text{Eq. 7}$$

$$P_{NSW}{}^{total} = P_{NSW}{}^M + P_{NSW}{}^N \quad \text{Eq. 8}$$

The total worst case timing delay $d_{late}{}^{total}$ for the merged clock subtree circuit 1300 is the maximum of the worst case timing delay $d_{late}{}^M$ for the M clock subtree and the worst case timing delay $d_{late}{}^N$ for the N clock subtree. The total best case timing delay $d_{early}{}^{total}$ for the merged clock subtree circuit 1300 is the minimum of the best case timing delay $d_{early}{}^M$ for the M clock subtree and the best case timing delay $d_{early}{}^N$ for the N clock subtree. The total switching energy $E_{SW}{}^{total}$ for the merged clock subtree is the sum of the switching energies for the M clock subtree $E_{SW}{}^M$ and the N clock subtree $E_{SW}{}^N$. The total non-switching power $P_{NSW}{}^{total}$ for the merged clock subtree is the sum of the non-switching power consumptions for the M clock subtree $P_{NSW}{}^M$ and the N clock subtree $P_{NSW}{}^N$.

Furthermore, each clock sub-tree has a set of feasible disable signals that may be entirely different or may have one or more common disable signals. M clock sub-tree 1302A has M feasible disables and N clock sub-tree 1302B has N feasible disables for its respective flip-flops. With the merger of the two clock sub-trees, the set of feasible disables for the merged clock subtree is the intersection of the feasible disables of each as illustrated by equation 9. A clock disable signal can only be used for the entire merged sub-tree if it is valid for every flip-flop of each clock sub-tree 1302A and 1302B. Thus, the set of feasible disables for the merged clock subtree is the common feasible disable signals that are common to both sets of feasible disable signals.

$$\text{Merged feasable Disables} = M \text{ Feasable Disables} \cap N \text{ Feasable Disables} \quad \text{Eq. 9}$$

By continuously merging clocked elements and clock subtrees from the bottom up towards a merge point, a hierarchical model for an arbitrary binary tree may be generated. The hierarchical model maintains the history of each merger and its models as it constructs the clock tree network from the bottom up until the clock source generator is finally reached. The history, including feasible disable signals at each level of hierarchy, may be particularly useful if a merger of clock subtrees is to be reconsidered.

Figure 14A:
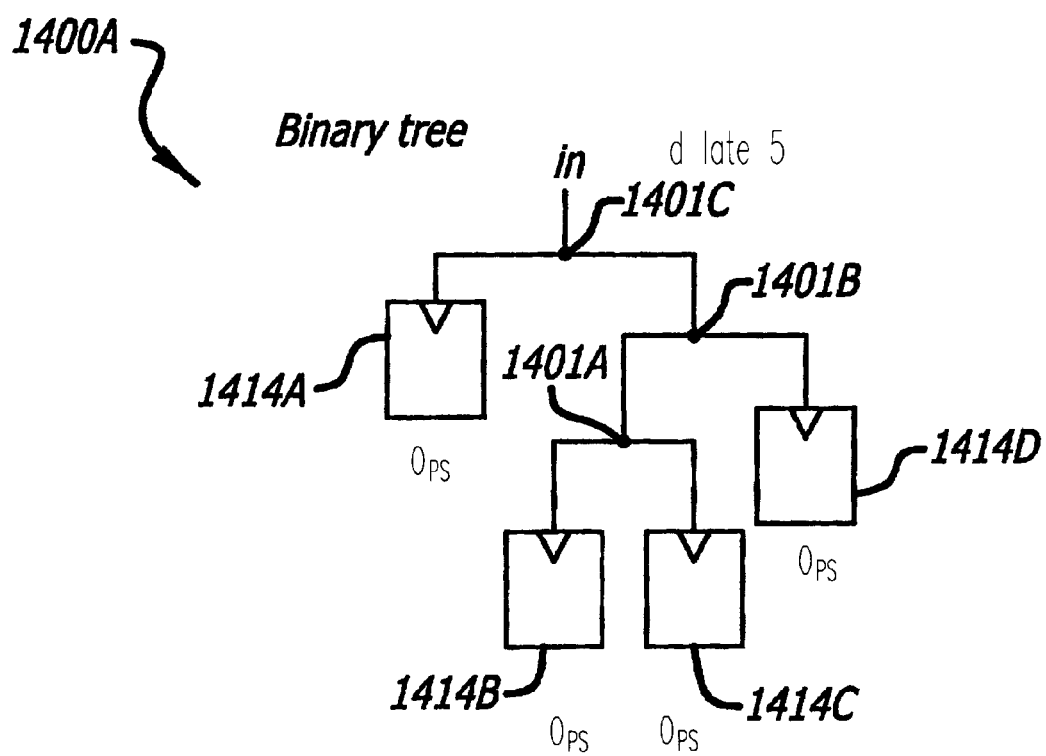
FIG. 14A is a functional block diagram of an exemplary potential merger at a merge point between clocked elements (e.g., flip-flops) to evaluate costs of the potential merger.

Referring now to FIG. 14A, an exemplary binary tree 1400 is illustrated after a number of merger operations. The binary tree 1400 includes a flip-flop 14A of one clock sub-tree merged together with flip flops 1414B-1414C of another clock sub-tree at the merger point 1401C. The merger of flip-flops 1414B-1414C occurred at the lowest level of hierarchy at merge point 1401A to form an initial clock subtree that was subsequently merged together with flip-flop 1414D at merger point 1401B at the next level up in the hierarchy. Power and timing models for the exemplary binary tree 1400 can be formed using the model equations 5-8.

Figure 14B:
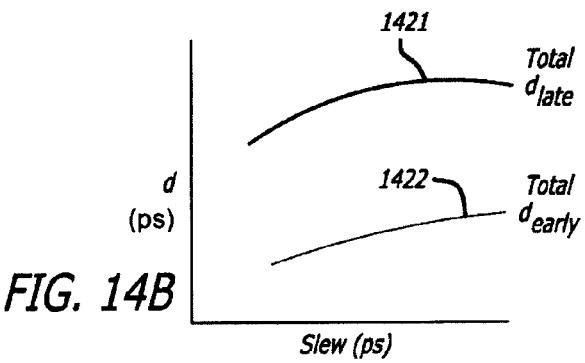
FIG. 14B is a chart of timing delay to evaluate total timing delay costs of the exemplary potential merger at the merge point between clocked elements of FIG. 14A.

In FIG. 14B, a total worst case timing delay model $d_{late}{}^{total}$ for the merged clock subtree circuit 1400 as a function of the slew of the clock signal is illustrated by curve 1421. In accordance with equation 5, the maximum delay of the flip flop or the clock sub-tree is selected to be the total timing delay for the merged binary tree 1400. Curve 1421 likely represents the worst case timing delay model of the clock subtree circuit below the merger point 1401B.

A total best case timing delay model $d_{early}{}^{total}$ for the merged clock subtree circuit 1400 as a function of the slew of the clock signal is indicated by curve 1422. In accordance with equation 6, the minimum delay of the flip flop or the clock sub-tree is selected to be the total timing delay for the merged clock subtree circuit 1400. Curve 1422 likely represents the best case timing delay model of the flip flop 1414A.

Figure 14C:
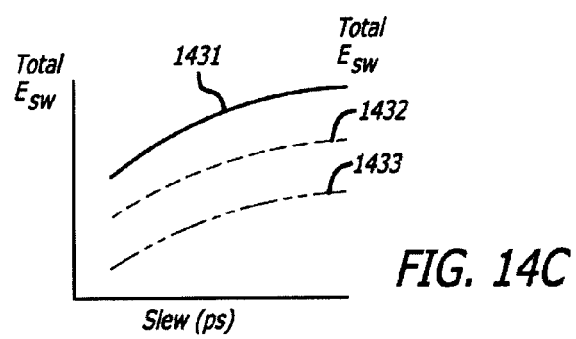
FIG. 14C is a chart of switching energy consumption to evaluate the total switching energy consumption costs of the exemplary potential merger at the merge point between clocked elements of FIG. 14A.

Reference is now made to FIG. 14C illustrating a curve 1431 that models a total switching energy $E_{SW}{}^{total}$ for the merged clock subtree circuit 1400. In accordance with equation 7, curve 1431 is formed by summing together the switching energy model for the clock subtree (represented by curve 1432) with the switching energy model for the flip-flop 1414A (represented by the curve 1433).

Figure 14D:
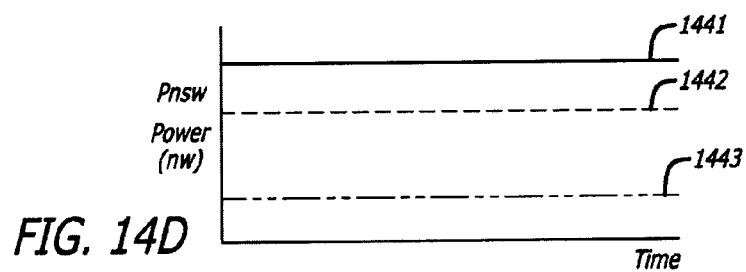
FIG. 14D is a chart of non-switching power consumption to evaluate the total non-switching power consumption costs of the exemplary potential merger at the merge point between clocked elements of FIG. 14A.

Reference is now made to FIG. 14D illustrating a curve 1441 that models a total non-switching power consumption $P_{NSW}{}^{total}$ of the merged clock subtree circuit 1400. In accordance with equation 8, curve 1441 is formed by summing together the non-switching power consumption model for the clock subtree (represented by curve 1442) with the non-switching power consumption model for the flip-flop 1414A (represented by the curve 1443).

With these models of the clock subtree circuit 1400, further merges with other clock subtree circuits may be made building upon the models until the clock generator of the clock tree network is reached or no further merges can be considered.

Buffers and Clock-Gates

In FIGS. 7A-7B, insertion timing delay was briefly discussed with regards to insertion of a clock buffer or a clock gate within a given clock sub-tree. The insertion of a clock buffer or a clock gate adds additional timing delay to the clock signal path from the clock generator. The insertion of a clock buffer or a clock gate can also transform the slew dependence to a different driver such that slew of a buffered clock signal can be improved over that of the original unbuffered clock signal.

From the input technology library that is used to implement the integrated circuit design, there are some known facts with regards to the clock buffers and clock gates. With respect to timing delay, the intrinsic delay through a clock buffer and a clock gate is provided as a function of the input slew of the input signal and the output capacitance applied to the output terminal, $d_{intrisic}^{buffer}(slew, C_{OUT})$. Additionally, the output slew or transition time for the clock gate or clock buffer can be determined as a function of the input signal and the output capacitance on the output total, $S^{buffer}(slew, C_{OUT})$. Furthermore, the energy used to switch the clock buffer or clock gate, $E_{sw}^{buffer}(slew, C_{OUT})$, can be determined as a function of the input slew and the output capacitance. With regards to leakage currents, a non-switching power consumption $P_{nsw}^{buffer}$ is also associated with the clock buffer or clock gate. With this information from the technology library, the affects of inserting a clock buffer and/or a clock gate on a sub-tree input can be determined.

Figure 15:
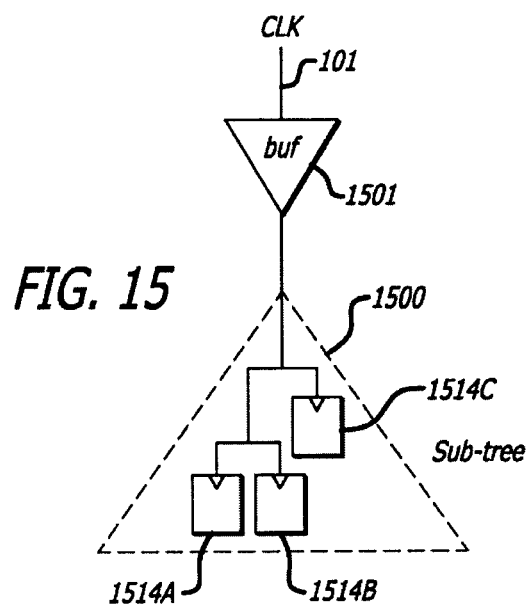
FIG. 15 is a functional block diagram of a clock buffer being inserted into the ungated clock signal path to evaluate the costs of insertion of a clock buffer above a clock subtree.

In FIG. 15, a clock sub-tree circuit 1500 has a clock buffer 1501 inserted in the input clock path to buffer the capacitive load of the sub-tree circuit 1500 from the ungated clock signal 101 and the clock generator. The output signal slew from the clock buffer 1501 now establishes the input slew to the clock sub-tree 1502 and is used in determining the timing delay component of the clock sub-tree. Thus, the total delay from the clock signal 101 to the clock inputs of the flip flops 1514A-1514C is now a function of the timing delay of the clock sub-tree summed together with the timing delay of the clock buffer 1501. With the worst case model from the technology library, the total timing delay as a function slew is provided by equation 10.

$$d_{late}^{total}(slew) = d_{late}^{subtree}(S^{buf}(slew, C_{Subtree})) + d_{intrisic}^{buffer}(slew, C_{Subtree})$$ Eq. 10:

The timing delay component of the clock sub-tree in equation 10 is a function of the slew rate of the buffer $S^{buf}$ for the given input slew from the clock signal 101 and the capacitive loading $C_{Subtree}$ of the clock sub-tree 1502 that is on the output driver of the buffer 1501. The timing delay component of the buffer is a function of the slew of the input clock signal 101 and the capacitive loading $C_{Subtree}$ on the output of the clock buffer from the clock sub-tree 1502.

With the best case model from the technology library, the total timing delay as a function slew is provided by equation 11.

$$d_{early}^{total}(slew) = d_{early}^{subtree}(S_{buf}(slew, C_{Subtree})) + d_{intrisic}^{buffer}(slew, C_{Subtree})$$ Eq. 11:

For a given buffer and clock subtree, the timing delay component of the clock subtree may be looked up using a stored clock subtree model such as that illustrated in FIG. 14B. The intrinsic buffer delay component of the total time delay may be extracted from the technology library.

The overall switching energy of the circuit when the buffer 1501 is inserted before the clock subtree is the sum of the switching energy of the clock sub-tree 1502 and the switching energy of the clock buffer 1501 as indicated by equation 12.

$$E^{total}(slew) = E_{sw}^{subtree}(S^{buf}(slew, C_{Subtree})) + E_{sw}^{buffer}(slew, C_{Subtree})$$ Eq. 12:

For a given buffer and clock subtree, the switching energy component of the clock subtree may be looked up using a stored clock subtree model such as that illustrated in FIG. 14C. The intrinsic buffer switching energy component of the total switching energy may be extracted from the technology library.

The total non-switching power consumption of the circuit with the buffer 1501 inserted in the clock path is the sum of the non-switching power consumptions of the clock buffer 1501 and the clock sub-tree 1502 as indicated by equation 13.

$$P_{NSW}^{total} = P_{NSW}^{subtree} + P_{NSW}^{buffer}$$ Eq. 13:

For a given buffer and clock subtree, the non-switching power consumption component of the clock subtree may be looked up using a stored clock subtree model such as that illustrated in FIG. 14D. The intrinsic non-switching power consumption component of the clock buffer may be extracted from the technology library.

With this information, an evaluation can be made if insertion of the clock buffer 1501 in the clock path is proper in the clock tree network of clock signals.

Evaluating Power Under Clock Gating

Previously the switching energy Esw has been computed for the various circuitry in the clock sub-trees and the overall clock typology. Typically, switching power consumption is determined to be the product of energy consumption and clock frequency. However, with the introduction of clock gating, the flip-flops and the wire interconnect is not always switching. There is an average probability that the clock to one or more flip-flops is gated such that power is not consumed when the switching of a clock signal is masked out or disabled. In this case, the switching power consumed is proportional to one minus the probability that the clock is gated to the flip-flop, $(1-Prob_{CG})$. With a single clock gate, the switching power consumption for the clock sub-trees can be calculated using equation 14.

$$P_{sw} = E_{sw} * f_{clk} * (1 - Prob_{CG})$$ Eq. 14

In equation 14, switching power consumption is equal to the product of the switching energy, the clock frequency, and the quantity of one minus the probability that the clock is gated $(1-Prob_{CG})$. The probability $Prob_{CG}$ that a clock signal is gated to one or more flip-flops can be estimated using functional stimulation data.

The function analyzer 910 in FIG. 9A performs functional simulation of the received RTL netlist to determine feasible clock disables. It further considers all the possibilities of implementing the clock disable for each disable signal over a period of time. Thus, a simulation vector for each disable signal may be formed representing a set of values over time for the clock disable signal.

In FIG. 16A, exemplary simulation vectors 1601-1603 are illustrated for X, Y, and Z disable signals. In the exemplary simulation vector 1601, the X disable signal is active during time periods T4-T6 and T10-T15 to disable a clock signal, for example. In exemplary simulation vector 1602, the Y disable signal is active during time periods T4-T6 to disable a clock signal. In exemplary simulation vector 1603, the Z disable signal is active over times T1-T3 to disable a clock signal.

Referring now to FIG. 16B, a clock activity vector 1610 is illustrated for example. Given a clock tree with clock gates, the clock activity vector describes whether a given clock signal is switching overtime. A clock activity vector is not a simulation vector. In FIG. 16B, the clock activity vector 1610 is for a gated clock signal because it does not switch during time periods T4-T6 and T15.

Referring now to FIG. 16C, an ungated clock signal, such as from the clock source, has a clock activity vector 1611 which is all ones. A clock activity vector 1611 with all ones over the given time period T1-T15 represents that the given clock signal is always switching.

Figure 17:
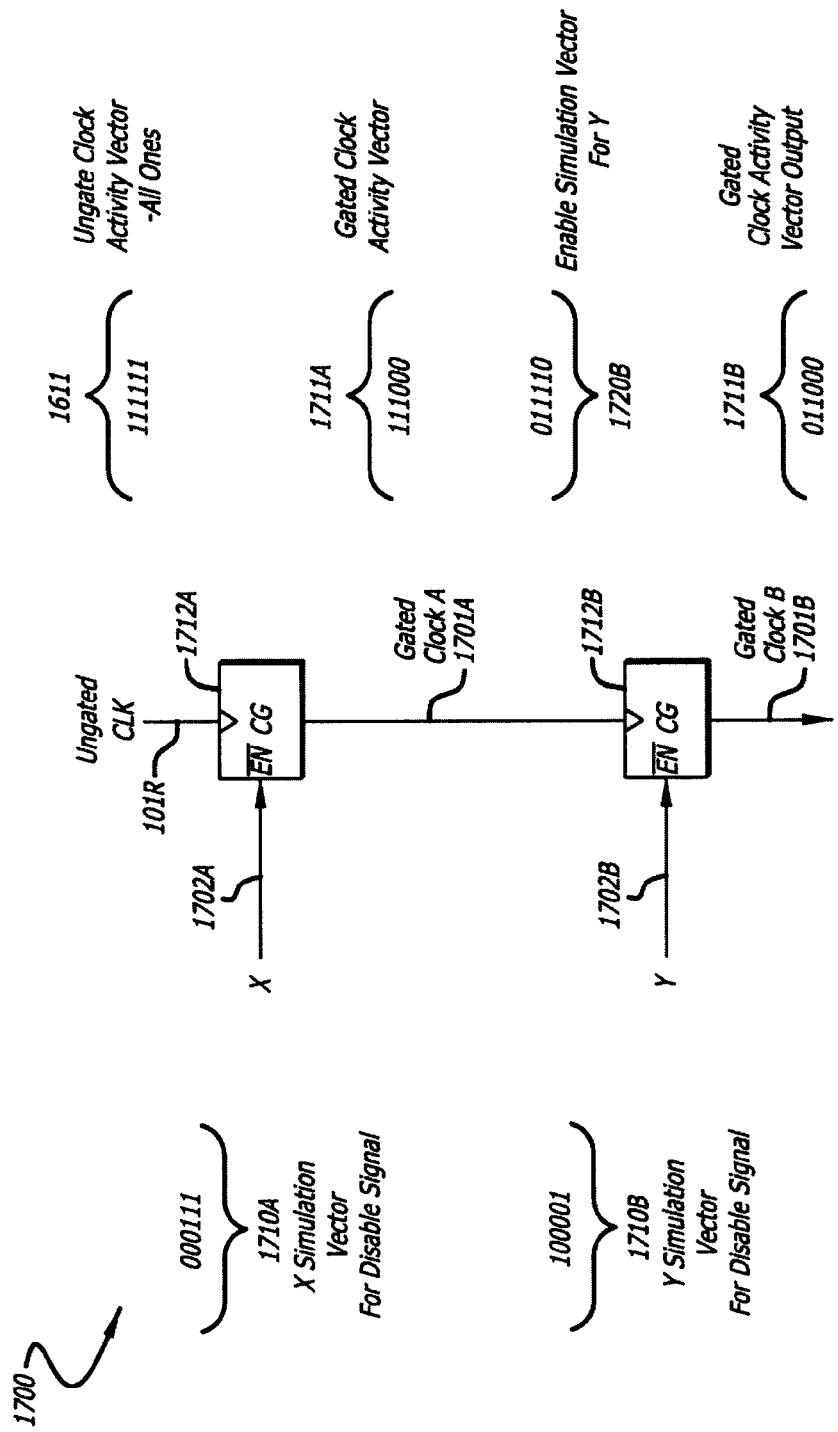
FIG. 17 is a functional block diagram of a clock subtree with clock gates generating gated clock signals in response to the simulation vectors of feasible disable signals to determine the clock activity vectors for the gated clock signals.

Referring now to FIG. 17, a clock tree sub-circuit 1700 is illustrated having clock gates 1712A and 1712B coupled together as shown. Clock gate 1712A receives the ungated clock signal 101R into a clock input and the disable signal X 1702A at its enable input to generate a clock gated signal 1701A. Given the input clock activity vector and the simulation vector for the disable signal of a given clock gate, the clock activity vector of the gated clock signal can be determined.

The ungated clock signal 101R has a clock activity vector that is all ones. Disable signal X has a simulation vector 1710A comprising for example 000111 over six clock cycles. A resultant clock activity vector 1711A generated by the clock gate 1712A in response to the gated clock signal 1710A is illustrated. During the first three time periods the gated clock signal is active and in the last three time periods the gated clock signal is inactive (disabled) because the disable signal 1710A is active.

The gated clock signal 1701A is coupled into the clock input of the second clock gate 1712B. The disable signal Y 1702B is coupled into the enable input of the clock gate 1712B in order to generate the gated clock signal 1701B.

An exemplary simulation vector 1710B for the disable signal Y is 100001. The gated clock 1712B generates an output activity vector 1711B for the gated clock signal 1701B. Exemplary output clock activity vector 1711B is 011000. The first bit is 0 because the disable signal Y is active during the first time period to negate the switching clock signal at the first time period.

To determine the resultant clock activity vector at the output of a clock gate, a bit-wise AND operation may be performed between an inverse simulation vector of a disable signal (enable simulation vector) and the clock activity vector for the clock signal input to the clock gate. Given a clock activity vector, a probability $\text{Prob}_{CG}$ that the output gated clock signal does not switch (inactive) can be estimated. The probability $\text{Prob}_{CG}$ that the output gated clock signal does not switch is determined by dividing the number of zeros in the clock activity vector by the number of bits in the clock activity vector as indicated by equation 15.

$$\text{Prob}_{CG} = \text{number of zeros/number of bits} \qquad \text{Eq. 15}$$

Given the exemplary clock activity vector 1711B for the gated clock signal 1701B generated by the clock gate 1712B, the probability $\text{Prob}_{CG}$ that the output gated clock signal 1701B does not switch is 4/6 or 2/3 (0.667 in decimal format). The probability that it does switch can readily be found by subtracting probability $\text{Prob}_{CG}$ from one or $(1-\text{Prob}_{CG})$.

Merger Algorithm

Ideal clock tree synthesis assumes that the clock signal can reach all elements at the same time (e.g., time zero), such that there is no clock skew (the difference between $d_{late}$ values for best and worst case timing parameters is zero). Thus, if a substantially balanced clock tree network can be formed through planning, than clock timing closure when the clock tree is implemented can readily occur. A clock subtree should not only be balanced within its own branches but also across to other clock subtrees to minimize clock skew. For example, in a binary merger of two clock subtrees, the two clock subtrees with the smallest magnitude of $d_{late}$ values may be initially picked for merger because when joined, they are likely to have the least difference between $d_{late}$ values. After merger, the next two with the smallest magnitude of $d_{late}$ values is considered. Thus, an ordered queue of $d_{late}$ timing values may be used for clock tree planning.

As mentioned previously herein, the clock tree planner 900 includes one or more queues 915 as shown in FIG. 9A. A state machine 950 within the clock tree planner 900 executes states 951-954 with the one or more queues 915 as shown in FIG. 9C to step by step construct a balanced clock subtree, starting from the bottom level of clocked elements and working up to the clock generator 102 at the top level of hierarchy. A merger algorithm for clock tree planning functions in response to the one or more queues 915. The merger algorithm is a bottom-up binary tree building algorithm that starts at the bottom of the clock tree hierarchy with clocked elements (e.g., flip-flops in the flip-flop clusters) and then moves upward towards the clock source that generates the root clock signal, the initial ungated clock signal.

The one or more queues 915 are priority queues, an ordered queue, that lists clocked elements initially and then unmerged clock subtrees as they are constructed and added into the queue. For a given integrated circuit design, the one or more queues 915 are initialized by inserting all of the clocked elements (e.g., the flip-flops, latches, registers, clock gates, etc.) into the queue for a common enable/disable signal.

Figure 32A:
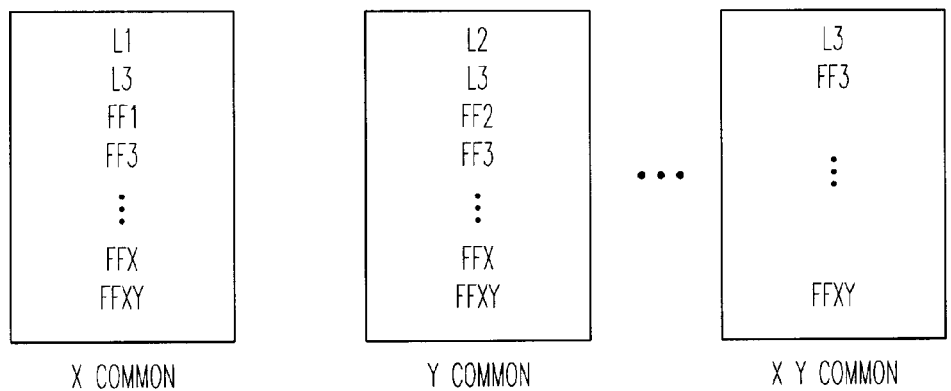
FIGS. 32A-32B are diagrams illustrating one or more priority queues to list clocked elements and clock subtrees having common enable/disable signals that may be used within an integrated circuit design to gate clock signals to the listed elements.

Referring now to FIG. 32A, illustrates a plurality of priority queues 3215A-3215N (instances of the one or more queues 915) to list clocked elements and clock subtrees having common enable/disable signals. For example, latches L1 and L3 and flip-flops FF1, FF3,FFX, FSFXY are listed in queue 3215A for having X disable signal in common. Latches L2 and L3 and flip-flops FF2, FF3,FFY, FSFXY are listed in queue 3215B for having Y disable signal in common. Queue 3215N lists clocked elements and clock subtrees that have both X and Y disable signals in common, such as latch L3 and flip-flops FFY,FFXY in the example.

Figure 32B:
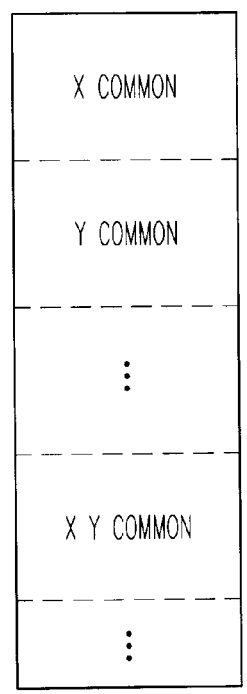

In an alternate embodiment, the plurality of priority queues 3215A-3215N may be organized into a single queue 3125 but segment from each other as illustrated in FIG. 32B.

Once the clocked elements are organized into the queues 3215A-3215N,3215 of common disable signals, they may be ordered in various ways from top to bottom for consideration of mergers or cluster between elements within the queues.

One such order is by physical location (X and Y coordinates on a grid) within a floorplan. Nearest neighbors, responsive to physical placement, may be determined as described herein for merging of clocked elements together into clusters and the merger of clock subtrees into larger clock subtrees. Nearest neighbors may be listed in the queue near each other so that they may be evaluated for merger or clustering together in order to conserve power and balance timing.

Secondarily, timing delay, such as data path slack timing or insertion delay timing, may be used to evaluate the order of each queue 3215A-3215N.

Thus, a list of clocked elements can be arranged in priority based on feasible enable signals, physical location, and timing so that all may readily be considered as criteria for determining merger partners, such as a binary merger of two clocked elements or clocked subtrees. With a single queue, these criteria are not used in a mutually independent fashion. Three factors may be used concurrently for ordering. Feasible enable/disable signals can be used to order the queue. Physical location can be used to order a queue. Timing, such as data path slack timing, may be used to order clocked elements in a queue. For clock subtrees, the timing value of accumulated insertion delay Dlate ma be used to order the queue. In any case, an ordered queue is formed from which to pop a clocked element or clock subtree for consideration of being a merger candidate.

Figure 18:
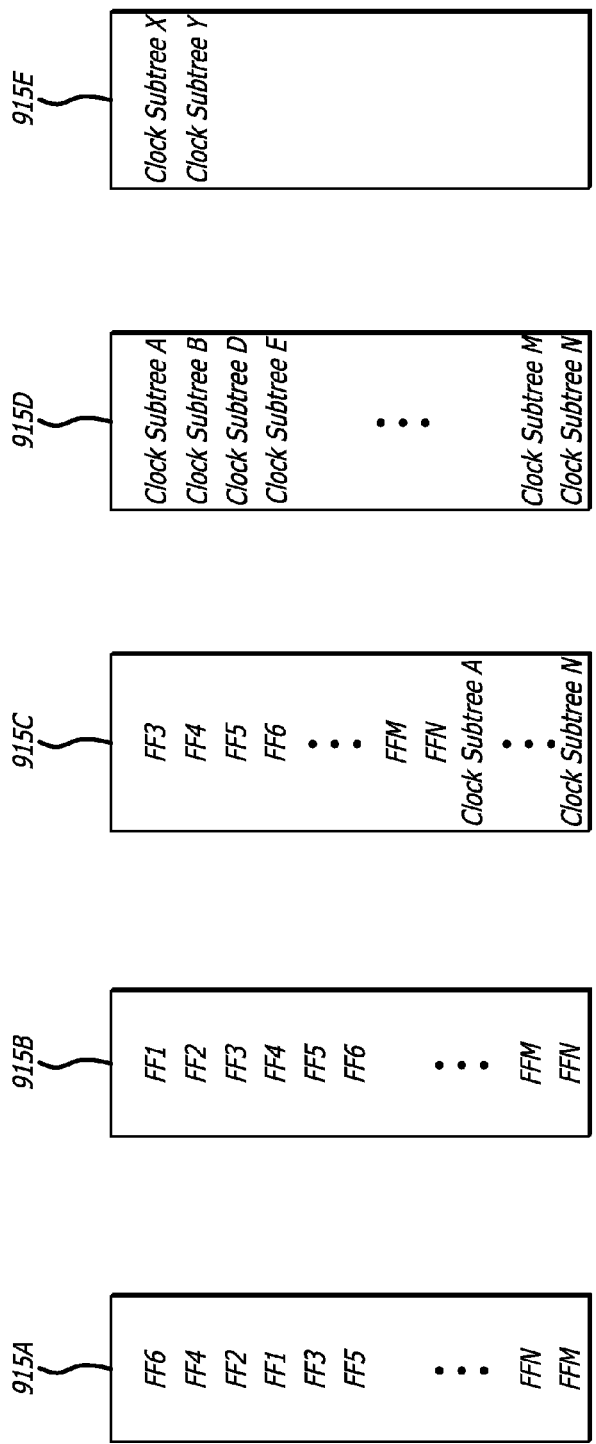
FIGS. 18A-18E are diagrams illustrating various states of one priority queue of the clock tree planner from being initially unsorted to sorted near completion of a portion of a clock tree network.

Consider FIG. 18A, for example, clocked elements (e.g., latches L1-LN, Registers R1-RN, and flip-flops FF1-FFN)

are in queue 915A for a given common enable/disable signal and are desired to be reordered. As mentioned herein, these clocked elements can then be rearranged in a priority order based on physical location. They can also be reordered based on and timing, such as data path slack timing or clock path insertion delay timing. Data path slack timing values for the clocked elements (e.g., data-input slack timing for flip flops), based on a static timing analysis of the circuit using an ideal clock, can also be another time criterion that can be used to decide initial groupings of clocked elements. Similar slack timing implies that the clocked element can receive the clock at the same time, without causing further timing issues. A further ordering in the queue based on slack timing over the common feasible enable/disable signals and neighboring physical location may facilitate forming the initial grouping of clocked elements into clusters (or clock subtrees).

FIG. 18B illustrates an exemplary order in a priority queue 915B based on (accumulated insertion delay $d_{late}$ or slack) timing with latches L1-LN at top of queue 915B with the least time, registers R1-RN in the middle, and flip flops FF1-FFN near the bottom of queue 915B with the most time.

Figure 21:
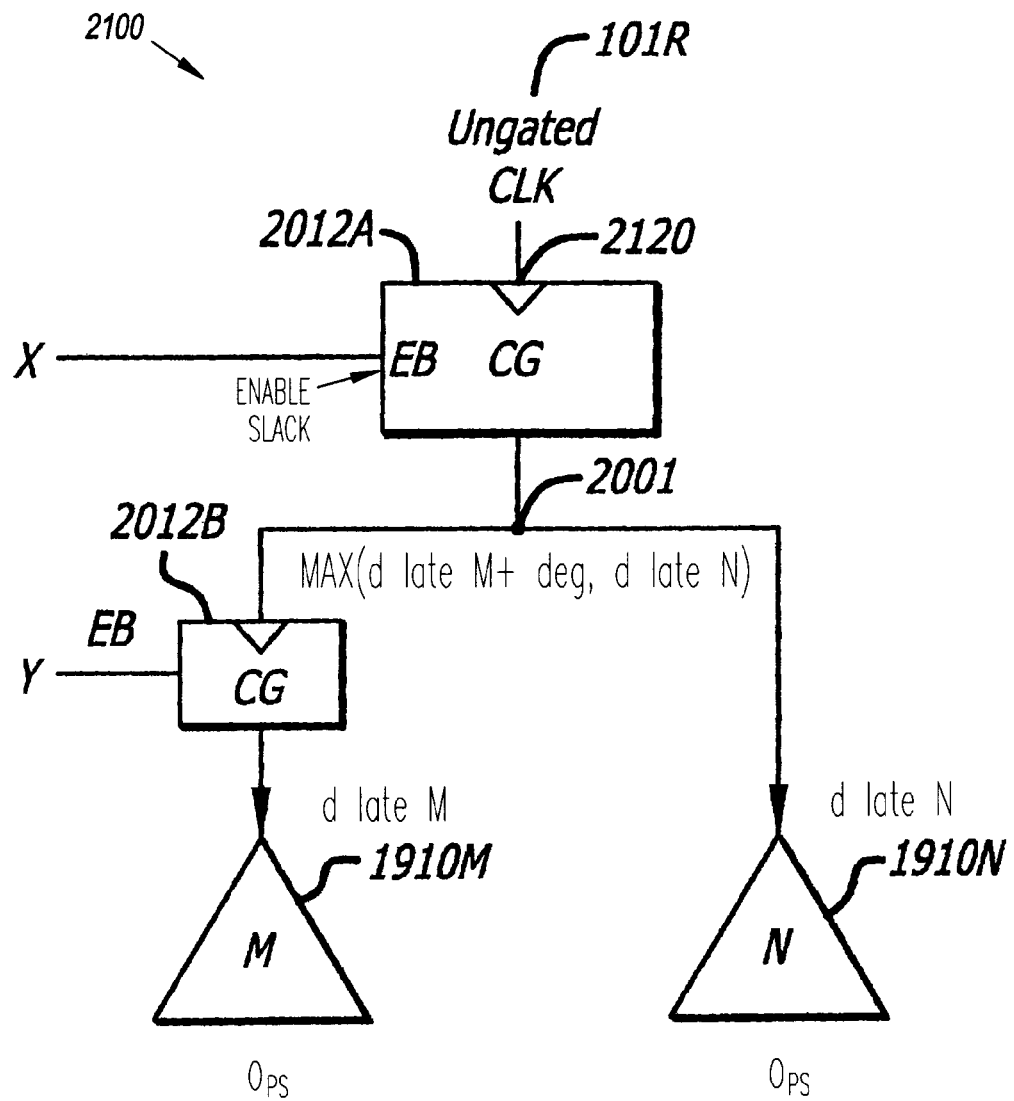
FIG. 21 is a functional block diagram of an exemplary potential merger of clock subtrees at a merge point to evaluate timing and costs of the potential merger with the use of one or more clock gates.

To form a clock tree network from the bottom-up, it is assumed that the clock signal at the lowest level of clocked elements reaches all the clocked elements at the same time, such as time zero or zero picoseconds (0 ps) illustrated by flip-flops 1414A-1414D in FIG. 14A for example. As the flip flop clusters and clock subtrees are formed from the clocked elements, the timing delay of a clock signal through the clock subtrees from the bottom-up to reach an upper merger point or input point accumulates to be the $d_{late}$ timing value described further herein. The clock signal time to the merger point or input point of the subtree at the upper level of hierarchy is then $(0-d_{late})$ or simply $(-d_{late})$, such as illustrated by $-d_{late}M$ and $-d_{late}N$ in FIG. 21 for example. In FIG. 21, $d_{late}M$ and $d_{late}N$ is the time for the clock signal to propagate down through the clock subtrees 1910M and 1910N, respectively.

As clock subtrees are formed from the clocked elements, they are pushed in proper order into the queue 915, such as illustrated by the addition of clock subtrees A through clock subtrees N shown in queue 915C of FIG. 18C. With the order shown in FIG. 18C, the clocked elements (L, R, and FF) have magnitudes of $(-d_{late})$ less than the magnitudes of $(-d_{late})$ for the added clock subtrees. After initialization, the priority queue 915 maintains a constant order so that the least negative $(-d_{late})$ is popped first so that is can be consideration for merger with the next least negative $(-d_{late})$.

The queue 915 can be ordered according to the timing delay signal $(-d_{late})$ to select two of the clocked elements and/or clocked subtrees with the least timing delay so they can achieve balanced timing within the clock tree network. Arranging the queue 915 in order top to bottom, from least negative $(-d_{late})$ to most negative $(-d_{late})$, it is expected that the clocked elements (e.g., flip flops, latches, registers) with (least negative value of $-d_{late}$) are to be closest to the top of the queue in one embodiment, and represent circuits in the leaves or bottom level of clock tree hierarchy of the final clock tree. In another embodiment, the queue 915 could be reverse ordered but operated upon from the bottom up, somewhat in parallel with the bottom-up operation on the hierarchy of the clock tree.

In FIG. 18C, the unmerged clock subtrees A-N and clocked elements (e.g., flip-flops FF1-FFN) are ordered in the queue 915C based on insertion delay, from least negative $(-d_{late})$ to most negative $(-d_{late})$. The order in queue 915B would be equivalent if it were ordered from the smallest magnitude $(+d_{late})$ to the largest magnitude $(+d_{late})$ or simply ordered by increasing magnitude for positive $d_{late}$ $(+d_{late})$. As more and more clock subtrees are formed, all of the lower level clocked elements may have been merged into clusters/clock subtrees such that clock subtrees A through clock subtrees N may only remain in the queue, such as illustrated by queue 915D in FIG. 18D.

Lower level clock subtrees are merged together to form larger clock subtrees with greater levels of hierarchy. Eventually the merger process may only need to evaluate two remaining clock subtrees (e.gl., clock subtree X and clock subtree Y) for merger, such as illustrated by queue 915D in FIG. 18D. With this final merger completed, a balanced clock tree network is formed.

Thus, the queue 915 ordered bottoms-up, conceptually flips the clock tree so that the clock generator is at bottom. The queue is utilized to construct a balanced clock tree network by evaluating mergers of clocked elements and clock subtrees, adjusting physical placement of clocked elements and clock subtrees as needed, and inserting clock buffers and clock gates as needed, all in a bottoms-up hierarchical fashion. While a single clock signal is considered in this example, if there are multiple clock signals generated by a clock generator, each may have its own queue to generate a clock network for each root clock source signal. The clocked elements driven by each clock are put into a separate queue 915 and then ordered so that a balanced clock tree network can be formed.

The state machine 950 in FIG. 9C starts a merger process by popping the clocked element or clock subtree from the top of the queue 915 to start generating a bottoms-up hierarchical order for the clock tree network. The elements in the queue 915 may be ordered by physical location, data path slack timing, and feasible enable/disable signals. Physical placement is important to evaluate to determine how to minimize wire lengths and merge elements together to balance timing delay and power consumption. Timing slack of data paths (data path slack) to clocked elements may be important to evaluate to merger candidates as well as to determine if useful clock skew is available. Grouping FFs/Latches together with a similar timing slack, allows the use of useful skew to improve timing on certain clock/data paths that would otherwise violate timing in the ideal clock scenario. However, even if the timing slacks are different, as long as clock trees are balanced with respect to timing (e.g., insertion timing delay), clock timing closure can be achieved assuming that timing was closed in an ideal clock scenario. Grouping clocked elements together based on feasible enable/disable signals, may provide common clock gating with common enable/disable signals to conserve power.

To achieve timing balance and minimize skew across clock subtrees, the clock subtree with the least $d_{late}$ is considered initially for merger and usually with the next least $d_{late}$. The least $d_{late}$ and the next least $d_{late}$ in the queue should already be closely balanced, requiring minimal changes in placement and added clock buffering to further balance out the difference between $d_{late}$ values substantially to zero. Note that if the difference between a pair of $d_{late}$ values is being balanced out, than the difference between a pair of $d_{early}$ values should also be balanced out.

Figure 19:
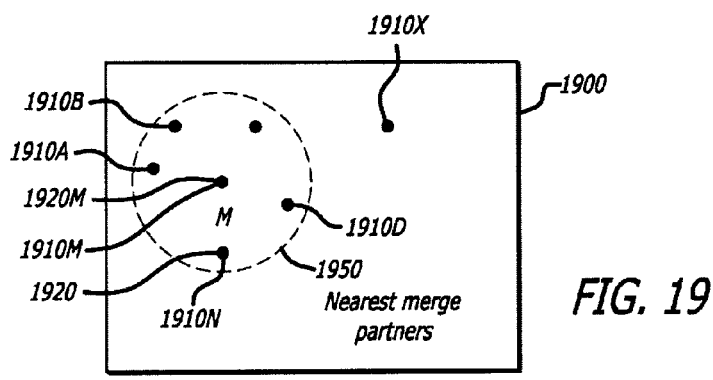
FIG. 19 is an exemplary floor plan of an integrated circuit design to illustrate the selection of potential nearest merger partners to a given clock subtree or clocked element.

Referring now to FIG. 19, a floor plan 1900 of an integrated circuit design is shown to consider the physical placement of clocked elements and clock subtrees therein for evaluating merger candidates. Because a merger operation should be physically aware, nearby clock subtrees and clocked elements may be selected as potential merger partners with the currently popped clock subtree or clocked element.

Assume that clock subtree M 1910M is the currently popped clock subtree for which a merger partner is sought.

The clock subtree M 1910M is placed within the floor plan 1900 with a clock input at a position 1920M having X and Y coordinates. Each clock subtree placed within the floor plan 1900 has a physical position or location 1920 for their respective clock inputs with X and Y coordinates.

Given the position M 1920M associated with the clock subtree M 1910M, a comparison is made with each physical position 1920 of each other clock subtree and clocked element to determine each distance a wire route would need to be made to couple them together. The N nearest unmerged clock subtrees and clocked elements are determined, such as by a distance space lookup. N may be 100, for example, to find the 100 nearest unmerged clock subtrees or clocked element for potential merger with clock subtree M 1910M. For example, clock subtrees 1910A-1910N fall within the N nearest merger partners for the clock subtree M 1910M. However, in comparing distances, clock subtree 1910X falls outside of the N nearest unmerged clock subtrees.

In an alternate embodiment, nearby merger partners may be selected by using a radius R from the position 1920M of the clock subtree 1910 to define a merger partner boundary 1950. Potential merger partners with the boundary 1950 are considered to be the nearest merger partners for evaluation. In another alternate embodiment, a minimum spanning tree may be used to select nearby merger partners for evaluation of a merged clock subtree.

For each of the N nearest merger partners, the merger algorithm forms a pair-wise merge evaluation with the clock subtree 1910M as one of merger partners for each.

Figure 20:
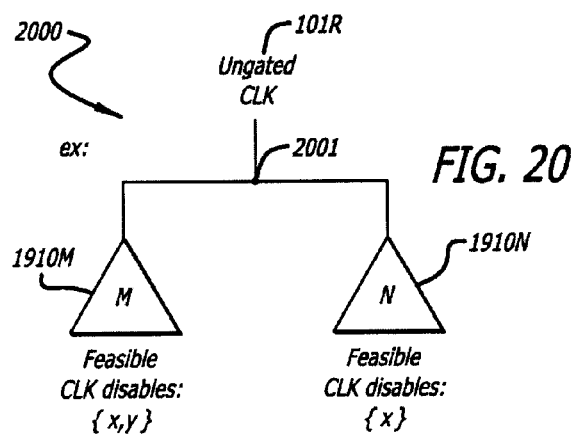
FIG. 20 is a functional block diagram of an exemplary potential merger of clock subtrees at a merge point to evaluate costs of the potential merger without use of a clock gate.

Referring now to FIG. 20, the clock subtree M 1910M and a neighboring clock subtree N 1910N are being evaluated for a pair-wise merge at the merge point Q1001 to form a larger clock subtree 2000. The feasible clock disable signals for each clock subtree 1910M and 1910N have been previously determined. Clock subtree 1910M, for example, has a feasible set of clock disables consisting of disable signals X and Y. Clock subtree 1910N, for example, has a set of feasible clock disables consisting of disable signal X.

For a merger into a larger clock subtree 2000, clock buffers may be added to prevent lower clock subtree input capacitance from exceeding a special capacitance value. A clock buffer may also be inserted into a clock signal path (or enable signal path) in the clock subtree 2000 to minimize unwanted clock timing skew, the difference between early and late timing delays, given some nominal value (e.g., an arbitrary value) of input signal slew in accordance with Eq. 16.

Unwanted clock timing skew=$d_{late}(slew_{nom})-d_{early}(slew_{nom})$ Eq. 16

Moreover, each pair-wise merger into the larger clock subtree 2000 is evaluated to determine if non-common clock gates (a clock gate inserted into one leg or branch of a clock signal path but not the parallel leg or branch off a merger point) are to be inserted in either leg of the clock signal path to each clock subtree 1910M,1910N. A non-common clock gate may be inserted if it provides an overall net power saving.

For example, the ungated clock signal 101R may be gated for the entire clock subtree 2000 (including clock subtree 1910M and 1910N) using a common clock gate that is responsive to the common disable signal X. However in this example, the non-common disable signal Y can only be used to gate the clock subtree 1910N with a non-common clock gate. In this example, a clock gate disabled by the signal Y may be inserted along the clock signal path between the merge point 2001 and the clock subtree 1910M. This clock gate would be a non-common clock gate between the clock subtrees 1910M and 1910N.

Referring now to FIG. 21 and continuing with the example illustrated in FIG. 20, a merged clock subtree 2100 is illustrated differing from clock subtree 2000 with the added clock gates 2012A and 2012B. The clock gate 2012A is a common clock gate that is disabled by the signal X because it is a feasible disable signal that is common to both clock subtree 1910M and 1910N. Clock gate 2012B is a non-common clock gate that is disabled by the non-common disable signal Y that is a feasible clock disable signal for only clock subtree 1910M.

The common clock gate to the pair of clock subtree merger partners 1910M and 1910N typically conserves power for the entire merged clock subtree 2100. However, the non-common clock gate 2012B can either offer a net power savings or it can add a net power cost to the total power consumption of the merged clock subtree 2100. If the non-common clock gate 2012B prevents a signal switching into a large amount of capacitance in the clock subtree 1910M, it may offer a net power savings. On the other hand, the non-common clock gate 2012B consumes power when it's switched and adds additional capacitive loading that must be switched by the output of the clock gate 2012A. If that is the case, additional clock buffering may need to be inserted because of the capacitive loading of the non-common clock gate 2012B. A determination is made if the energy switching of the added non-common clock gate 2012B is less than the product of the energy to switch the clock signals within the clock subtree M times the probability that the disable signal disables the clock signal to the clock subtree 1910M as indicated by Equation 17a.

$E_{sw}^{CG} < E_{sw}^{M} * prob(Y)$ Eq. 17a

When considering mergers of clock subtrees and insertion of a clock gate in the clock signal path above the merged clock subtree, the merged clock subtree must meet a timing requirement governed by the enable or disable signal clocking of the given clock gate being inserted. For example in FIG. 21, consider the merged clock subtree below merger point 2001 and the insertion of clock gate 2012A with the X enable signal. It may be determined that X enable signal has a positive input slack time S (e.g., see FIG. 1D and the discussion thereof) that would allow insertion of the clock gate 2012A. Thus, the magnitude of the merger timing ($d_{late}$) at merger point 2001 for the merged clock subtree must be less than the positive slack time S of the X enable signal at the enable input to the clock gate 2012A as indicated by Equation 17b.

$d$late@merger point$<S$ (slack timing being positive) Eq. 17b

The magnitude of the timing $d_{late}$ at the merger point 2001 (dlate @ merger point) is the maximum of either the sum of $d_{late}$M of the clock subtree 1910M and the $d_{late}$ of the clock gate 2012B or the $d_{late}$N of the clock subtree 1910N. Otherwise, if equation 17b is not satisfied, the clock signal will not properly reach the clock subtree below and the circuits will not properly function. Thus, the enable/disable timing slack sets a ceiling for how much merging of clock subtrees may occur below it. If a potential merger exceeds this requirement, the clock gate may be removed, if possible, or else the potential merger abandoned in favor of a different type of merger.

Common clock disable signals, such as X disable signal in the example of FIGS. 20-21, are optimistically assumed to be implemented using a clock gate at a higher point in the clock tree (e.g., a virtual disable). For example, a clock disable signal Z that could be used to disable all clock subtrees and all the clocked elements therein would be used for a later merger that might merge across all clock subtrees. This is not assured, but it provides a best case scenario to compare mergers between pairs of clock subtrees.

Wires and perhaps clock buffers are added to connect clock signal paths together at the merger point 2001. A common clock gate 2012A was added above the merger point 2001 to form the merged clock subtree 2100 in FIG. 21. The merger point 2001 is not the clock input terminal for the merged clock subtree 2100. A new clock input terminal with its physical placement is determined to be clock input terminal 2120 that may be at or near the clock input terminal of the clock gate 2012A.

The new clock input terminal 2120 of the merged clock subtree 2100 is placed within the floor plan 1900 so that it can be used to determine possible subsequent merges with other clock subtrees. A Deferred Merge Embedding (DME) algorithm; introduced by Masato Edahiro in his paper entitled, Minimum Skew and Minimum Path Length Routing in VLSI Layout Design, published in NEC Research and Development Journal, volume 32 (1991), pages 569-575; may be used to physical place the new clock input terminal of the merged clock subtree.

Given the popped merger candidate from the queue, the merger algorithm evaluates pairs of potential merged clock subtrees, each including the given popped merger candidate. After each pair of potential merged clock subtrees are evaluated, the pair with the minimal additional power cost is selected for implementation and insertion back into the priority Q905. Before a merger, costs may be compared against the neighboring clock subtrees. These merger costs may account for extra clock buffers, extra wiring, non-common clock gating that was implemented and non-common enable/disable signals that were dropped from consideration. The merger costs are evaluated against the power savings of a merger that can reduce redundancy and possibly reduce the switching frequency of clocked circuits to conserver power. If merger costs exceed the power savings for a given proposed merger between clock subtrees, the potential merger may be dropped and a different merger with the popped merger candidate may then be considered.

Figure 22:
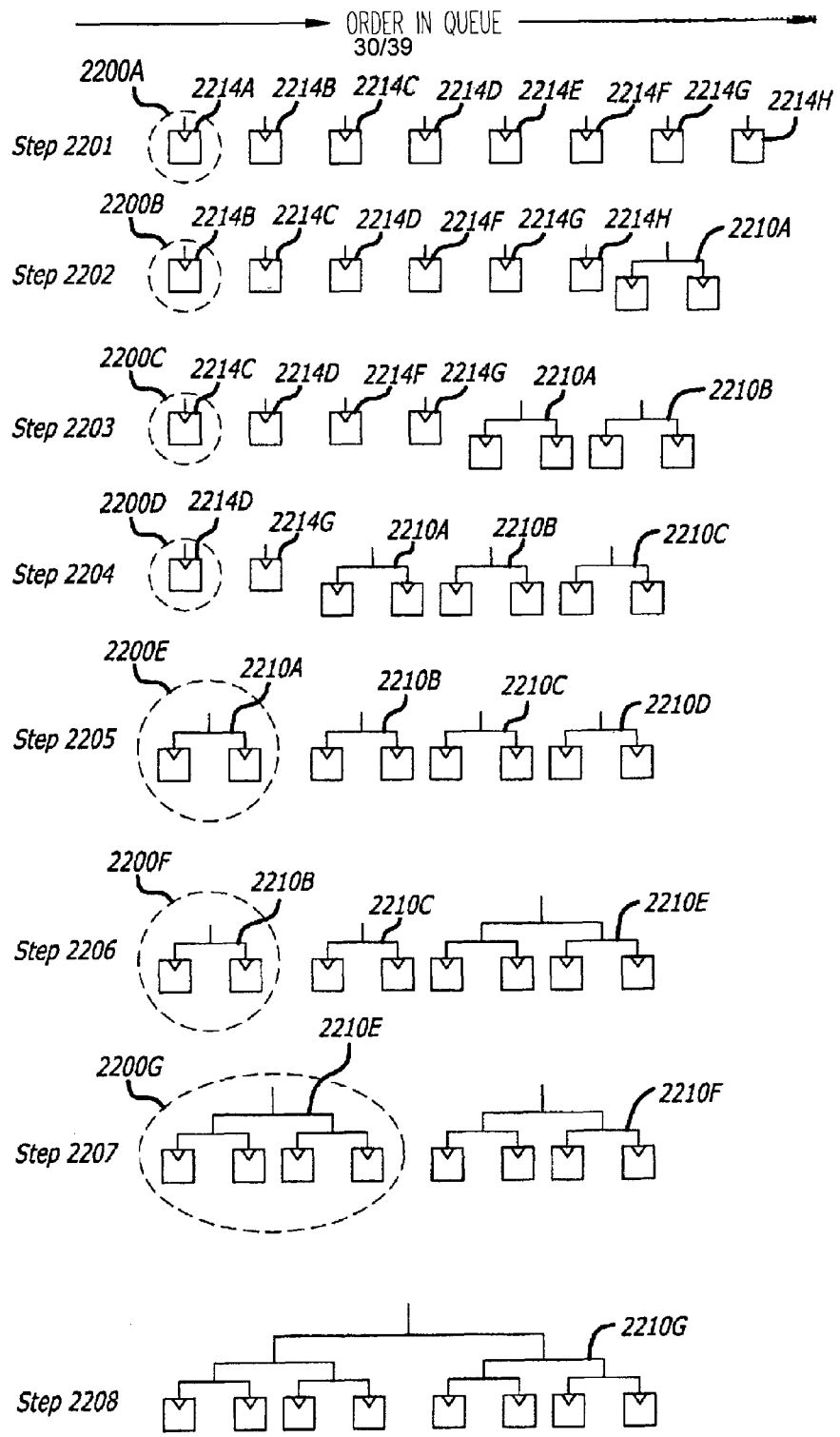
FIG. 22 is a diagram illustrating the process of repeated merger evaluation and implementation using the queue of the clock tree planner through completion of clock subtree mergers.

Referring now to FIG. 22, an example process of mergers of clocked elements and clock subtrees is now described. In the priority queue 915, clocked elements 2214A-2214H may be initially ordered by increasing worst case time delay $d_{late}$, illustrated from left to right in FIG. 22. Because the priority queue 915 is ordered by increasing worst case timing delay (the magnitude of $d_{late}$), mergers may more often occur between least $d_{late}$ and next least $d_{late}$ so that the clock subtrees may grow at a balanced rate. The clocked elements in the priority queue may be flip-flops registers, or latches. The clock subtrees are clusters of one or more latches, one or more flip-flops, or one or more registers with or without clock gates and enable gates.

At step 2201 in the example shown in FIG. 22, assume that there are initially eight flip-flops arranged in an order from left to right under consideration for potential merger pairs. The initial order in the queue 915 for clocked elements may be established under different criteria such as timing, physical placement, or common feasible disable signals. In evaluating merger candidates from the queue 915 during the merging process, flip flops with common feasible disable signals are initially grouped together for evaluation. Next the placement criterion for the flip flops is used to order and group the flip flops into clusters so that that the shortest clock paths with minimal insertion delays are created. Other criteria may be used to evaluate costs and benefits of mergers between clocked elements or clock subtrees. Moreover, timing of the potential mergers between clock subtrees is considered up to the enable slack timing of an enable gate when a clock gate is consider for insertion. Physical placement of clock buffering and clock gating may be considered to further balance out the difference between values of $d_{late}$ for a merger pair, all the while conserving power and energy.

Each of the clocked elements 2214A-2214H may have sets of one or more feasible disable signals to disable the clock input. The intersection of the feasible disable signals (common disable signals) is one criteria for selecting a merger partner. Physical placement may be another criteria for selecting merger partners. A nearest set of N clocked elements (or alternatively those placed within a radial distance) may be evaluated for merger with the selected or popped merger partner 2200A-2200G. Maximum power savings or minimal power costs of a potential merger pair, while meeting timing requirements, may be the criteria for determining if a potential merger pair is to be implemented as a merged clock subtree.

In steps 2201-2207, a selected merger partner 2200A-2200G at the top of the queue (or alternatively the bottom of the queue if ordered differently) is used to determine and evaluate potential mergers with the other clocked elements in the priority queue.

In step 2201, for example, clocked element 2214A is the selected merger partner 2200A that is to be evaluated with the nearest merger partner of clocked elements 2214B through 2214H. For example, it may be determined that a preferred merger partner is clocked element 2214E for merger with clocked element 2214A because it is the one with the minimum additional power cost, for example, and thus it may be implemented as clock subtree 2210A.

At step 2202, clock subtree 2210A is placed in the queue 915 as a result of the merger of the clocked elements 2214A and 2214E. Clocked element 2214B pops to the top of the queue and is now selected for evaluating pair-wise merger partners. At step 2202, it is determined that clocked element 2214H is the preferred merger partner to be merged with clocked element 2214B and is implemented as clock subtree 2210B.

At step 2203, clock subtree 2210B is pushed onto the queue 915 as a result of the pair-wise merge between clocked elements 2214B and 2214H. Clocked element 2214C is popped to the top of the queue 915 to be the selected merger partner 2200C. The clocked element 2214C is evaluated with clocked elements 2214D, 2214H, 2214G, clock subtree 2210A, and clock subtree 2210B. It is determined that clocked element 2214C is the preferable merger partner to merge with clocked element 2214F and is implemented as clock subtree 2210C.

At step 2204, clock subtree 2210C is pushed onto the queue 915 as a result of the merger between clocked element 2214C and clocked element 2214F. Clocked element 2214D is pushed to the top of the stack as the selected evaluation partner 2200D. Clocked element 2214D is evaluated for merger with clocked element 2214G, and clock subtrees 2210A through 2210C. It is determined that clocked element 2214G is the preferable merger partner to merge with clocked element 2214D and is implemented as clock subtree 2210D.

At step 2205, clock subtree 2210D is pushed onto the queue 915 as a result of the merger between clocked elements 2214D and 2214G. Clock subtree 2210A is pushed to the top of the queue 915 and is now the selected evaluation partner 2200E. Clock subtree 2210A is evaluated for merger with clock subtrees 2210B through 2210D. It is determined that clock subtree 2210D is the preferable merger partner to merge with clock subtree 2210A, such as because the merged clock subtree provides maximum power conservation for example, and is implemented as clock subtree 2210E.

At step 2206, clock subtree 2210E is pushed onto the queue 915 as a result of the merger between clock subtrees 2210A and 2210D. Clock subtree 2210B, next in order, is pushed to the top of the queue 915 and is now the selected evaluation partner 2200F. Clock subtree 2210B is evaluated for merger with clock subtrees 2210C and 2210E. It is determined that clock subtree 2210C is the preferable merger partner to merge with clock subtree 2210B, such as because the merged clock subtree provides minimal power costs for example, and is implemented as clock subtree 2210F.

At step 2207, clock subtree 2210F is pushed onto the queue 915 as a result of the merger between clock subtrees 2210B and 2210C. Clock subtree 2210E, next in order, is pushed to the top of the queue to be the selected evaluation partner 2200G. Clock subtree 2210E is evaluated with clock subtree 2210F for a pair-wise merger. At step 2207, it is determined that it is appropriate to merge the clock subtrees 2210E and 2210F together. At step 2208, clock subtree 2210G is formed as a result of the pair-wise merger of clock subtrees 2210E and 2210F. The queue 915 outputs the clock subtree 2210G for implementation. Another set of clocked elements and/or clock subtrees may be queued up into the priority queue for clock tree merger evaluation until the entire clock tree network is evaluated.

Previously, balanced merger partners were formed as a result of the merger order in the queue being based on timing delay. However, different levels of hierarchy may be evaluated to determine if they can be merged together.

Referring now to FIG. 23A, an exemplary pair-wise merge between a clock subtree 2310 with multiple levels of clock hierarchy is evaluated with a clocked element 2314 at the lowest level of the clock hierarchy. Due to the differences in level of clock signal hierarchy, simply merging clock subtree 2310 with the clocked element 2314 at a merger point 2301 would result in an imbalanced clock tree. Clock signal timing skew, the difference between worst case timing delay and best case timing delay of a clock signal at a given input slew, $d_{late}(slew) - d_{early}(slew)$, is different for the clock path through the multiple levels of clock hierarchy of the clock subtree 2310 to its clocked elements and the direct clock path to the clocked element 2314.

Referring now to FIG. 23B, a merged clock subtree 2300 is formed with clock buffers 2322A through 2322C inserted into the clock path between the merger point 2301 and the clock input of the clocked element 2314. The inserted clock buffers 2322A-2322C provide three levels of clock buffering to balance out timing delays experienced in the hierarchy of the clock subtree 2310 and differences in clock signal timing skew. The clock subtree 2310 has three levels of clock buffering before the clock signal reaches the clocked elements at the bottom or lowest level of hierarchy in the clock subtree.

While the merged clock subtree 2300 with inserted clock buffers 2322A-2322C may be now balanced for timing delay and clock signal timing skew, power consumption has been increased as a result of the addition of the three inserted clock buffers 2322A-2322C. Thus, imbalanced merger partners (such as clock subtree 2310 and clocked element 2314) are usually avoided because the extra clock buffers added drive up power costs outweighing the balancing of the timing delays and clock signal timing skew.

As mentioned previously, the clocked elements may have feasible disable signals associated with them for which clock gating may be shared. Merger partners that can share clock gating are preferred.

Figure 24A:
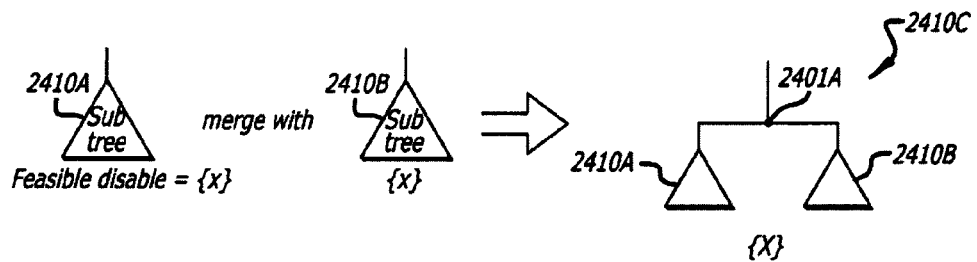
FIGS. 24A-24C are functional block diagrams to evaluate costs of exemplary potential mergers between clock subtrees with and without clock gating in response to respective feasible disable signals.

Referring now to FIG. 24A, a determination is to be made whether clock subtree 2410A can be merged with clock subtree 2410B. A feasible disable signal for the clock subtree 2410A comprises the set of an X disable signal. Similarly, the set of feasible disable signals for the clock subtree 2410B comprises the X disable signal. As a result of both clock subtrees 2410A and 2410B having a common feasible disable signal, the X disable signal, they can be readily merged together to form a merged clock subtree 2410C at the merger point 2401A. The merged clock subtree 2410C has the X disable signal as a feasible disable signal.

However, it may be the case that a pair of clock subtrees has no common feasible disable signal but may still be worth merging together into a larger clock subtree.

Figure 24B:
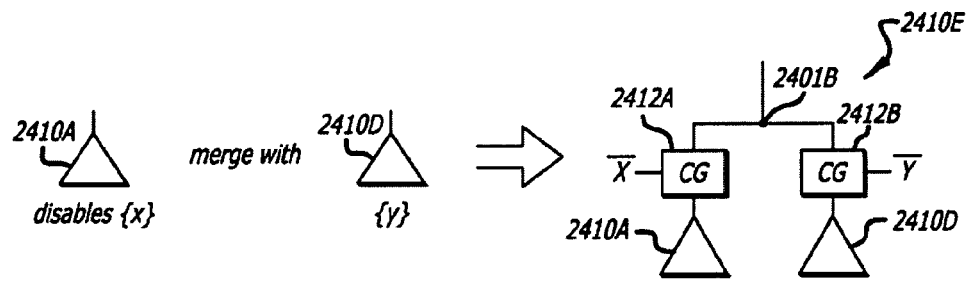

Referring now to FIG. 24B, clock subtrees 2410A and 2410D have no common clock gating because of they have no common feasible disable signal but different feasible disable signals comprising X and Y disable signals, respectively. If merged together, clock subtrees 2410A and 2410D would form a merged clock subtree 2410E including non-common clock gates 2412A and 2412B between the merge point 2410B and the respective clock subtrees 2410A and 2410D. As a result of this merger, clock subtree 2410E would have no common disable signal. Its set of feasible disables is an empty set as shown. Regardless, merger costs of the merged clock subtree 2410E needs to be evaluated against the merger benefit of reduced power consumption in each of clock subtrees 2410A and 2410D due to the gated clock signals into each. Each of the clock subtrees 2410A and 2410D has at least one or more clocked elements for which power can be saved if a gated clock signal reduces the switching frequency.

As indicated by equation 18, if the merger cost to actually implement the clock gates 2412A-2412B is only twice the time as the switching power of a single clock gate, without any further power consumption due to substantial wiring or otherwise, then the merger of clock subtrees 2410A and 2410D into clock subtree 2410E is worth implementing.

$$\text{Merger Costs} = 2 * E_{sw}^{CG} \qquad \text{Eq. 18}$$

However, it may be the case that the implementation cost of the clock gates is too much. Regardless, a determination may be made as to whether clock subtrees should instead be merged together without any adding any clock gates and gating clock signals.

Figure 24C:
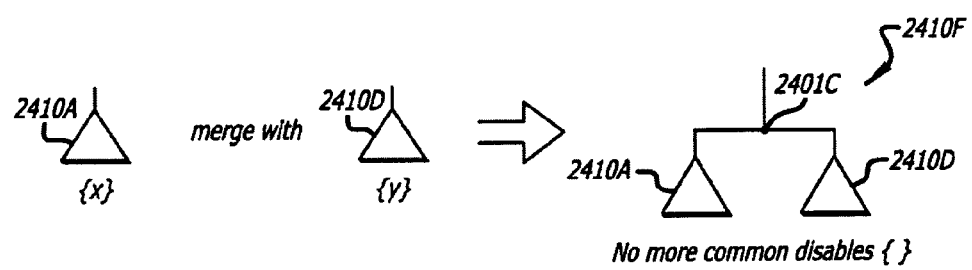

Referring now to FIG. 24C, a determination is made whether clock subtree 2410A should to be merged together with clock subtree 2410D, without the use of clock gating. In this case, the proposal is to merge the clock subtrees 2410A and 2410D into clock subtree 2410F. The clock inputs of the clock subtrees 2410A and 2410D are directly coupled together at the merger point 2401C. The power cost of this merger is a lost opportunity cost due to the lack of clock gating. That is, given the feasible disable signals, power consumption is not conserved due to the lack of clock gating. In this case, the cost is the sum of products of the probability that the disable signals would disable the switching energy in each of the clock subtrees 2410A and 2410D as evidenced by Equation 18. Because the switching energy cost is likely to be high, due to all the switching energy in each of the clock subtrees being summed together, the merger of clock subtrees 2410A and 2410D into clock subtree 2410F is typically not worth implementing. However, with few clocked elements, the merger of clock subtrees 2410A and 2410D into clock subtree 2410F may be the minimal cost merger.

$$\text{Merger Costs} = \text{Prob}_{CG}(X) * E_{sw}^{subtree\,M} + \text{Prob}_{CG}(Y) * E_{sw}^{subtree\,N} \qquad \text{Eq. 18}$$

The distance between a pair of clock subtrees may be considered in whether or not to implement a merged clock subtree. Pairs of clock subtrees that may be merger partners with shared clock gating may be located close together or further apart within the set of potential merger partners.

Figure 25:
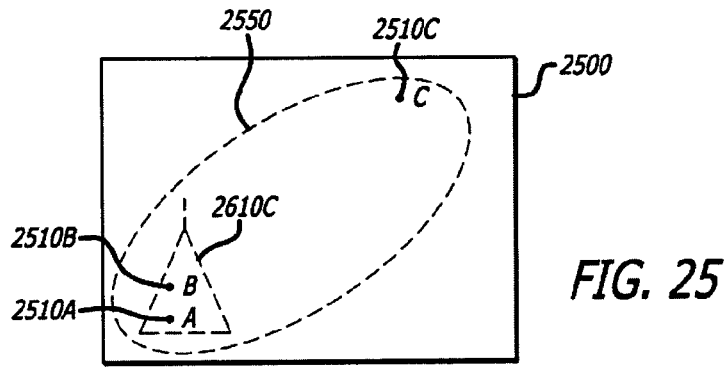
FIG. 25 is an exemplary floor plan of an integrated circuit design to evaluate varying distances between exemplary potential merger partners of a given clock subtree.

Referring now to FIG. 25, consider the exemplary floor plan 2500 with clock subtrees 2510A, 2510B, and 2510C placed therein. A neighborhood boundary of merger partners 2550 includes the clock subtrees 2510A-2510C. Typically, merger partners with the same feasible clock disable signal are preferred to be merged together. However, the proximity of clock subtrees is a factor to consider given the energy cost in switching a clock signal over a long wire route due to parasitic capacitance. Moreover, resistances that are encountered with a long wire route coupled with the parasitic capacitance that may introduce clock timing delays (RC time delay) and clock signal timing skew (difference in late and early timing delay) into the clock signal at clock end points.

Figure 26A:
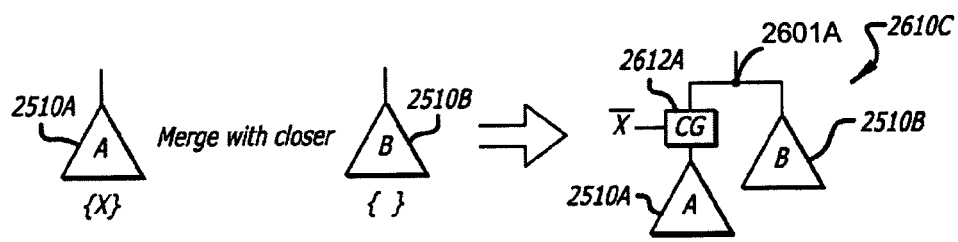
FIGS. 26A-26C are functional block diagrams to evaluate costs of potential mergers of clock subtrees with varying distances between merger partners such as shown in FIG. 25.
Figure 26B:
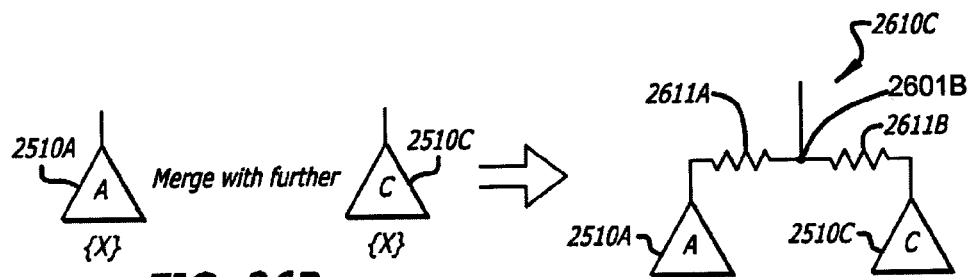

Reference is now made to FIGS. 26A and 26B. An evaluation is undertaken to determining whether or not to merge clock subtree 2510A with clock subtree 2510B or clock subtree 2510C. As illustrated in FIG. 25, for example, clock subtrees 2510A and 2510B are close together. Clock subtrees 2510A and 2510C are significantly further apart in the comparison of their placement or clock input terminal locations as shown in FIG. 25.

In FIG. 26A, an evaluation is to be made of merging clock subtrees 2510A and 2510B together as they are the closer merger partners. Clock subtree 2510A has one feasible clock disable signal, for example, comprising the X disable signal. Clock subtree 2510B has no feasible disable signal, for example, as indicated by an empty set. Thus, clock subtree 2510B is to be constantly clocked by an ungated clock signal.

If clock subtrees 2510A and 2510B are to be merged together, a merged clock subtree 2610C would be formed. The merged clock subtree 2610C has an inserted clock gate 2612A that is gated by the X disable signal on the clock path between the merger point 2601A and the clock subtree 2510A. Clock subtree 2510B is directly coupled to the merger point 2601A because it can't be gated by any disable signal. The merger cost of merging clock subtrees 2510A and 2510B together is essentially the switching energy cost in switching the clock gate 2612A. A comparison of this merger cost is made with the merger cost of merging clock subtrees 2510A and 2510C together.

Referring now to FIG. 26B, an evaluation is made of merging clock subtrees 2510A and 2510C together at merger point 2601B to form a larger merged clock subtree 2610E. The pair of clock subtrees 2510A and 2510C are further apart than the pair of clock subtrees 2510A and 2510B. However, the pair of clock subtrees 2510A and 2510C has a common feasible disable signal in this example, disable signal X. Thus, the clock subtrees 2510A and 2510C may be disabled by the same disable signal to conserve power. Moreover, they may presumably be gated by a clock gate much higher in the clock tree hierarchy, another possible factor to consider when selecting to implement the merged clock subtree.

However, the distance between the clock subtrees 2510A and 2510C causes parasitic resistances and/or capacitances as indicated by the respective passive impedances 2611A, 2611B between the merger point 2601B and the clock subtrees 2510A,2510C. Thus, the cost of the merged clock tree 2610E is the energy cost in switching the extra wire impedances 2611A and 2611B. Because the energy used to switch a few gates is relatively infinitesimal, not much distance is required between clock subtrees 2510A and 2510C before the switching energy of the long wire is greater than the switching energy of the single clock gate 2612A (see Equation 20). Thus, the clock subtrees 2510A and 2510B of the closer merger partners is typically preferred over distant merger partners, even though there is no common feasible disable signals and only noncommon clock gating. Clock buffering that may be inserted into the clock paths to compensate for the parasitic impedances 2611A-2611B, only increases the preference for the closer merger partner.

$$E_{sw}^{wire} > E_{sw}^{CG} \quad \text{Eq. 20}$$

Figure 26C:
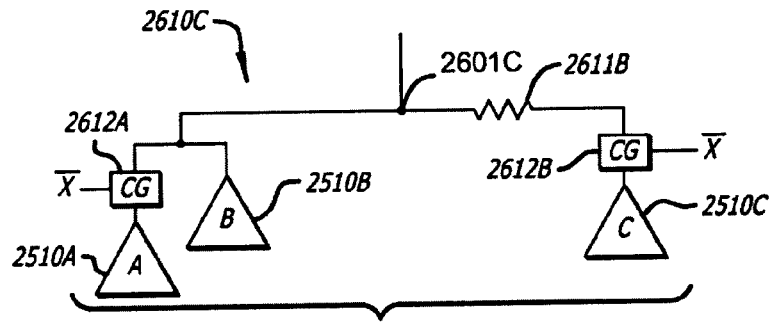

Referring now to FIG. 26C, when large distances exist between merger partners, clock gating is preferably used in the lower level of clock hierarchy if there are common feasible disable signals. With common disable signals and distant merger partners, clock gate cloning may automatically be used to implement clock gates for multiple subtrees that are to be merged together.

Clock subtree 2610C is to be merged with clock subtree 2510C at the merger point 2601C. The parasitic impedance 2611B results from the long wire route from the clock subtree 2510C to the merger point 2610 that is closer to the clock subtree 2510C. Clock gate 2612A of clock subtree 2610C is cloned into clock gate 2612B that is placed between the merger point 2601C and the clock subtree 2510C. In this case, the clock gates 2612A-2612B can gate a clock signal to clock subtrees 2510A,2510C to conserver power while the clock subtree 2510B is constantly switched over a shorter clock signal path to further conserve power.

In FIG. 9A, the optimizer-placer 913 of the clock tree planner 900 may evaluate simulation vectors for the feasible disable signals when multiple levels of clock gating are possible in a clock subtree. These simulation vectors may be correlated bit wise to actually determine if power is saved by a clock gate and its respective simulation vector.

Figures 27, 28:
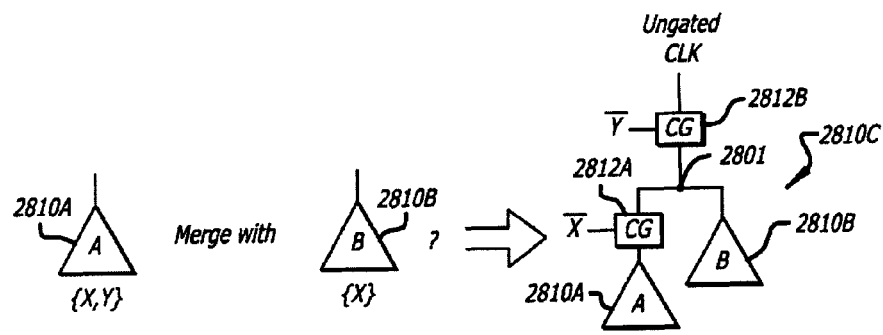
FIG. 27 is a timing diagram illustrating exemplary simulation vectors for feasible disable signals across potential clock merger partners to perform a bit wise compare and analyze feasibility of implementing clock gates and whether power is conserved in response to the simulation vectors.
FIG. 28 is a functional block diagram to evaluate costs of a potential merger of clock subtrees using the exemplary simulation vectors for the feasible disable signals shown in FIG. 27.

Referring now to FIG. 27, an exemplary simulation vector 2701 for an X feasible disable signal is illustrated adjacent an exemplary simulation vector 2702 for a Y feasible disable signal. In one embodiment of the invention, a logical zero value at a given time period in a simulation vector indicates that a gated clock signal is allowed to switch while a logical one indicates that the gated clock signal is disabled and does not switch during the given time period. In another embodiment, the logical values may swap to indicate when a gated clock signal is actively switching and disabled. Simulation vectors 2701-2702 are examples of simulation vectors over simulated time periods of time period T1 through time period T10.

Simulation vector 2701 for the X disable signal has a bit pattern of 0000000111 over time period T1 through time period T10. Simulation vector 2702 for the Y disable signal has a bit pattern of 0011111111 over time period T1 through time period T10. The last three bits of the X simulation vector in time periods T8 through T10 are logical one as are the last three bits of the Y simulation vector. If both X and Y disable signals are used to gate clock signals in the same clock path from a clock generator, the correlation between the last three bits indicates that the X disable signal provides no additional gating of a clock signal over that of the Y disable signal. In this case, a single clock gate responsive to the Y disable signal may be all that is need to conserver power in reducing the switching of the clocked elements at the lower levels of hierarchy in the clock tree.

Referring now to FIG. 28, an evaluation of whether clock subtrees 2810A and 2810B should be merged together is made. Clock subtree 2810A has a set of feasible disable signals of consisting of X and Y disable signals. Clock subtree 2810B has a set of feasible disable signals consisting of the Y disable signal. Thus, the Y disable signal is common to both clock subtrees 2810A and 2810B. However, the X disable signal is not common to both clock subtrees 2810A and 2810B. The X disable signal is uncommon disable signal. Assume that the exemplary simulation vectors for X and Y disable signals of FIG. 27 are used to evaluate the merger of the clock subtrees 2810A and 2810B.

Assuming a maximum clock gating to achieve maximum power conservation, clock subtrees 2810A and 2810B may be merged together to form the merged clock subtree 2810C. The merged clock subtree 2810C includes a pair of clock gates 2810A-2810B and clock subtrees 2810A-2810B coupled together as shown. Clock gate 2812A at a lower level of clock tree hierarchy is gated by the X disable signal. Clock gate 2812B at an upper level of clock tree hierarchy is disabled by the Y disable signal. Clock gate 2812B is an implied optimistic clock gate due to the disable signal Y being common to the feasible sets of disable signals for both of the clock subtrees 2810A and 2810B.

In FIG. 27, when comparing the simulation vectors 2701 and 2702 together, it can be seen that the simulation vector for the disabled signal X provides no clock gating that is not otherwise provided by the Y simulation vector. The X disable signal only disables the clock signal during time periods T8, T9 and T10. The Y disable signal disables the clock signal during time periods T8, T9 and T10 as well. Thus, it is expected that the clock gate 2812A does not provide much in power savings when added to the clock path between the merge point 2801 and the clock subtree 2810A.

As discussed previously herein, Equations 14 and 15 may be used to determine the power consumption of the merged clock subtree 2810C with and without the clock gate 2812A. The power savings may then be compared with the additional power consumed by adding the clock gate 2812A. Given that simulation vector 2701 indicates that the clock to clock subtree 2810A is infrequently gated, it is likely that the vector-based calculation for power consumption correctly identifies that the addition of the clock gate 2812A provides no power savings at all and may consume more when added. In which case, the non-common clock gate with the non-common disable signal X will be removed from the merged clock subtree 2810C before the merged clock subtree is implemented. In a circuit with the same feasible disable signals but different simulation vectors, the gated clock 2812A may indeed conserve power and remain in the merged clock subtree.

From this, it can be observed that the activity of a disable signal may forecast whether it is used to gate a clock gate or not and its position within the clock tree hierarchy. A relatively inactive disable signal, such as X disable and its simulation vector 2701, needs to gate a large capacitor such as from a long wire route or a large clock subtree to offer a net savings in power consumption when its added to the clock tree. This foretells placement of a relatively inactive disable signal in the hierarchy so that when it is disabled, a greater amount of power consumption is reduced. In contrast, a relatively active disable signal can be used to gate smaller subtrees for a net power savings in comparison with the switching power added by the clock gate. This foretells that relatively active disable signals, that more often disables a clock signal, may be more commonly used at lower levels of the hierarchy if possible.

Integration with Clock Tree Synthesis

The resultant output of the clock tree planner 900 is a fully placed clock tree network including the physical placement of clock gates, clock buffers, enable gates, and clocked elements with clock signal routes or enable signal routes defined between each. However in some cases, the final implementation of the clock tree network may be better left to a clock tree synthesizer.

In one embodiment, the clock tree planner is integrated with a clock tree synthesizer to better perform the implementation of the clock tree network. In other embodiments, the clock tree planner is an independent ECAD tool. To prepare the clock tree plan for implementation by a clock tree synthesizer, the clock buffers and wire routing formed during the clock tree planning process may be ripped out. What remains is the physical placement of the clock gates, enable gates, and the clocked elements (e.g., the flip-flops) within a floor plan. The clock tree synthesizer may better insert clock buffers within the clock tree network. Wire routing of clock signals may then be performed by a router that can overcome blockages, better follow layout rules, and utilize the multiple layers of wire interconnect that may be available to route a clock signal.

Figure 29:
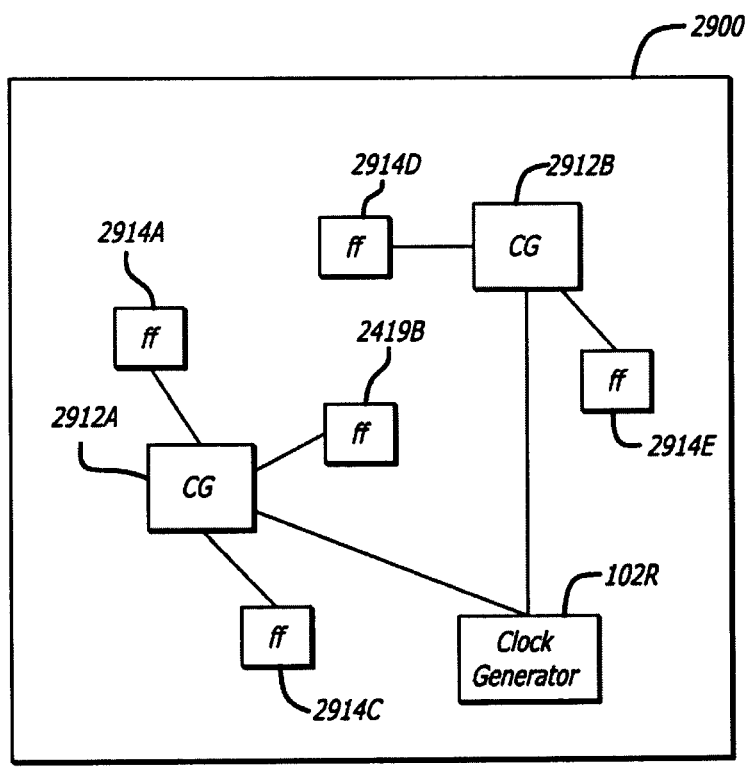
FIG. 29 is an exemplary floor plan of an integrated circuit design with physical placement of clock gates with respect to the clocked elements and clock generator in the clock tree that may be generated by the physical clock topology planner.

Referring now to FIG. 29, a floor plan 2900 of an integrated circuit design is illustrated. The floor plan 2900 includes clock gates 2912A-2912B, flip-flops 2914A-2914E, and clock generator 102R placed within the floor plan at their respective locations with X and Y coordinates. The floor plan 2900 is a physical gate topology that may be used by a clock tree synthesizer or integrated synthesizer. The floor plan of the clocked tree topology is passed on to the synthesizer for completion of the clock tree using a clock tree synthesizer and a router for interconnecting the clock signal wires along the clock paths to the clock gates, the clock buffers, and the clocked elements.

Methods of Physical Clock Topology Planning Processes

Figure 31:
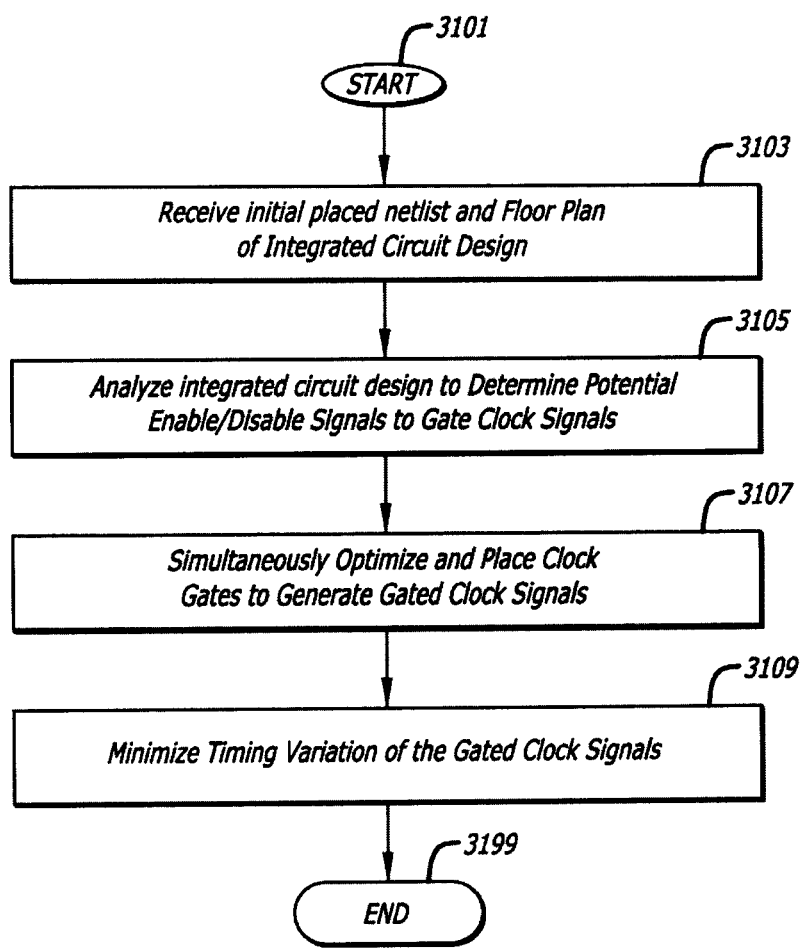
FIG. 31 is a flow chart diagram depicting an exemplary process associated with the physical clock tree planning of a clock tree network within an integrated circuit design.

Referring now to FIG. 31, a flow chart diagram depicting an exemplary process 3100 associated with the physical clock topology planning process for designing integrated circuits is shown. The process 3100 begins with block 3101 and then goes to process block 3103.

At process block 3103, an initial placed netlist and a floorplan of an integrated circuit design may be received. The initial placed netlist includes placement of a plurality of flip flops and one or more clock enable logic gates (clock gates). The process then goes to process block 3105.

At process block 3105, the integrated circuit design is analyzed to determine potential or feasible enable signals that may be used to gate the clock signals and generate gated clock signals that are coupled into the clock input of the plurality of flip flops to reduce power consumption. The process then goes to process block 3107.

At process block 3107, simultaneously optimizing and placing the clock enable logic gates are placed and simultaneously optimized in clock paths towards the plurality of flip flops in order to generate the gated clock signals and reduce the switching frequency of the plurality of flip flops. The feasible enable or feasible disable signals are analyzed to determine the logic signals that may be used to gate the clock of the clock signals and clock the plurality of flip-flops efficiently in order to conserve power.

A static timing analysis on the placed netlist may be performed to determine any criticalities in the timing of the enable signals or disable signals that may be used to gate the clock signals to the plurality of flip flops. Insertion delay in the enable signal to a clock gate due to the addition of enable logic gates is optimized so that it is reduced to as little delay as possible. Physical placement of the enable gate with respect to the clock gate can be adjusted to optimize the insertion delay out of the enable signal timing. With the insertion of a clock gate in the clock signal path, the insertion timing delay of the clock signal down to the clock gate can be balanced with the timing delay of the gated clock signal from the clock gate down to the flip flop. If the fanout on a clock gate is large, the clock signal timing may be improved by splitting up the fanout and cloning the clock gate so that the timing delay from the clock gate to the flip flops is reduced. The optimizing process may further include merging at least two clock gates together and clocking the plurality of flip flops with fewer gated clock signals to eliminate redundant circuits and reduce power consumption thereby.

The optimizing process may further include grouping a plurality of flips flops together that are gated by a common enable signal into one or more clusters (flip flop clusters). The flip flops in each cluster can then be clocked by a single gated clock signal generated by a single clock gate.

Further optimization may be had by regrouping flip flops across two or more clusters that have a common enable signal in order to reduce wire lengths and wire congestion and reduce power consumption.

If enable timing is poor, the optimization process may include ungating flip flops that have poor enable timing. The optimization process may also ungate flip flops when power consumed by the clock gate that generates the gated clock signal for the flip flops is greater than the power saved by clocking the flip flops with the gated clock signal.

After the optimizing process, the process can then go to process block 3109.

At process block 3109, variations in timing of the clock edges in the gated clock signals are minimized to more efficiently clock the plurality of flip flops to capture data. Timing variations may be minimized by placing the clock gates with respect to placement of the flip flops to minimize skew variation and placing the enable gates with respect to the clock gates to generate enable signals to minimize the negative slack on enable signal paths to the clock gates.

Timing variations can also be minimized by building a skew balanced clock tree prototype including placement of virtual clock buffers. Timing variations can also be minimized by building partial tree models, also referred to as clock subtrees herein at each node of the clock tree to model power and timing delay tradeoffs. Then, the clock gates may also be placed in response to the skew balanced clock tree prototype and the partial tree models to maximize power savings.

Processes of the physical clock topology planning process may be repeated, such as processes 3101 through 3109, for each clock subtree from the bottom of the clock tree network until the clock generator at the top of the clock tree network is reached.

Computing Apparatus

Figure 30A:
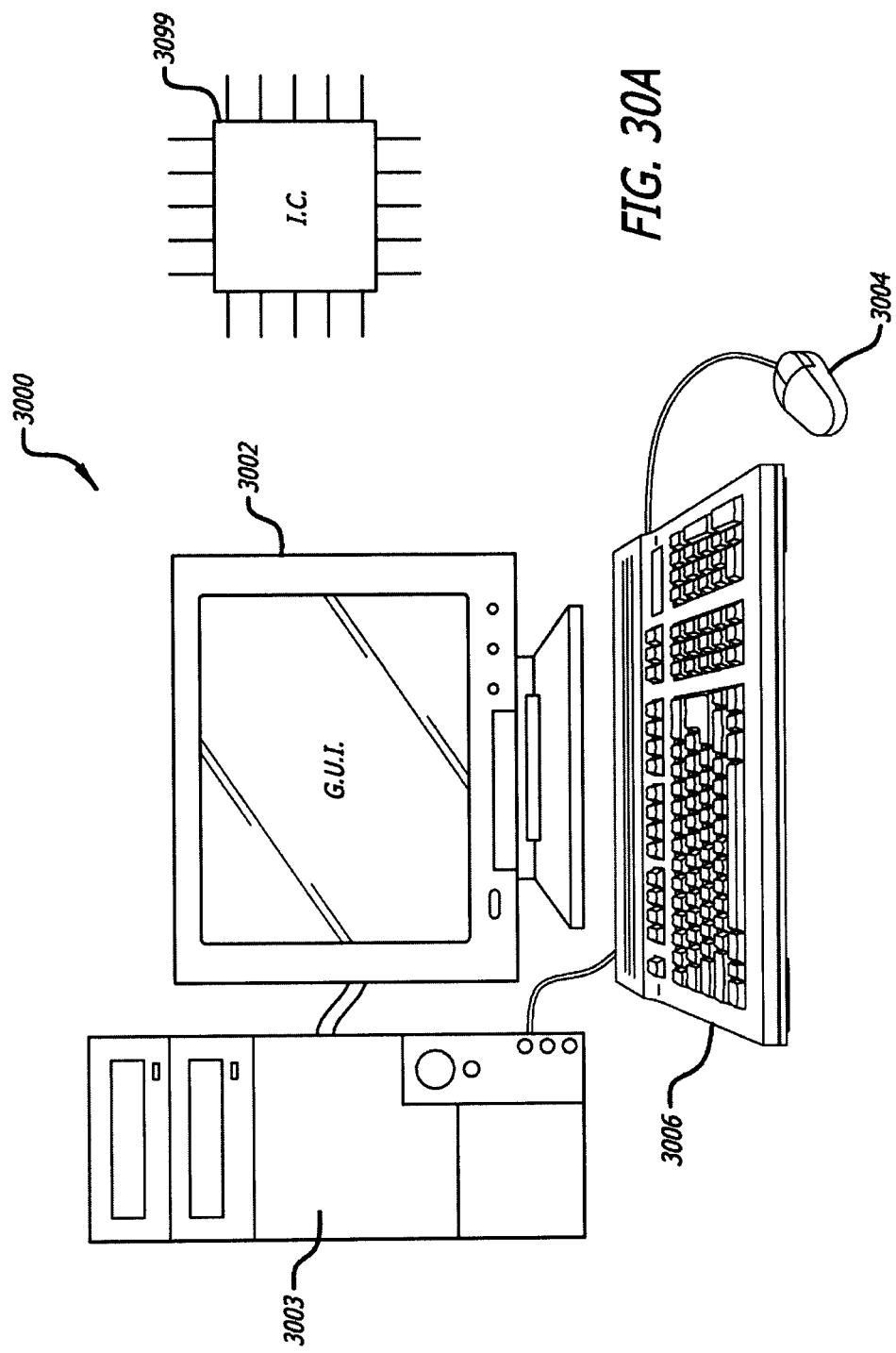
FIGS. 30A-30B are diagrams of a computer system with a processor that executes instructions to provide physical clock tree planning that may be used to design integrated circuits.
Figure 30B:
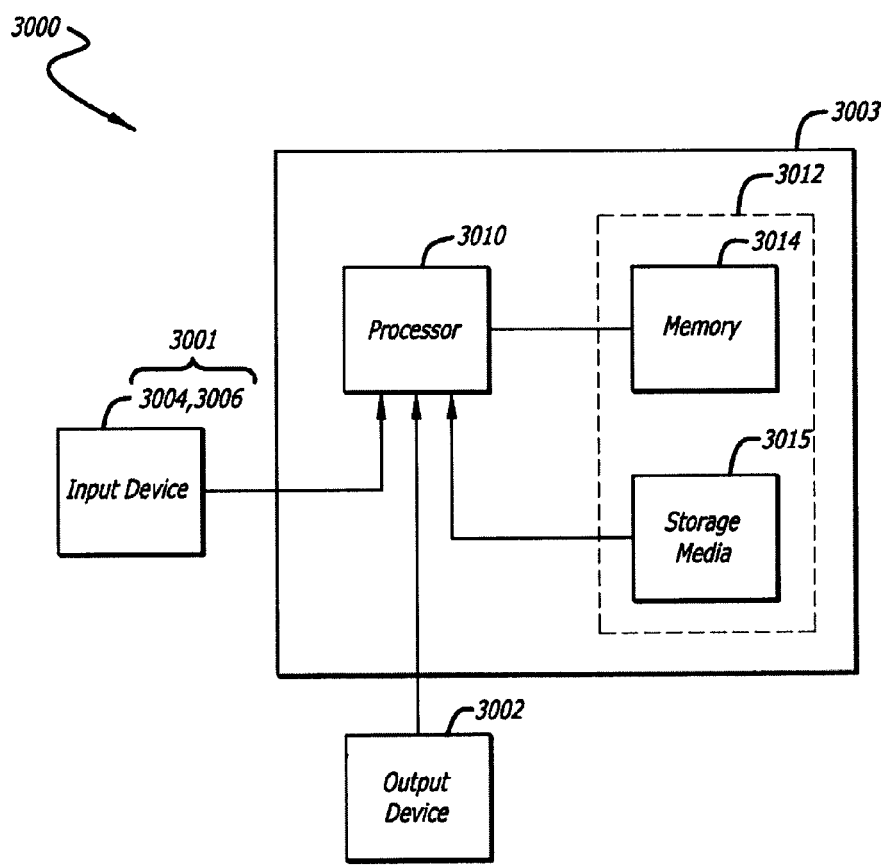

Referring now to FIGS. 30A-30B, an exemplary computing system or apparatus 3000 is illustrated for designing an integrate circuit 3099. The exemplary computing apparatus 3000 is adapted to perform electronic computer aided design (ECAD) and may be used to execute instructions or code of software programs to perform the processes or elements of the methods disclosed herein. The computing apparatus 3000 includes an input device 3001, such as a keyboard 3006, mouse 3004, Ethernet or other communications port; an output device 3002, such as a monitor, speakers, a printer, communications port, or a writeable media drive; a processor 3010; and a storage device 3012 coupled together as shown. The storage device 3012 may include one or more of a memory 3014, such as a volatile memory like RAM, SDRAM, DDR, DDR2, DDR3; and a storage media 3015. The storage media 3015 may comprise a non-volatile memory such as a hard drive, a solid-state drive, and the like. In some embodiments, as is known in the art, the storage media may be located on another computing device across a network (not shown). Instructions may be loaded from the storage media into the memory. The processor may retrieve instructions from the storage media or memory and execute the instructions to perform the operations described herein.

Included in the storage device 3012 is a set of processor executable instructions that, when executed by the processor 3010 configure the computing apparatus to provide the graphical user interface in a manner consistent with the methods disclosed herein. The clock tree planning user interface and its layout windows shown in the Figures may be displayed on the output device 3002, such as a monitor or a display device, in response to processor or machine readable instructions.

In one embodiment of the invention, the clock topology planning software may be part of a logic synthesis software tool (e.g., the RTL Compiler tool) whose instructions are executed by the processor. In another embodiment of the invention, the clock topology planning software may be a stand alone software tool with instructions that are executed independently by the processor.

The computing system includes a processor, a memory, a removable media drive, and a hard disk drive. The processor within the computer executes instructions stored in a machine-readable storage device such as the hard disk drive or a removable storage device (e.g., an optical medium (compact disk (CD), digital video disk (DVD), etc.), a magnetic medium (magnetic disk, a magnetic tape, etc.), or a combination of both.

When implemented in software, the elements of the embodiments of the invention are essentially the program, code segments, or instructions to perform the necessary tasks. The program, code segments, or instructions can be stored in a processor readable medium or storage device that can be read and executed by a processor. The processor readable medium may include any medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc. and stored in the processor readable medium or storage device.

When implemented as an electronic computer aided design (ECAD) system, the elements of the embodiments of the invention include one or more processor to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

Some portions of the preceding detailed description may have been presented in terms of algorithms and symbolic representations that perform operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities may take the form of electrical (e.g., current or voltage) or magnetic signals capable of being stored, transferred, combined, compared, and otherwise manipulated. It has proven convenient at times, principally for reasons of common usage, to refer to these signals as bits, values, levels, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, processing logic, or similar electronic computing device, that automatically or semi-automatically manipulates and transforms data represented as physical (electronic) quantities within the computer system's registers and memories into other data similarly represented as physical quantities within the computer system memories or registers or other such information storage, transmission or display devices.

Additionally, the embodiments of the invention are not described with reference to any particular programming language. It will be appreciated that a variety of programming languages may be used to implement the teachings of the embodiments of the invention as described herein.

CONCLUSION

Thus, it is seen that a system, method, and apparatus for physically aware clock topology planning is disclosed. It will be appreciated that the embodiments of the invention can be practiced by other means than that of the above-described embodiments, which are presented in this description for purposes of illustration and not of limitation. The specification and drawings are not intended to limit the exclusionary scope of this patent document. It is noted that various equivalents for the particular embodiments discussed in this description may be practice by the claimed invention as well. That is, while specific embodiments of the invention have been described, it is evident that many alternatives, modifications, permutations and variations will become apparent in light of the foregoing description. Accordingly, it is intended that the claimed invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A clock tree planner for an integrated circuit design, the clock tree planner comprising:
    a queue to:
        receive a netlist including a plurality of clocked elements;
        generate a balanced clock tree network using a binary tree building algorithm bottoms up from the plurality of clocked elements at a lowest level of clock tree hierarchy to a clock generator at a highest level of clock tree hierarchy, each clock subtree formed from the clocked elements being placed in the queue based on an associated timing delay signal;
    a power analyzer to analyze non-switching power and switching energy of clock subtrees to determine how to conserve power in the balanced clock tree network;
    a static timing analyzer to analyze clock subtrees to determine clock signal timing delay from one or more clocked elements at a lowest level of clock tree hierarchy in the clock subtrees to a clock signal input terminal of the clock subtrees; and
    an optimizer coupled to the queue, the power analyzer and the static timing analyzer, the optimizer to generate a hierarchical model using the balanced clock tree network, the non-switching power and switching energy, and the clock signal timing delay, and the optimizer to optimize subtree merger and clock signal paths of the balanced clock tree network in response to the non-switching power, the switching energy, and the clock signal timing delay of the clock subtrees, using the hierarchical model.

2. The clock tree planner of claim 1, further comprising:
    a functional analyzer coupled to the optimizer, the functional analyzer to analyze a netlist of the integrated circuit design to determine one or more feasible disable signals that can be used to disable a clock signal to one or more clocked elements in a clock subtree.

3. The clock tree planner of claim 2, wherein
    the functional analyzer further to functionally simulate the integrated circuit design to determine signal switching of the one or more feasible disable signals over a plurality of time periods; and
    the power analyzer to analyze switching energy of the clock subtree in response to at least one feasible disable signal and a probability that the at least one feasible disable signal disables switching of the clocked elements in the clock subtree.

4. The clock tree planner of claim 3, wherein
    the functional analyzer determines a plurality of feasible disable signals that can be used to disable a clock signal to the one or more clocked elements in the clock subtree; and
    the functional analyzer further correlates signal switching of at least two feasible disable signals to determine if either of the two feasible disable signals inefficiently disables a clock signal in a clock signal path with multiple level clock gates.

5. The clock tree planner of claim 3, wherein
    the static timing analyzer further to analyze enable signal paths to determine timing slack of enable signals at enable inputs of clock gates; and
    the timing slack of an enable signal of a clock gate under consideration for insertion into a clock signal path to establish a timing delay ceiling for merging clock subtrees up to the clock gate under consideration for insertion into the clock path.

6. The clock tree planner of claim 2, wherein the functional analyzer includes one or more of an RTL-coded enable analyzer, a structure feedback analyzer, a binary decision diagram based symbolic analyzer, a random simulation analyzer/SAT-based inferred enable analyzer, and a physical exclusive OR based clock gating analyzer to determine feasible disable signals for a clock subtree.

7. The clock tree planner of claim 2, wherein
    the optimizer to select one or more pairs of clocked elements for clustering together into a clock subtree in response to disable signals, physical placement, and timing; and
    push the selected one or more pairs into the queue for further merger consideration.

8. The clock tree planner of claim 2, wherein
    the optimizer selects a plurality of clocked elements for clustering together; and
    in selecting the plurality of clocked elements for clustering, the optimizer considers common disable signals between clocked elements for grouping together into a cluster of clocked elements;

nearby neighbors of clocked elements for grouping together into a cluster of clocked elements; and common slack timing between clocked elements for grouping together into a cluster of clocked elements.

9. The clock tree planner of claim 1, further comprising:

a graphical user interface generator to generate a colorized floorplan illustrating placement of the clock elements, clock gates, and enable gates to evaluate the clock topology plan.

10. The clock tree planner of claim 1, wherein the queue to receive the plurality of clocked elements and arranges them in an order for consideration of clustering together into one or more clock subtrees.

11. The clock tree planner of claim 10, wherein the queue arranges the plurality of clocked elements in order in response to one or more of an alphabetized list of feasible disable signals associated with each clocked element, physical location of each clocked element in a floorplan, and timing slack of each clocked element.

12. The clock tree planner of claim 11, wherein the queue arranges the plurality of clocked subtrees in order in response to one or more of an alphabetized list or ordered type of feasible disable signals associated with each clock subtree, a physical location or distance of each clock input terminal for each clock subtree, and worst case timing delay along clock paths within each clock subtree from clock input terminal of each clocked element up to the clock input terminal of the clock subtree.

13. The clock tree planner of claim 1 wherein the netlist further comprises partially constructed clock sub-trees and clocked elements.

14. The clock tree planner of claim 1 wherein the netlist further comprises flip flops within flip flop clusters.

* * * * *